(12) United States Patent
Zhang et al.

(10) Patent No.: US 11,412,238 B2
(45) Date of Patent: Aug. 9, 2022

(54) SIGNALING AND SYNTAX FOR IN-LOOP RESHAPING INFORMATION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 4 days.

(21) Appl. No.: 17/357,244

(22) Filed: Jun. 24, 2021

(65) Prior Publication Data
US 2021/0321121 A1    Oct. 14, 2021

Related U.S. Application Data

(63) Continuation of application No. PCT/CN2020/079429, filed on Mar. 16, 2020.

(30) Foreign Application Priority Data

Mar. 14, 2019   (WO) ............... PCT/CN2020/079429

(51) Int. Cl.
*H04N 19/00* (2014.01)
*H04N 19/186* (2014.01)
(Continued)

(52) U.S. Cl.
CPC ......... *H04N 19/186* (2014.11); *H04N 19/117* (2014.11); *H04N 19/159* (2014.11); *H04N 19/70* (2014.11)

(58) Field of Classification Search
CPC .. H04N 19/186; H04N 19/117; H04N 19/159; H04N 19/70
See application file for complete search history.

(56) References Cited

U.S. PATENT DOCUMENTS 5,544,284 A    8/1996   Allebach et al.
8,873,872 B1   10/2014  Ostiguy et al.
(Continued)

FOREIGN PATENT DOCUMENTS

CN   102648628 A   8/2012
CN   103688547 A   3/2014
(Continued)

OTHER PUBLICATIONS

Wan et al. "AHG17: Design for signaling reshaper model"; JVET-N0805-v2 accessed on Mar. 23, 2019. (Year: 2019).*
(Continued)

*Primary Examiner* — Zhihan Zhou
(74) *Attorney, Agent, or Firm* — Perkins Coie LLP

(57) ABSTRACT

A method for video processing is provided to include: performing a conversion between a current video block of a video and a coded representation of current video block, wherein the conversion uses a coding mode in which the current video block is constructed based on a first domain and a second domain and/or chroma residue is scaled in a luma-dependent manner, and wherein information used for the coding mode is signaled in a parameter set that is different from a sequence parameter set (SPS), a video parameter set (VPS), a picture parameter set (PPS), or an adaptation parameter set (APS) used for carrying adaptive loop filtering (ALF) parameters.

20 Claims, 67 Drawing Sheets

(51) Int. Cl.
  *H04N 19/117* (2014.01)
  *H04N 19/159* (2014.01)
  *H04N 19/70* (2014.01)

(56) References Cited

U.S. PATENT DOCUMENTS

| | | | |
|---|---|---|---|
| 10,142,654 B2 | 11/2018 | Peng et al. | |
| 10,609,395 B2 | 3/2020 | Kerofsky et al. | |
| 10,652,588 B2 | 5/2020 | Kerofsky et al. | |
| 10,742,972 B1* | 8/2020 | Li | H04N 19/70 |
| 2002/0145610 A1 | 10/2002 | Barilovits et al. | |
| 2005/0058204 A1 | 3/2005 | Fernandes | |
| 2011/0243232 A1 | 10/2011 | Alshina et al. | |
| 2013/0022104 A1 | 1/2013 | Chen et al. | |
| 2013/0022120 A1 | 1/2013 | Gupte et al. | |
| 2013/0182755 A1 | 7/2013 | Chen et al. | |
| 2015/0124865 A1 | 5/2015 | Kim et al. | |
| 2015/0189192 A1 | 7/2015 | Jonsson | |
| 2015/0189272 A1 | 7/2015 | Peng et al. | |
| 2015/0264365 A1 | 9/2015 | Tsai et al. | |
| 2015/0264405 A1 | 9/2015 | Zhang et al. | |
| 2016/0198064 A1 | 7/2016 | Bai et al. | |
| 2016/0360224 A1 | 12/2016 | Laroche et al. | |
| 2017/0105014 A1* | 4/2017 | Lee | H04N 19/30 |
| 2017/0310969 A1 | 10/2017 | Chen et al. | |
| 2017/0310977 A1 | 10/2017 | Laroche et al. | |
| 2017/0374384 A1 | 12/2017 | Xiu et al. | |
| 2018/0077426 A1 | 3/2018 | Zhang et al. | |
| 2018/0103260 A1 | 4/2018 | Chuang et al. | |
| 2018/0192050 A1 | 7/2018 | Zhang et al. | |
| 2018/0205946 A1 | 7/2018 | Zhang et al. | |
| 2018/0220130 A1 | 8/2018 | Zhang et al. | |
| 2018/0242006 A1 | 8/2018 | Kerofsky et al. | |
| 2018/0338154 A1 | 11/2018 | Huang et al. | |
| 2018/0359483 A1 | 12/2018 | Chen et al. | |
| 2019/0014342 A1 | 1/2019 | Li et al. | |
| 2019/0110054 A1* | 4/2019 | Su | H04N 19/154 |
| 2019/0208217 A1 | 7/2019 | Zhou et al. | |
| 2019/0320191 A1 | 10/2019 | Song et al. | |
| 2019/0349607 A1 | 11/2019 | Kadu et al. | |
| 2019/0394464 A1 | 12/2019 | Stepin et al. | |
| 2020/0120345 A1 | 4/2020 | Guo et al. | |
| 2020/0186798 A1 | 6/2020 | Shlyakhov et al. | |
| 2020/0186839 A1* | 6/2020 | Hiron | H04N 19/186 |
| 2020/0267392 A1 | 8/2020 | Lu et al. | |
| 2020/0288173 A1 | 9/2020 | Ye et al. | |
| 2020/0322606 A1 | 10/2020 | Horowitz et al. | |
| 2021/0029361 A1 | 1/2021 | Lu et al. | |
| 2021/0136420 A1* | 5/2021 | Lai | H04N 19/70 |
| 2021/0168385 A1* | 6/2021 | Li | H04N 19/186 |
| 2021/0211700 A1* | 7/2021 | Li | H04N 19/82 |
| 2021/0281876 A1 | 9/2021 | Zhang et al. | |
| 2021/0297669 A1 | 9/2021 | Zhang et al. | |
| 2021/0297679 A1 | 9/2021 | Zhang et al. | |
| 2021/0314572 A1 | 10/2021 | Zhang et al. | |

FOREIGN PATENT DOCUMENTS

| | | |
|---|---|---|
| CN | 103843347 A | 6/2014 |
| CN | 104320671 A | 1/2015 |
| CN | 105075259 A | 11/2015 |
| CN | 105874793 A | 8/2016 |
| CN | 105981381 A | 9/2016 |
| CN | 106464904 A | 2/2017 |
| CN | 104205819 B | 6/2017 |
| CN | 106937121 A | 7/2017 |
| CN | 107211124 A | 9/2017 |
| CN | 107211154 A | 9/2017 |
| CN | 107211155 A | 9/2017 |
| CN | 107360433 A | 11/2017 |
| CN | 108605143 A | 9/2018 |
| CN | 108702515 A | 10/2018 |
| CN | 109155853 A | 1/2019 |
| CN | 109155859 A | 1/2019 |
| CN | 109479133 A | 3/2019 |
| EP | 3367681 A1 | 8/2018 |
| KR | 20130053645 A | 5/2013 |
| WO | 2016057323 A1 | 4/2016 |
| WO | 2016100424 A1 | 6/2016 |
| WO | 2016164235 A1 | 10/2016 |
| WO | 2017019818 A1 | 2/2017 |
| WO | 2017165494 A2 | 9/2017 |
| WO | 2017206805 A1 | 12/2017 |
| WO | 2018044803 A1 | 3/2018 |
| WO | 2018062921 A1 | 4/2018 |
| WO | 2019006300 A1 | 1/2019 |
| WO | 2019160986 A1 | 8/2019 |
| WO | 2020086421 A1 | 4/2020 |
| WO | 2020142186 A1 | 7/2020 |

OTHER PUBLICATIONS

Chen et al. "Algorithm description for Versatile Video Coding and Test Model 4 (VTM 4)"; JVETY-M1002-v1 accessed on Feb. 16, 2019. (Year: 2019).*

Pu et al. "CE12-4: SDR In-loop Reshaping"; JVET-L0246-v2 accessed on Oct. 3, 2018. (Year: 2018).*

Abdoli et al. "AHG11: Block DPCM for Screen Content Coding," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0078, 2018.

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al.CE4: Affine Merge Enhancement with Simplification (Test 4.2.2), Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1002, 2019.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Choi et al. "AHG17: Carriage of Reshaper Model Parameters," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0138, 2019.

Francois et al. "CE12: Summary Report on Mapping Functions," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0032, 2019.

Francois et al. "Chroma Residual Scaling with Separate Luma/Chroma Tree," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0389, 2019.

Heng et al. "AHG17: Design for Signalling Reshaper Model," Joint Video Experts Team (JVET) of ITU-T SG 16 WP 3 and ISO/IEC JTC 1/SC 29/WG 11, 14th Meeting, Geneva, CH, Mar. 1-27, 2019, document JVET-N0805, 2019.

(56) References Cited

OTHER PUBLICATIONS

"High Efficiency Video Coding" Series H: Audiovisual and Multimedia Systems: Infrastructure of Audiovisual Services—Coding of Moving Video, ITU-T, H.265, 2018.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

Lin et al. "AHG16: Subblock-Based Chroma Residual Scaling," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0113, 2019.

Lu et al. "CE12: HDR In-Loop Reshaping (CE12-5, 12-6, 12-7 and 12-8)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0308, 2018.

Lu et al. "CE12-2: HDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0245, 2018.

Lu et al. "CE12-Related: Universal Low Complexity Reshaper for SDR and HDR Video," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0247, 2018.

Lu et al. "CE12: Mapping Functions (Test CE12-1 and CE12-2)," Joint Video Experts Team (JVET) of ITU-T SG 16 WP 3 and ISO/IEC JTC 1/SC 29/WG 11, 13th Meeting, Marrakech, Jan. 15, 2019, document JVET-M0427, 2019.

Pfaff et al. "Signal Adaptive Diffusion Filters for Video Coding," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0038, 2018.

Pu et al. "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0246, 2018.

Rasch et al. "CE10: Uniform Directional Diffusion Filters for Video Coding," Joint Video Experts Team (JVET) of ITU-T SG 16 WP 3 and ISO/IEC JTC 1/Sc 29/WG 11, 12th Meeting, Macao, CN, Oct. 3-12, 2018, document JVET-L0157, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Rusanovskyy et al. "CE14: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0406, 2018.

Seregin et al. "AHG17: On TemporalID and NuhLayerID in APS," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0245, 2019.

Sethuraman, Sriram. "CE9: Results of DMVR Related Tests CE9. 2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

Stepin et al. "CE2 Related: Hadamard Transform Domain Filter," Joint Video Expters Team (JVET) of ITU-T SG 16 and ISO/IEC JTC 1/SC 29/WG 11, 11th Meeting, Ljubljana, SI, Jul. 10-18, 2018, document JVET-K0068, 2018.

Wang et al. "AHG17: On Header Parameter Set (HPS)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0132, 2019.

Zhang et al. "ALF Temporal Prediction with Temporal Scalability," Joint Video Exploration Team (JVET) of ITU-T SG 16 WP 3 and ISO/IEC JTC 1/SC 29/WG 11, 5th Meeting, Geneva, CH, Jan. 12-20, 2017, document JVET-E0104, 2017.

Zhao et al. "On Luma Dependent Chroma Residual Scaling of In-Loop Reshaper," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0299, 2019.

JEM-7.0: https://jvet.hhi.fraunhofer.de/svn/svn_HMJEMSoftware/tags/ HM-16.6-JEM-7.0.

International Search Report and Written Opinion from International Patent Application No. PCT/CN2020/074136 dated Apr. 1, 2020 (10 pages).

International Search Report and Written Opinion from International Patent Application No. PCT/CN2020/074138 dated May 13, 2020 (10 pages).

International Search Report and Written Opinion from International Patent Application No. PCT/CN2020/074139 dated Apr. 13, 2020 (11 pages).

International Search Report and Written Opinion from International Patent Application No. PCT/CN2020/074141 dated Apr. 22, 2020 (11 pages).

International Search Report and Written Opinion from International Patent Application No. PCT/CN2020/074143 dated Apr. 21, 2020 (10 pages).

International Search Report and Written Opinion from International Patent Application No. PCT/CN2020/074144 dated Apr. 3, 2020 (11 pages).

International Search Report and Written Opinion from International Patent Application No. PCT/CN2020/074145 dated Apr. 22, 2020 (10 pages).

International Search Report and Written Opinion from International Patent Application No. PCT/CN2020/074146 dated Apr. 17, 2020 (10 pages).

International Search Report and Written Opinion from International Patent Application No. PCT/CN2020/079429 dated Jun. 16, 2020 (11 pages).

International Search Report and Written Opinion from International Patent Application No. PCT/CN2020/080598 dated Jun. 30, 2020 (9 pages).

International Search Report and Written Opinion from International Patent Application No. PCT/CN2020/080599 dated Jun. 30, 2020 (11 pages).

International Search Report and Written Opinion from International Patent Application No. PCT/CN2020/080600 dated Jun. 29, 2020 (10 pages).

Notice of Allowance from U.S. Appl. No. 17/322,166 dated Aug. 4, 2021.

Sun et al. "Improvements of HEVC SCC Palette Mode and Intra Block Copy," IEEE Journal on Emerging and Selected Topics in Circuits and Systems, Dec. 2016, 6(4):433-445.

Non Final Office Action from U.S. Appl. No. 17/330,945 dated Aug. 26, 2021.

Non Final Office Action from U.S. Appl. No. 17/331,017 dated Sep. 3, 2021.

Non Final Office Action from U.S. Appl. No. 17/331,132 dated Oct. 1, 2021.

Non Final Office Action from U.S. Appl. No. 17/361,837 dated Oct. 25, 2021.

Final Office Action from U.S. Appl. No. 17/330,945 dated Dec. 10, 2021.

Francois et al, "CE12: Report of CE12-3 abd CE12-5 on In-Loop Refinement," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0206, 2018.

Wang et al. "On VVC File Format," 127 MPEG Meeting Jul. 8-12, 2019, Gothenburg Sweden, Motion Picture Expert Group or ISO/IEC JTC1/SC29/WG11, No. m48079, XP03026896, Retrieved from the Internet: URL:http://phenix.int-evry.fr/mpeg/doc_end_user/documents/127_Gothenburg/wg11/m48079-v1-m48079-v1-VvcFf. zip m48079-v1-VvcFf.docx [retrieved on May 16, 2019].

Ye et al. "On Luma Mapping with Chroma Scaling," Joint Video Experts Team (JVET) of ITU-T SG 16 WP 3 and ISO/IEC JTC 1/SC

(56) References Cited

OTHER PUBLICATIONS

29/WG 11, 14th Meeting, Geneva, CH, Mar. 19-27, 2019, document JVET-N0477, 2019. (EP20749298.4 EESR mailed Mar. 3, 2022).
Extended European Search Report from Europeanl Patent Application No. 20748416.3 dated Feb. 2, 2022 (15 pages).
Extended European Search Report from Europeanl Patent Application No. 20749298.4 dated Mar. 3, 2022 (15 pages).
First Examination Report from Indian Patent Application No. 202147041936 dated Mar. 24, 2022 (8 pages).
Non Final Office Action from U.S. Appl. No. 17/330,945 dated Apr. 1, 2022.

\* cited by examiner

3410

3412 Performing a conversion between a current video block of a video that is a chroma block and a coded representation of the video, wherein, during the conversion, the current video block is constructed based on a first domain and a second domain, and wherein the conversion further includes applying a forward reshaping process and/or an inverse reshaping process to one or more chroma components of the current video block

Performing a conversion between a current video block of a video and a coded representation of the video, wherein the conversion uses a coding mode in which the current video block is constructed based on a first domain and a second domain and/or chroma residue is scaled in a luma-dependent manner, and wherein at least one syntax element in the coded representation provides an indication of a usage of the coding mode and an indication of a reshaper model

Performing a conversion between a current video block of a video region of a video and a coded representation of the video, wherein the conversion uses a coding mode in which the current video block is constructed based on a first domain and a second domain and/or chroma residue is scaled in a luma-dependent manner, and
wherein multiple forward reshaping and/or multiple inverse reshaping are applied in the reshaping mode for the video region

3712 — Making a determination that a coding mode is enabled for a conversion between a current video block of a video and a coded representation of the video 3714 — Performing the conversion using an intra block copy mode which generates a prediction block using at least a block vector pointing to a picture that includes the current video block

3722 — Making a determination, for a conversion between a current video block of a video and a coded representation of the video, that the current video block is coded in an intra block copy (IBC) mode that generates a prediction block using at least a block vector pointing to a video frame containing the current video block for coding the current video block 3724 — Performing, due to the determination, the conversion by disabling a coding mode

3832 — Performing a conversion between a first video block of a video and a coded representation of the video, wherein the conversion of the first video block uses a first coding mode and a block-based delta pulse code modulation (BDPCM) mode 3834 — Performing a conversion between a second video block of the video and a coded representation of the video, wherein the second video block is coded without using the BDPCM mode and the conversion of the second video block uses the first coding mode

3862 — Performing a conversion between a first video block of a video and a coded representation of the video, wherein the conversion of the first video block uses a first coding mode and a transform skip mode in which a transform on a prediction residual is skipped in coding the current video block 3864 — Performing a conversion between a second video block of the video and a coded representation of the video, wherein the second video block is coded without using the transform skip mode and the conversion of the second video block uses the first coding mode

FIG. 38F

```
      ┌─ 3872                              ┌─ 3874
3870   │                                   │
  ↘   ┌┴──────────────────────┐           ┌┴──────────────────────┐
      │ Making a determination │           │ Performing the conversion │
      │ that a coding mode is  │           │ using an intra pulse code │
      │ enabled for a          │───────────│ modulation mode in which  │
      │ conversion between a   │           │ the current video block is│
      │ current video block of │           │ coded without applying a  │
      │ a video and a coded    │           │ transform and a transform-│
      │ representation of the  │           │ domain quantization       │
      │ video                  │           │                           │
      └────────────────────────┘           └───────────────────────────┘
```

3892 — Performing a conversion between a first video block of a video and a coded representation of the video, wherein the conversion of the first video block uses a first coding mode and an intra pulse code modulation mode in which the current video block is coded without applying a transform and a transform-domain quantization 3894 — Performing a conversion between a second video block of the video and a coded representation of the video, wherein the second video block is coded without using the intra pulse code modulation mode and the conversion of the second video block uses the first coding mode

FIG. 38I

```
                    3910
                       ┌─ 3912
                       │
┌─────────────────────────────┐
│ Making a determination that  │
│ a coding mode is enabled for │
│ a conversion between a       │
│ current video block of a     │
│ video and a coded            │
│ representation of the video  │
└─────────────────────────────┘
               │
               │
┌─────────────────────────────┐
│ Performing the conversion    │
│ using a transquant-bypass    │
│ mode in which the current    │
│ video block is losslessly    │
│ coded without a transform    │
│ and a quantization           │
└─────────────────────────────┘
                       └─ 3914
```

3922 Making a determination, for a conversion between a current video block of a video and a coded representation of the video, that the current video block is coded in a transquant-bypass mode in which the current video block is losslessly coded without a transform and a quantization 3924 Performing, due to the determination, the conversion by disabling a coding mode

FIG. 38K

```
                    3930
                    ↙
┌─────────────────────────────────┐
│ Performing a conversion between │
│ a first video block of a video  │ ⟵ 3932
│ and a coded representation of   │
│ the video, wherein the          │
│ conversion of the first video   │
│ block uses a first coding mode  │
│ and a transquant-bypass mode in │
│ which the current video block   │
│ is losslessly coded without a   │
│ transform and a quantization    │
└─────────────────────────────────┘
                 │
┌─────────────────────────────────┐
│ Performing a conversion between │
│ a second video block of the     │ ⟵ 3934
│ video and a coded               │
│ representation of the video,    │
│ wherein the second video block  │
│ is coded without using the      │
│ transquant-bypass mode and the  │
│ conversion of the second video  │
│ block uses the first coding     │
│ mode                            │
└─────────────────────────────────┘
```

FIG. 38L

SIGNALING AND SYNTAX FOR IN-LOOP RESHAPING INFORMATION

CROSS REFERENCE TO RELATED APPLICATIONS

This application is a continuation of International Patent Application No. PCT/CN2020/079429, filed on Mar. 16, 2020, which claims the priority to and benefits of International Patent Application No. PCT/CN2019/078185, filed on Mar. 14, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to in-loop reshaping (ILR) for video processing are described. The described methods may be applied to both the existing video processing standards (e.g., High Efficiency Video Coding (HEVC)) and future video processing standards or video processors including video codecs.

In one representative aspect, the disclosed technology may be used to provide a method for video processing. This method includes performing, for a conversion between a current video block of a video and a coded representation of the video, a motion information refinement process based on samples in a first domain or a second domain; and performing the conversion based on a result of the motion information refinement process, wherein, during the conversion, the samples are obtained for the current video block from a first prediction block in the first domain using an unrefined motion information, at least a second prediction block is generated in the second domain using a refined motion information used for determining a reconstruction block, and reconstructed samples of the current video block are generated based on the at least the second prediction block.

In another representative aspect, the disclosed technology may be used to provide a method for video processing. This method includes performing a conversion between a current video block of a video and a coded representation of the video, wherein, during the conversion, the current video block is constructed based on a first domain and a second domain and/or chroma residue is scaled in a luma-dependent manner, wherein a coding tool is applied during the conversion using parameters that are derived at least based on first set of samples in a video region of the video and second set of samples in a reference picture of the current video block, and wherein a domain for the first samples and a domain for the second samples are aligned.

In another representative aspect, the disclosed technology may be used to provide a method for video processing. This method includes determining, for a current video block of a current video region of a video, a parameter for a coding mode of the current video block based on one or more parameters for a coding mode of a previous video region; and performing a coding for the current video block to generate a coded representation of the video based on the determining, and wherein the parameter for the coding mode is included in a parameter set in the coded representation of the video, and wherein the performing of the coding comprises transforming a representation of the current video block in a first domain to a representation of the current video block in a second domain, and wherein, during the performing of the coding using the coding mode, the current video block is constructed based on the first domain and the second domain and/or chroma residue is scaled in a luma-dependent manner.

In another representative aspect, the disclosed technology may be used to provide a method for video processing. This method includes receiving a coded representation of a video including a parameter set including parameter information for a coding mode; and performing a decoding of the coded representation by using the parameter information to generate a current video block of a current video region of the video from the coded representation, and wherein the parameter information for the coding mode is based on one or more parameters for the coding mode of a previous video region, wherein, in the coding mode, the current video block is constructed based on the first domain and the second domain and/or chroma residue is scaled in a luma-dependent manner.

In another representative aspect, the disclosed technology may be used to provide a method for video processing. This method includes performing a conversion between a current video block of a video and a coded representation of the video, and wherein the conversion includes applying a filtering operation to a prediction block in a first domain or in a second domain different from the first domain.

In another representative aspect, the disclosed technology may be used to provide a method for video processing. This method includes performing a conversion between a current video block of a video and a coded representation of the video, wherein, during the conversion, a final reconstruction block is determined for the current video block, and wherein the temporary reconstruction block is generated using a prediction method and represented in the second domain.

In another representative aspect, the disclosed technology may be used to provide a method for video processing. This method includes performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein a parameter set in the coded representation comprises parameter information for the coding mode In another representative aspect, the disclosed technology may be used to provide a method for video processing. This method includes performing a conversion between a current video block of a video that is a chroma block and a coded representation of the video, wherein, during the conversion, the current video block is constructed based on a first domain and a second domain, and wherein the conversion further includes applying a forward reshaping process and/or an inverse reshaping process to one or more chroma components of the current video block.

In another representative aspect, the disclosed technology may be used to provide a method for video processing. This method includes performing a conversion between a current video chroma block of a video and a coded representation of the video, wherein the performing of the conversion includes: determining whether luma-dependent chroma residue scaling (LCRS) is enabled or disabled based on a rule, and reconstructing the current video chroma block based on the determination.

In another representative aspect, the disclosed technology may be used to provide a method for video processing. This method includes determining, for a conversion between a current video block of a video and a coded representation of the video, whether to disable using of a coding mode based on one or more coefficient values of the current video block; and performing the conversion based on the determining, wherein, during the conversion using the coding mode, the current video block is constructed based on a first domain and a second domain and/or chroma residue is scaled in a luma-dependent manner.

In another representative aspect, the disclosed technology may be used to provide a method for video processing. This method includes dividing, for a conversion between a current video block of a video that exceeds a virtual pipeline data unit (VPDU) of the video, the current video block into regions; and performing the conversion by applying a coding mode separately to each region, wherein, during the conversion by applying the coding mode, the current video block is constructed based on a first domain and a second domain and/or chroma residue is scaled in a luma-dependent manner In another representative aspect, the disclosed technology may be used to provide a method for video processing. This method includes determining, for a conversion between a current video block of a video and a coded representation of the video, whether to disable using of a coding mode based on a size or a color format of the current video block; and performing the conversion based on the determining, wherein, during the conversion using the coding mode, the current video block is constructed based on a first domain and a second domain and/or chroma residue is scaled in a luma-dependent manner In another representative aspect, the disclosed technology may be used to provide a method for video processing. This method includes performing a conversion between a current video block of a video and a coded representation of the video, wherein the conversion uses a coding mode in which the current video block is constructed based on a first domain and a second domain and/or chroma residue is scaled in a luma-dependent manner, and wherein at least one syntax element in the coded representation provides an indication of a usage of the coding mode and an indication of a reshaper model.

In another representative aspect, the disclosed technology may be used to provide a method for video processing. This method includes determining that a coding mode is disabled for a conversion between a current video block of a video and a coded representation of the video; and conditionally skipping a forward reshaping and/or inverse reshaping based on the determining, wherein, in the coding mode, the current video block is constructed based on a first domain and a second domain and/or chroma residue is scaled in a luma-dependent manner.

In another representative aspect, the disclosed technology may be used to provide a method for video processing. This method includes performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein multiple forward reshaping and/or multiple inverse reshaping are applied in the reshaping mode for the video region.

In another representative aspect, the disclosed technology may be used to provide a method for video processing. This method includes making a determination that a coding mode is enabled for a conversion between a current video block of a video and a coded representation of the video; and performing the conversion using a palette mode wherein at least a palette of representative sample values is used for the current video block, and wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded in a palette mode in which at least a palette of representative sample values is used for coding the current video block; and performing, due to the determination, the conversion by disabling a coding mode, wherein, when the coding mode is applied to a video block, the video block is constructed based on chroma residue that is scaled in a luma-dependent manner.

In another representative aspect, the disclosed technology may be used to provide a method for video processing. This method includes performing a conversion between a first video block of a video and a coded representation of the video, wherein the conversion uses a first coding mode and a palette coding mode in which at least a palette of representative pixel values is used for coding the current video block; and performing a conversion between a second video block of the video that is coded without using the palette coding mode and a coded representation of the video, and wherein the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and second video block.

In another representative aspect, the disclosed technology may be used to provide a method for video processing. This method includes making a determination that a coding mode is enabled for a conversion between a current video block of a video and a coded representation of the video, and performing the conversion using an intra block copy mode which generates a prediction block using at least a block vector pointing to a picture that includes the current video block, and wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded in an intra block copy (IBC) mode that generates a prediction block using at least a block vector pointing to a video frame containing the current video block for coding the current video block; and performing, due to the determination, the conversion by disabling a coding mode, wherein when the coding mode is applied to a video block, the video block is constructed based on a first domain and a second domain and/or chroma residue is scaled in a luma-dependent manner.

In another representative aspect, the disclosed technology may be used to provide a method for video processing. This method includes performing a conversion between a first video block of a video and a coded representation of the video, wherein the conversion uses an intra block copy mode that generates a prediction block using at least a block vector pointing to a video frame containing the current video block and a first coding mode; and performing a conversion between a second video block of the video that is coded without using the intra block copy mode and a coded representation of the video, wherein the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and to the second video block.

In another representative aspect, the disclosed technology may be used to provide a method for video processing. This method includes making a determination that a coding mode is enabled for a conversion between a current video block of a video and a coded representation of the video; and performing the conversion using a block-based delta pulse code modulation (BDPCM) mode, wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded using a block-based delta pulse code modulation (BDPCM) mode; and performing, due to the determination, the conversion by disabling a coding mode, wherein when the coding mode is applied to a video block, the video block is constructed based on a first domain and a second domain and/or chroma residue is scaled in a luma-dependent manner.

In another representative aspect, the disclosed technology may be used to provide a method for video processing. This method includes performing a conversion between a first video block of a video and a coded representation of the video, wherein the conversion of the first video block uses a first coding mode and a block-based delta pulse code modulation (BDPCM) mode; and performing a conversion between a second video block of the video and a coded presentation of the video, wherein the second video block is coded without using the BDPCM mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

In another representative aspect, the disclosed technology may be used to provide a method for video processing. This method includes making a determination that a coding mode is enabled for a conversion between a current video block of a video and a coded representation of the video; and performing the conversion using a transform skip mode in which a transform on a prediction residual is skipped in coding the current video block, wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded in a transform skip mode in which a transform on a prediction residual is skipped in coding the current video block; and performing, due to the determination, the conversion by disabling a coding mode, wherein when the coding mode is applied to a video block, the video block is constructed based on a first domain and a second domain and/or chroma residue is scaled in a luma-dependent manner.

In another representative aspect, the disclosed technology may be used to provide a method for video processing. This method includes performing a conversion between a first video block of a video and a coded representation of the video, wherein the conversion of the first video block uses a first coding mode and a transform skip mode in which a transform on a prediction residual is skipped in coding the current video block; and performing a conversion between a second video block of the video and a coded representation of the video, wherein the second video block is coded without using the transform skip mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

In another representative aspect, the disclosed technology may be used to provide a method for video processing. This method includes making a determination that a coding mode is enabled for a conversion between a current video block of a video and a coded representation of the video; and performing the conversion using an intra pulse code modulation mode in which the current video block is coded without applying a transform and a transform-domain quantization, wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded in an intra pulse code modulation mode in which the current video block is coded without applying a transform and a transform-domain quantization; and performing, due to the determination, the conversion by disabling a coding mode, wherein when the coding mode is applied to a video block, the video block is constructed based on a first domain and a second domain and/or chroma residue is scaled in a luma-dependent manner.

In another representative aspect, the disclosed technology may be used to provide a method for video processing. This method includes performing a conversion between a first video block of a video and a coded representation of the video, wherein the conversion of the first video block uses a first coding mode and an intra pulse code modulation mode in which the current video block is coded without applying a transform and a transform-domain quantization; and performing a conversion between a second video block of the video and a coded presentation of the video, wherein the second video block is coded without using the intra pulse code modulation mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

In another representative aspect, the disclosed technology may be used to provide a method for video processing. This method includes making a determination that a coding mode is enabled for a conversion between a current video block of a video and a coded representation of the video; and performing the conversion using a modified transquant-bypass mode in which the current video block is losslessly coded without a transform and a quantization, wherein, in the coding mode, the current video block is constructed based on samples in a first domain and a second domain and/or chroma residue is scaled in a luma-dependent manner.

In another representative aspect, the disclosed technology may be used to provide a method for video processing. This method includes making a determination, for a conversion between a current video block of a video and a coded representation of the video, that the current video block is coded in a transquant-bypass mode in which the current video block is losslessly coded without a transform and a quantization; and performing, due to the determination, the conversion by disabling a coding mode, wherein when the coding mode is applied to a video block, the video block is constructed based on a first domain and a second domain and/or chroma residue is scaled in a luma-dependent manner.

In another representative aspect, the disclosed technology may be used to provide a method for video processing. This method includes performing a conversion between a first video block of a video and a coded representation of the video, wherein the conversion of the first video block uses a first coding mode and a transquant-bypass mode in which the current video block is losslessly coded without a transform and a quantization; and performing a conversion between a second video block of the video and a coded presentation of the video, wherein the second video block is coded without using the transquant-bypass mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

In another representative aspect, the disclosed technology may be used to provide a method for video processing. This method includes performing a conversion between a current video block of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in a parameter set that is different from a sequence parameter set (SPS), a video parameter set (VPS), a picture parameter set (PPS), or an adaptation parameter set (APS) used for carrying adaptive loop filtering (ALF) parameters.

In another representative aspect, the disclosed technology may be used to provide a method for video processing. This method includes performing a conversion between a current video block of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in an adaptation parameter set (APS) together with adaptive loop filtering (ALF) information, wherein the information used for the coding mode and the ALF information are included in one NAL unit.

In another representative aspect, the disclosed technology may be used to provide a method for video processing. This method includes performing a conversion between a current video block of a video region of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in a first type of adaptation parameter set (APS) that is different from a second type of APS used for signaling adaptive loop filtering (ALF) information.

In another representative aspect, the disclosed technology may be used to provide a method for video processing. This method includes performing a conversion between a current video block of a video region of a video and a coded representation of the current video block, wherein the conversion uses a coding mode in which the current video block is constructed based on a first domain and a second domain and/or chroma residue is scaled in a luma-dependent manner, and wherein the video region is disallowed to refer to an adaptation parameter set or an parameter set that is signaled before a specified type of data structure used for processing the video, and wherein the specified type of the data structure is signaled before the video region.

In another representative aspect, the disclosed technology may be used to provide a method for video processing. This method includes performing a conversion between a current video block of a video and a coded representation of the current video block, wherein the conversion uses a coding mode in which the current video block is constructed based on a first domain and a second domain and/or chroma residue is scaled in a luma-dependent manner, and wherein a syntax element of a parameter set including parameters used for processing the video has predefined values in a conformance bitstream.

In another representative aspect, the above-described method is embodied in the form of processor-executable code and stored in a computer-readable program medium.

In another representative aspect, a device that is configured or operable to perform the above-described method is disclosed. The device may include a processor that is programmed to implement this method.

In another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 34A and 34B show flowcharts of example methods for video processing.

FIGS. 35A to 35F show flowcharts of example methods for video processing.

FIGS. 37A to 37C show flowcharts of example methods for video processing.

FIGS. 38A to 38L show flowcharts of example methods for video processing.

DETAILED DESCRIPTION

Figure 1:
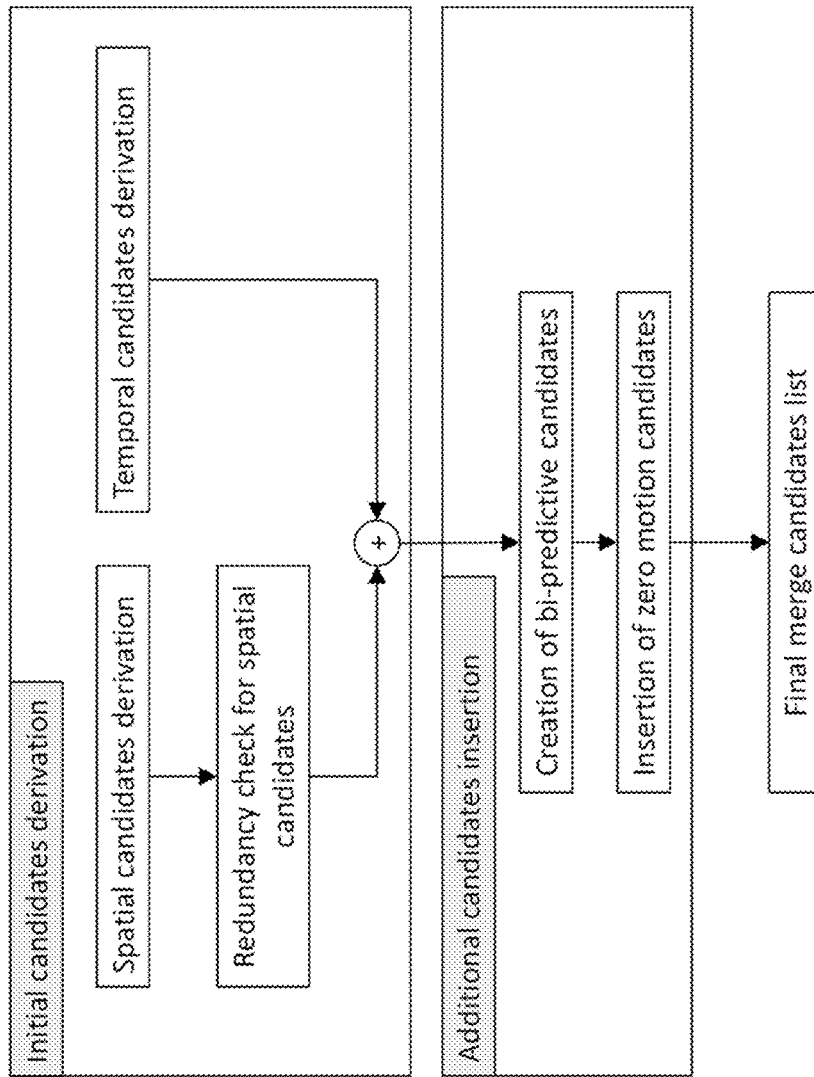
FIG. 1 shows an example of constructing a merge candidate list.

Due to the increasing demand of higher resolution video, video processing methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vectors (to be more precise, motion vector differences (MVD) compared to a motion vector predictor), corresponding reference picture index for each reference picture list and reference picture list usage are signaled explicitly per each PU. This type of mode is named advanced motion vector prediction (AMVP) in this document.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
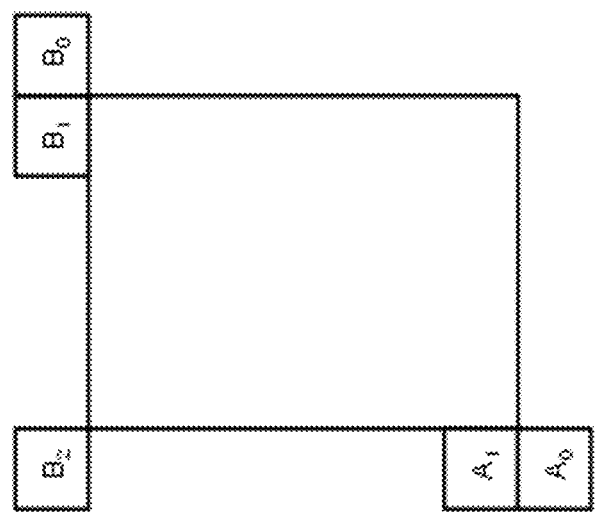
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
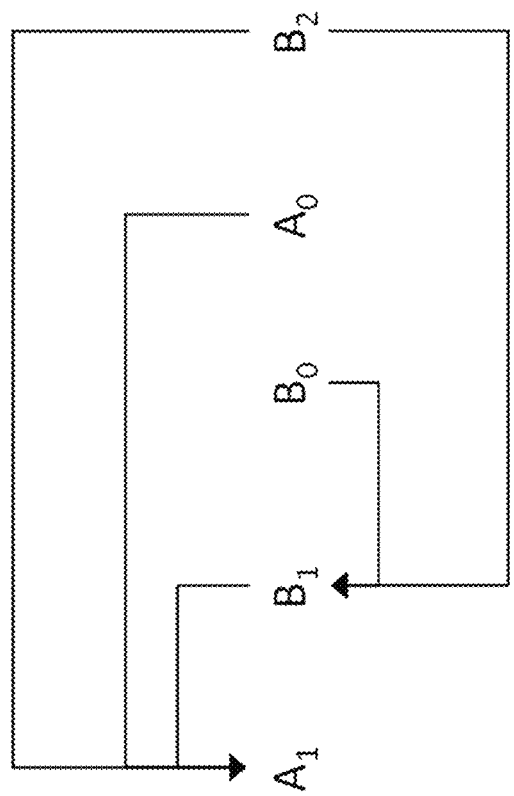
FIG. 3 shows an example of candidate pairs subject to a redundancy check of spatial merge candidates.
Figure 4B:
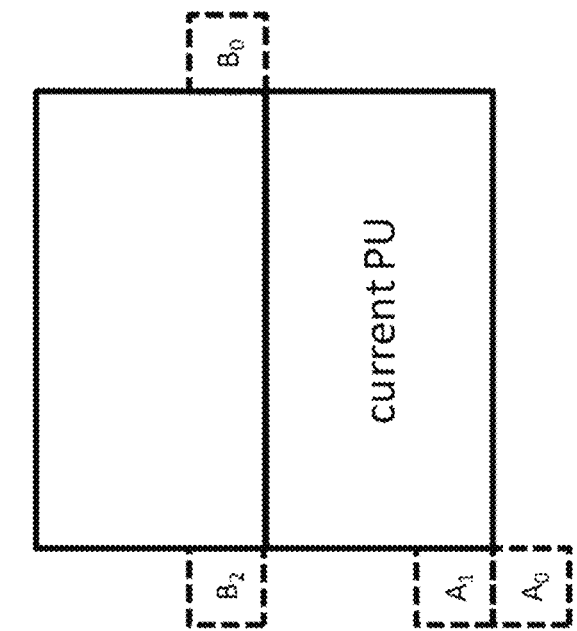
FIGS. 4A and 4B show examples of the position of a second prediction unit (PU) based on the size and shape of the current block.
Figure 4A:
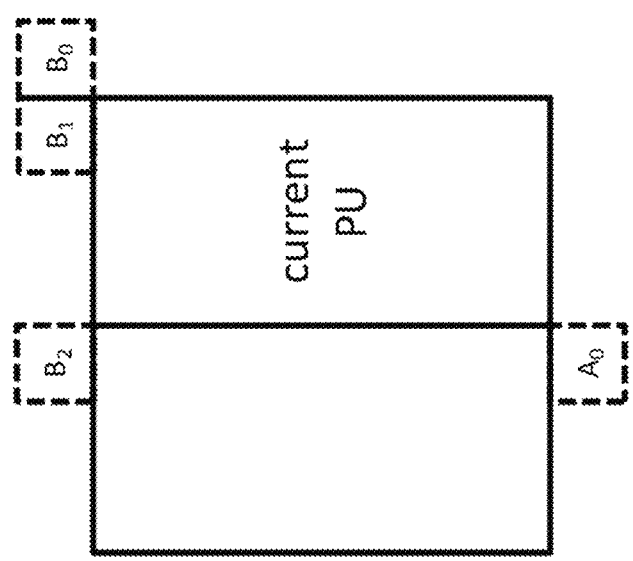

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
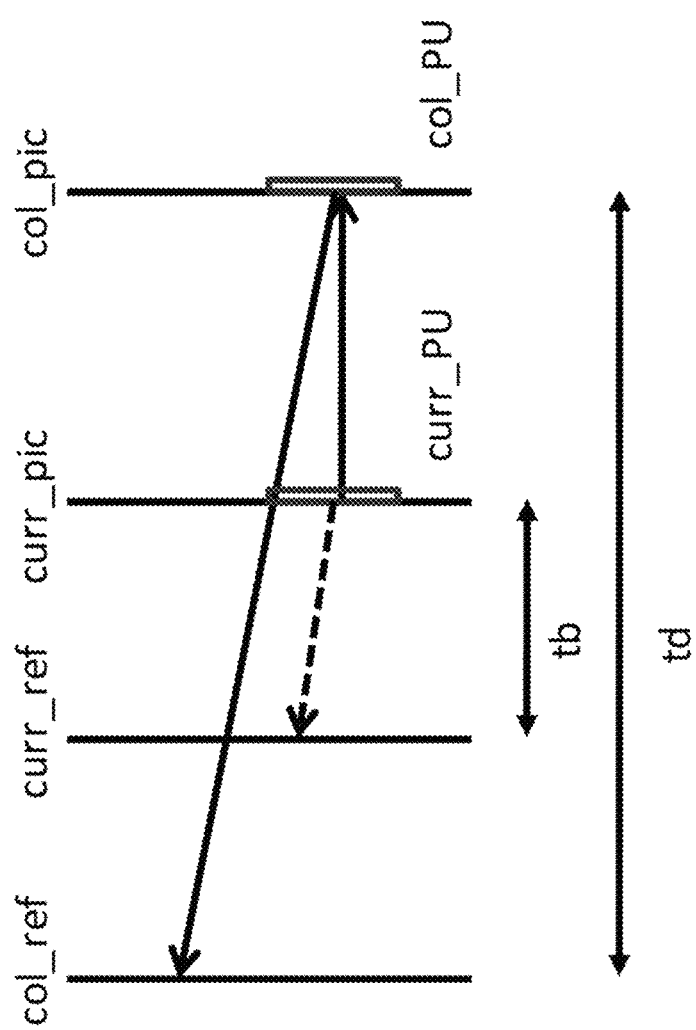
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
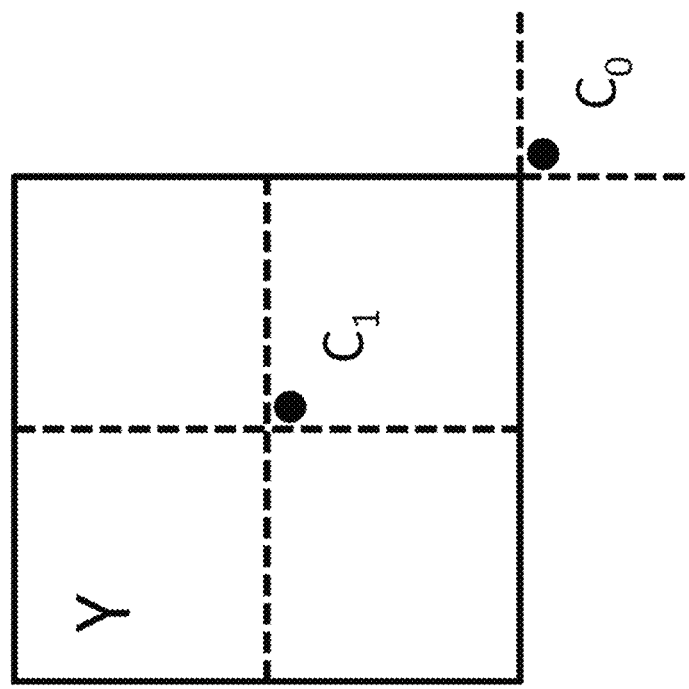
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_1$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
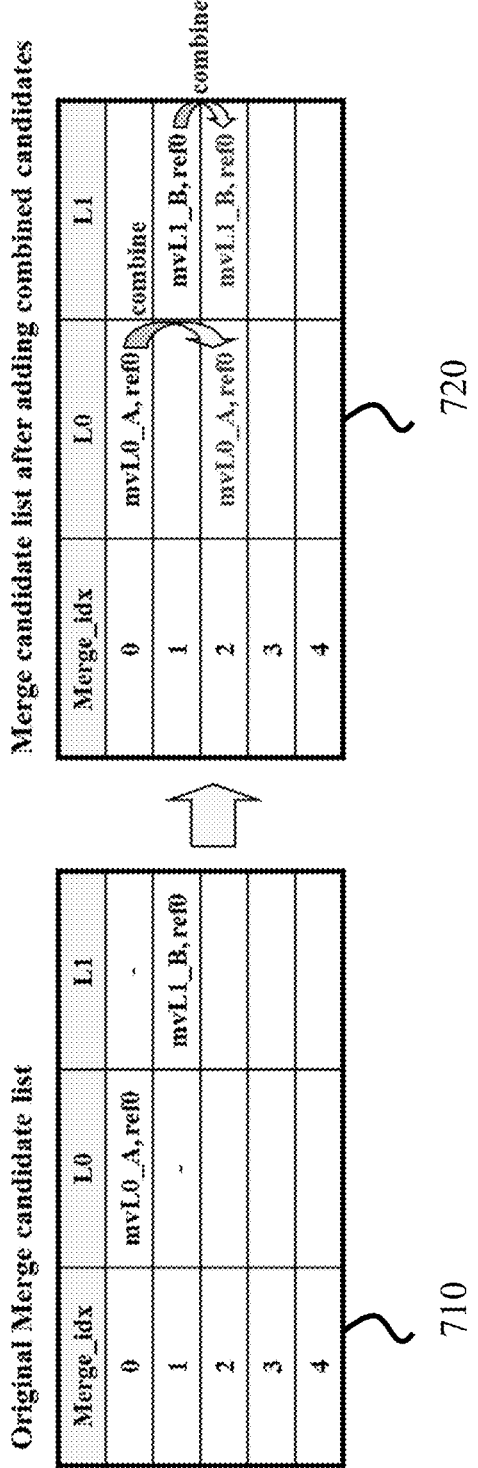
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right). There are numerous rules regarding the combinations that are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Deriving AMVP Candidates

Figure 8:
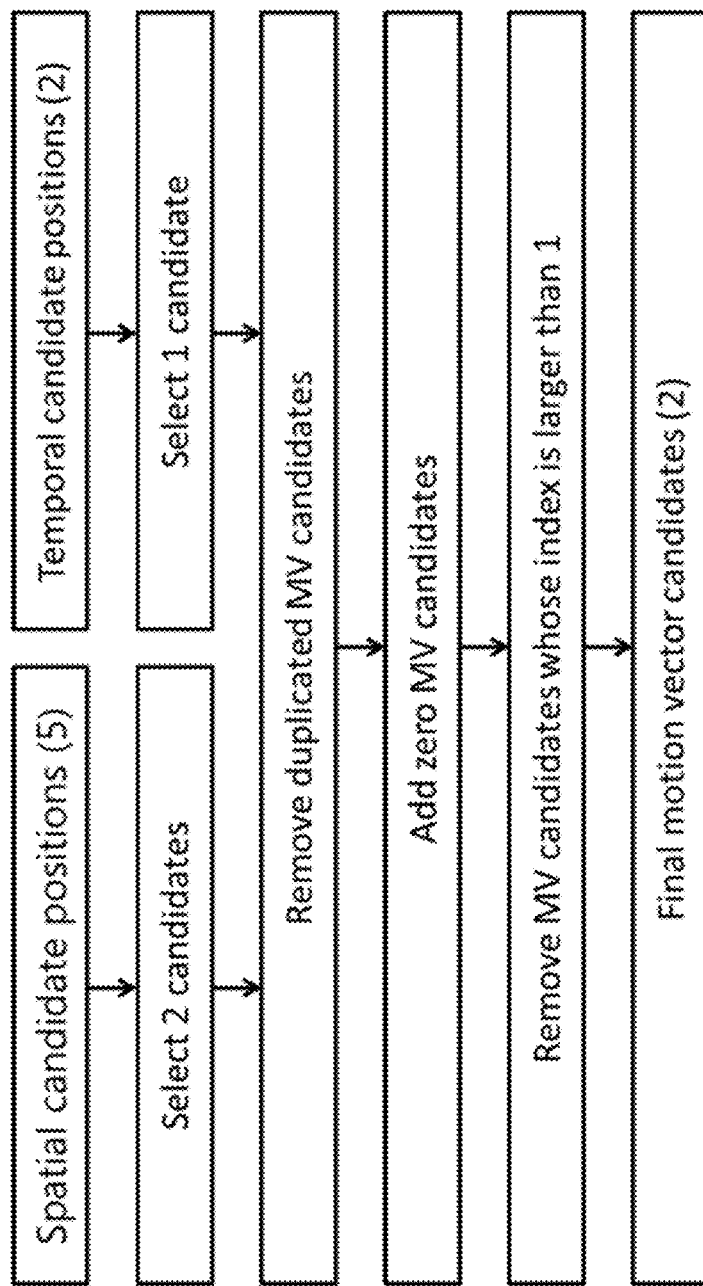
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
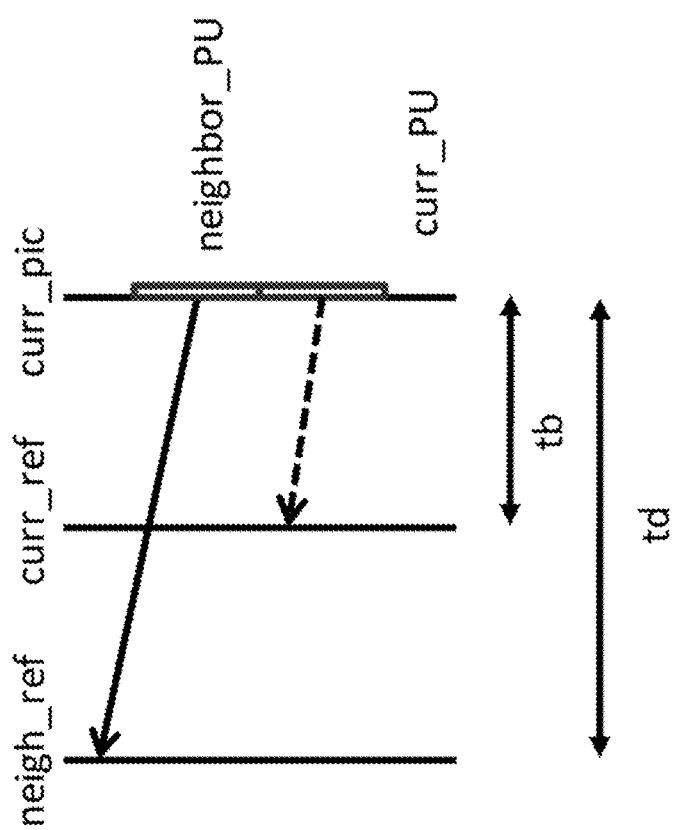
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
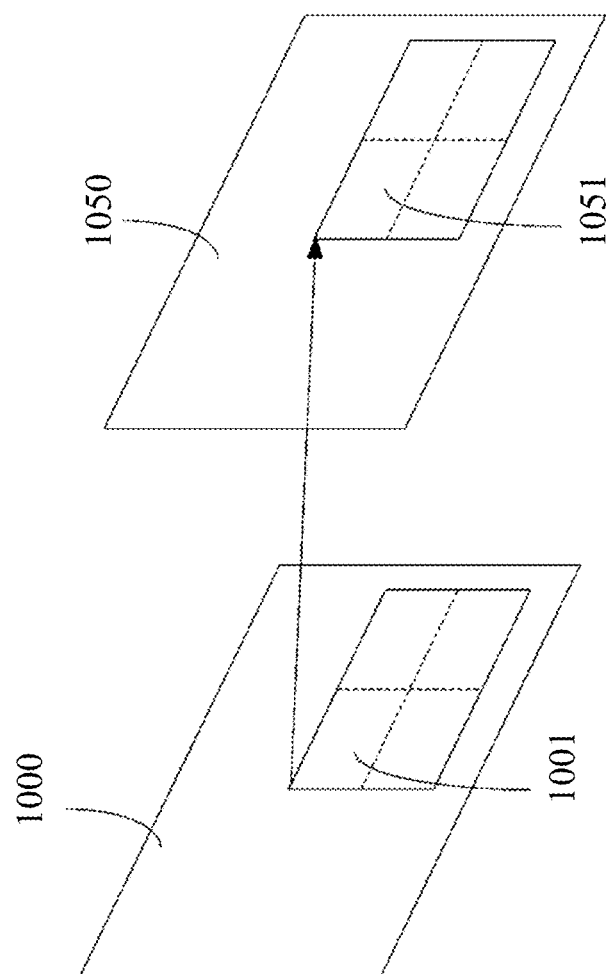
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
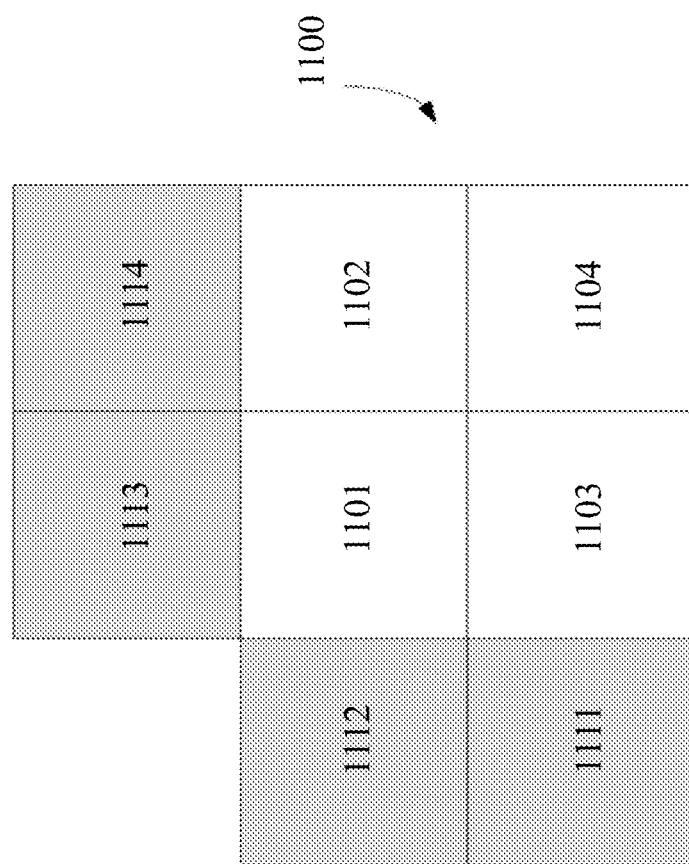
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Example of Local Illumination Compensation (LIC) in JEM

Local Illumination Compensation (LIC) is based on a linear model for illumination changes, using a scaling factor a and an offset b. And it is enabled or disabled adaptively for each inter-mode coded coding unit (CU).

Figure 12:
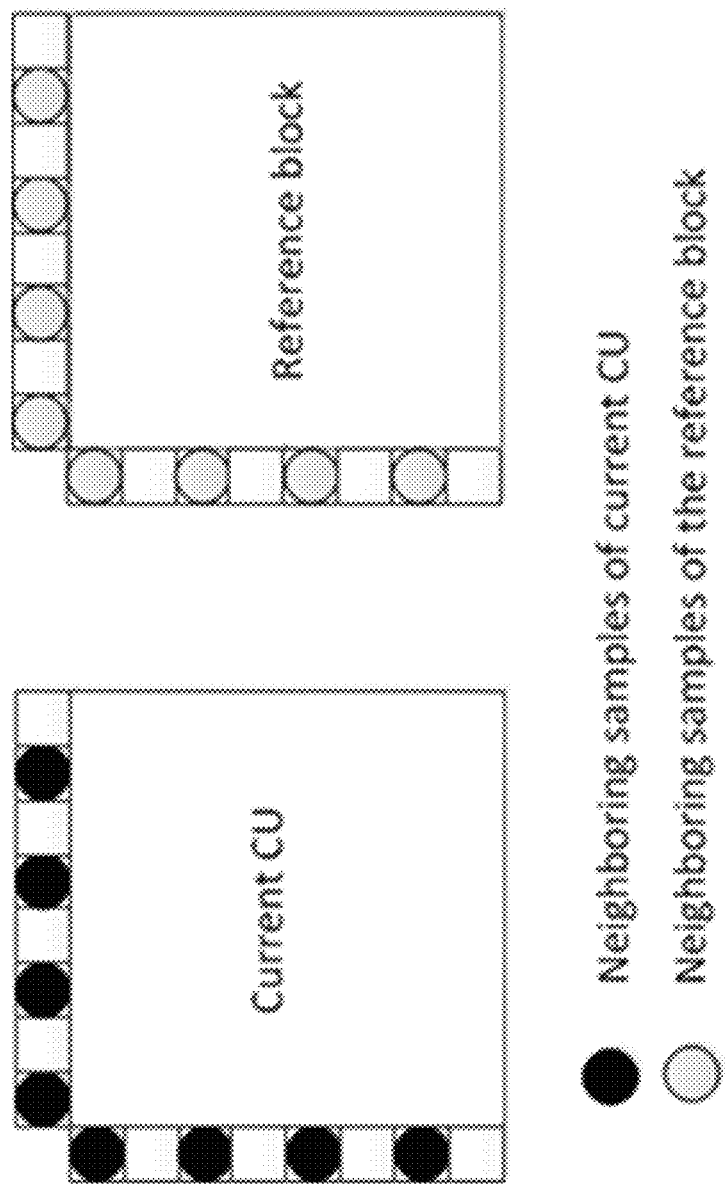
FIG. 12 shows an example of neighboring samples for deriving illumination compensation (IC) parameters.

When LIC applies for a CU, a least square error method is employed to derive the parameters a and b by using the neighbouring samples of the current CU and their corresponding reference samples. More specifically, as illustrated in FIG. 12, the subsampled (2:1 subsampling) neighbouring samples of the CU and the corresponding samples (identified by motion information of the current CU or sub-CU) in the reference picture are used.

2.2.1 Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM: LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3 Example of Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1 Examples of Coding Block Structure in VVC

In VVC, a QuadTree/BinaryTree/MulitpleTree (QT/BT/TT) structure is adopted to divide a picture into square or rectangle blocks. Besides QT/BT/TT, separate tree (a.k.a. Dual coding tree) is also adopted in VVC for I-frames. With separate tree, the coding block structure are signaled separately for the luma and chroma components.

2.3.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.3.3 Examples of Affine Motion Compensation Prediction

Figure 13A:
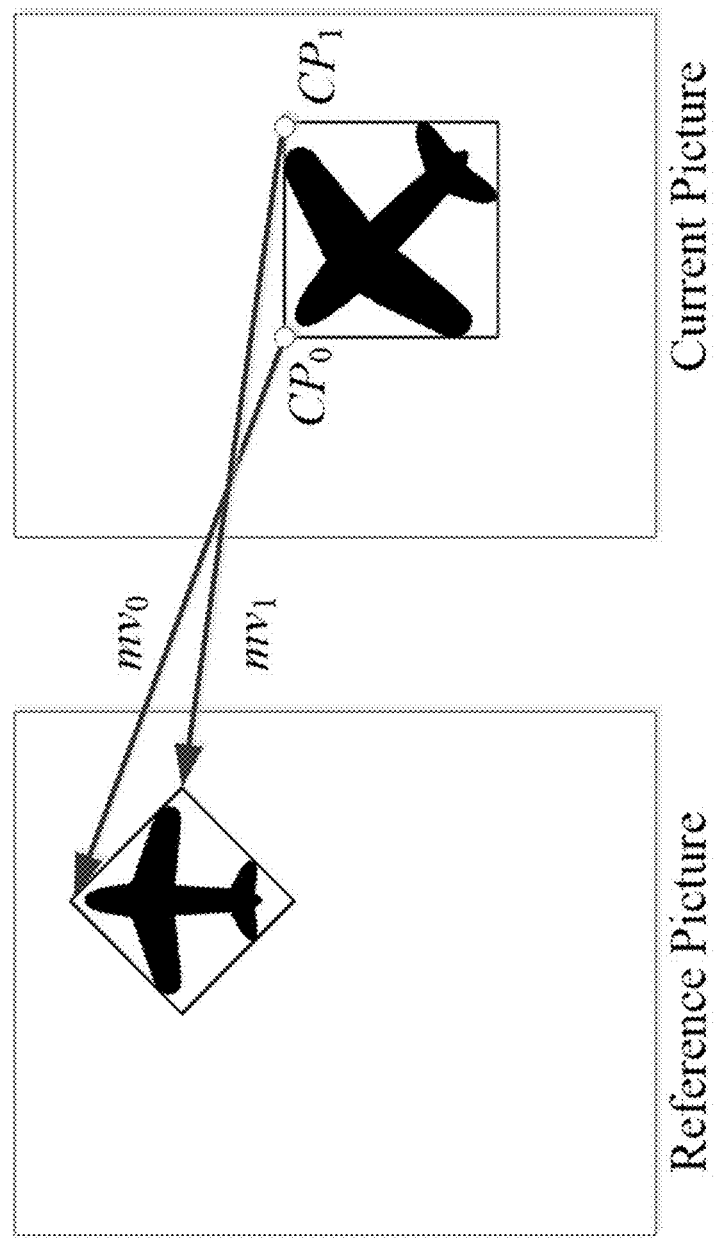
FIGS. 13A and 13B show examples of the simplified 4-parameter affine model and the simplified 6-parameter affine model, respectively.
Figure 13B:
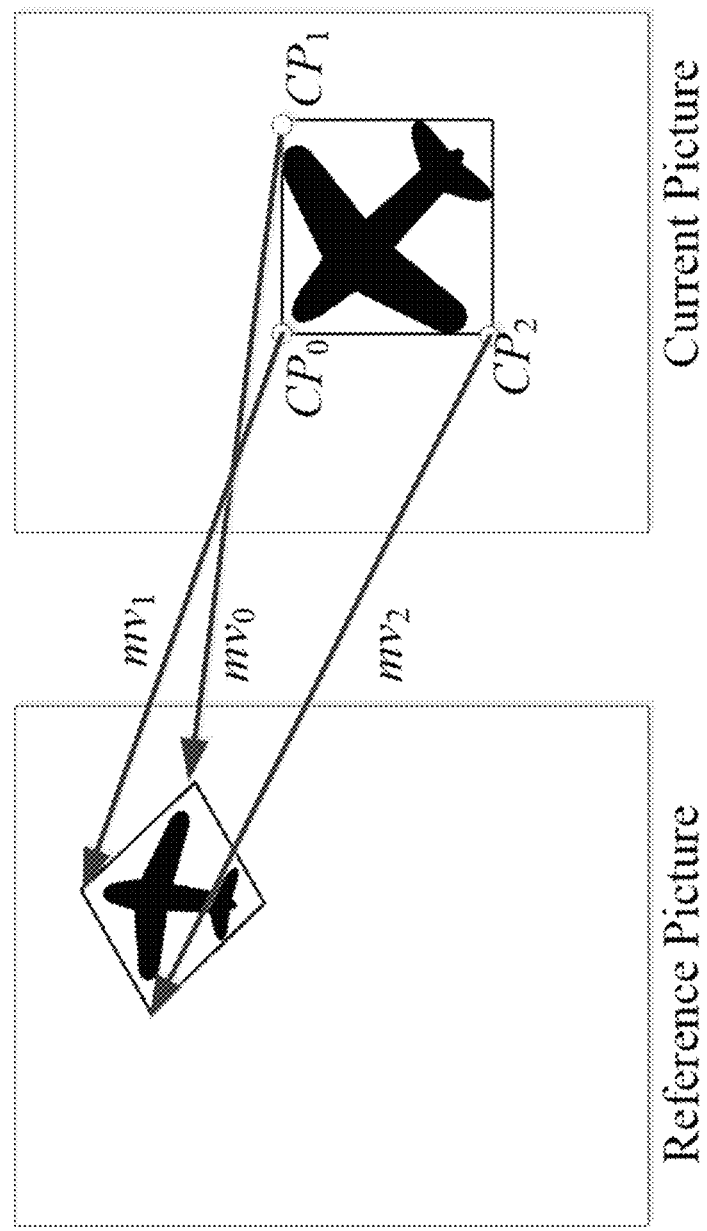

In HEVC, only a translation motion model is applied for motion compensation prediction (MCP). However, the camera and objects may have many kinds of motion, e.g. zoom in/out, rotation, perspective motions, and/or other irregular motions. In VVC, a simplified affine transform motion compensation prediction is applied with 4-parameter affine model and 6-parameter affine model. As shown in FIGS. 13A and 13B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4 in VTM), the representative point is utilized to derive the motion vector for the whole sub-block.

Figure 14:
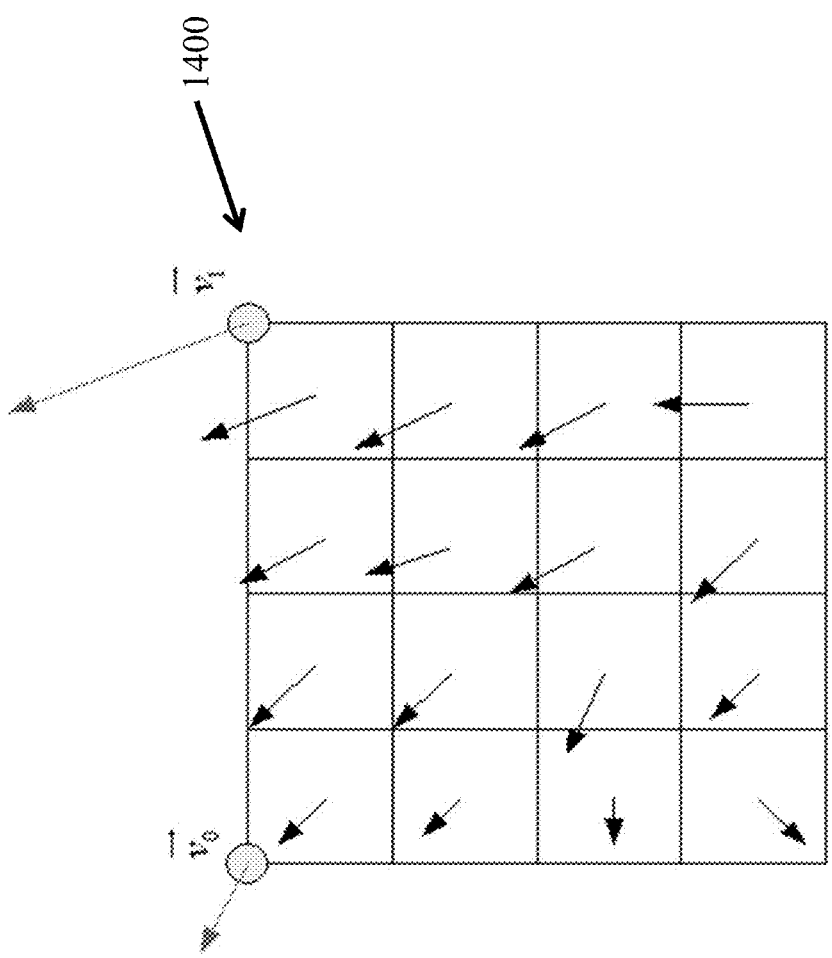
FIG. 14 shows an example of an affine motion vector field (MVF) per sub-block.

FIG. 14 shows an example of affine MVF per sub-block for a block 1300, wherein in order to further simplify the motion compensation prediction, sub-block based affine transform prediction is applied. To derive motion vector of each M×N sub-block, the motion vector of the center sample of each sub-block can be calculated according to Eqs. (1) and (2), and rounded to the motion vector fraction accuracy (e.g., 1/16 in JEM). Then the motion compensation interpolation filters can be applied to generate the prediction of each sub-block with derived motion vector. The interpolation filters for 1/16-pel are introduced by the affine mode. After the MCP, the high accuracy motion vector of each sub-block is rounded and saved as the same accuracy as the normal motion vector.

2.3.3.1 Examples for Signaling of Affine Prediction

Similar to the translational motion model, there are also two modes for signaling the side information due affine prediction. They are AFFINE_INTER and AFFINE_MERGE modes.

2.3.3.2 Examples of AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and estimated CPMVs are signalled. In addition, the index of affine AMVP candidate from which the estimated CPMVs are derived is further signalled.

1) Inherited Affine Motion Predictors

Figure 16:
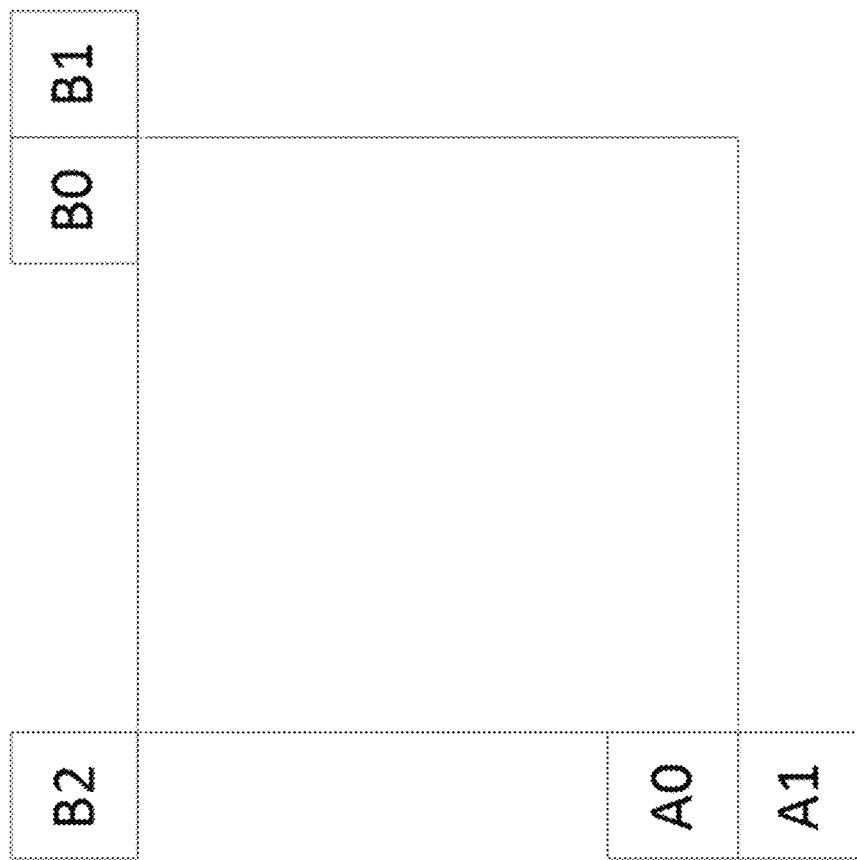
FIG. 16 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Figure 18A:
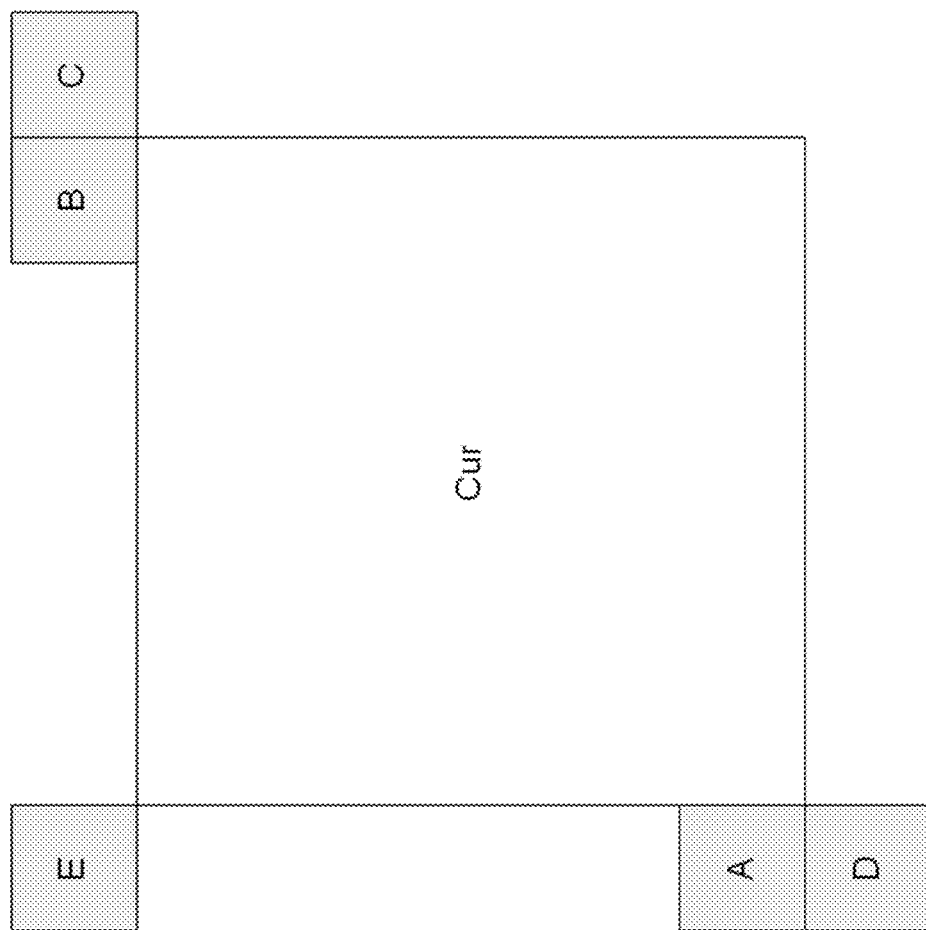
FIGS. 18A and 18B show example candidate blocks and the CPMV predictor derivation, respectively, for the AF_MERGE mode.
Figure 18B:
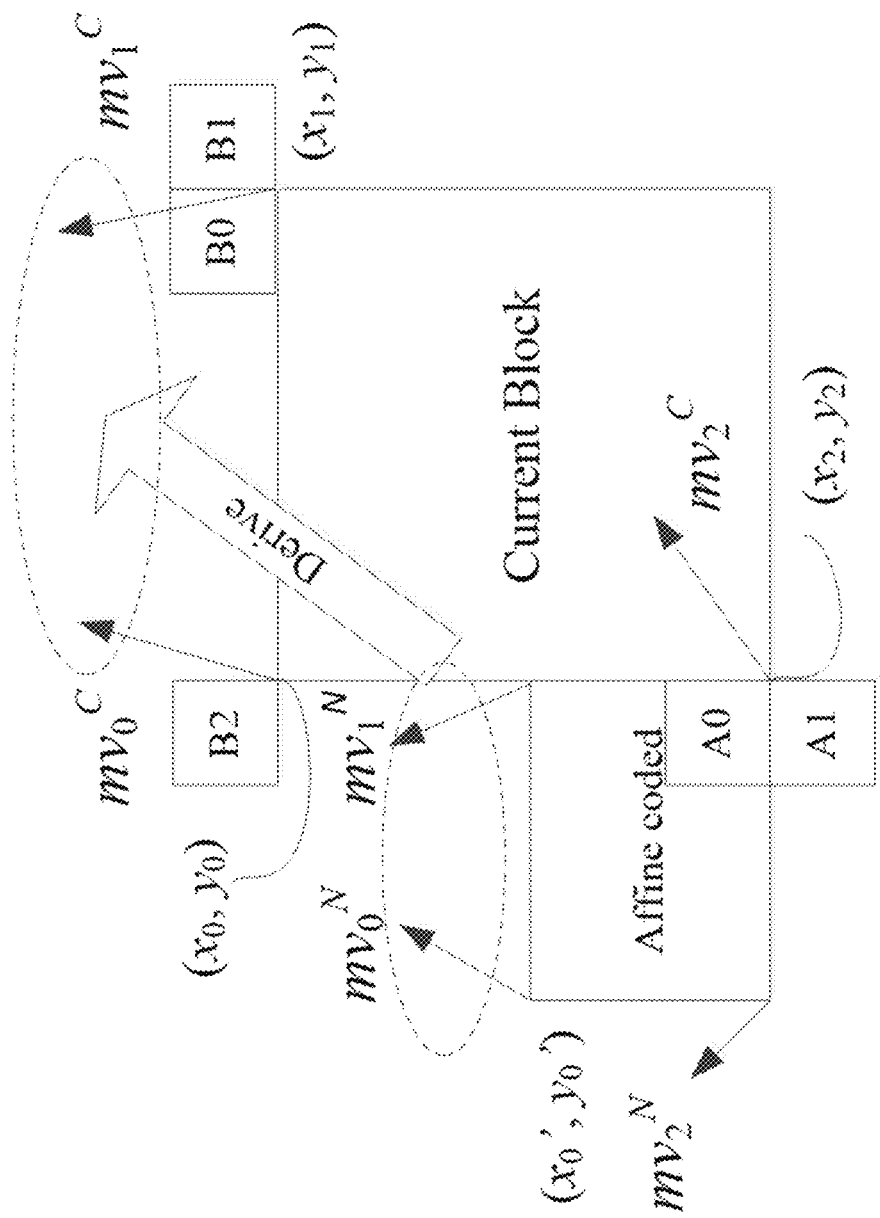

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
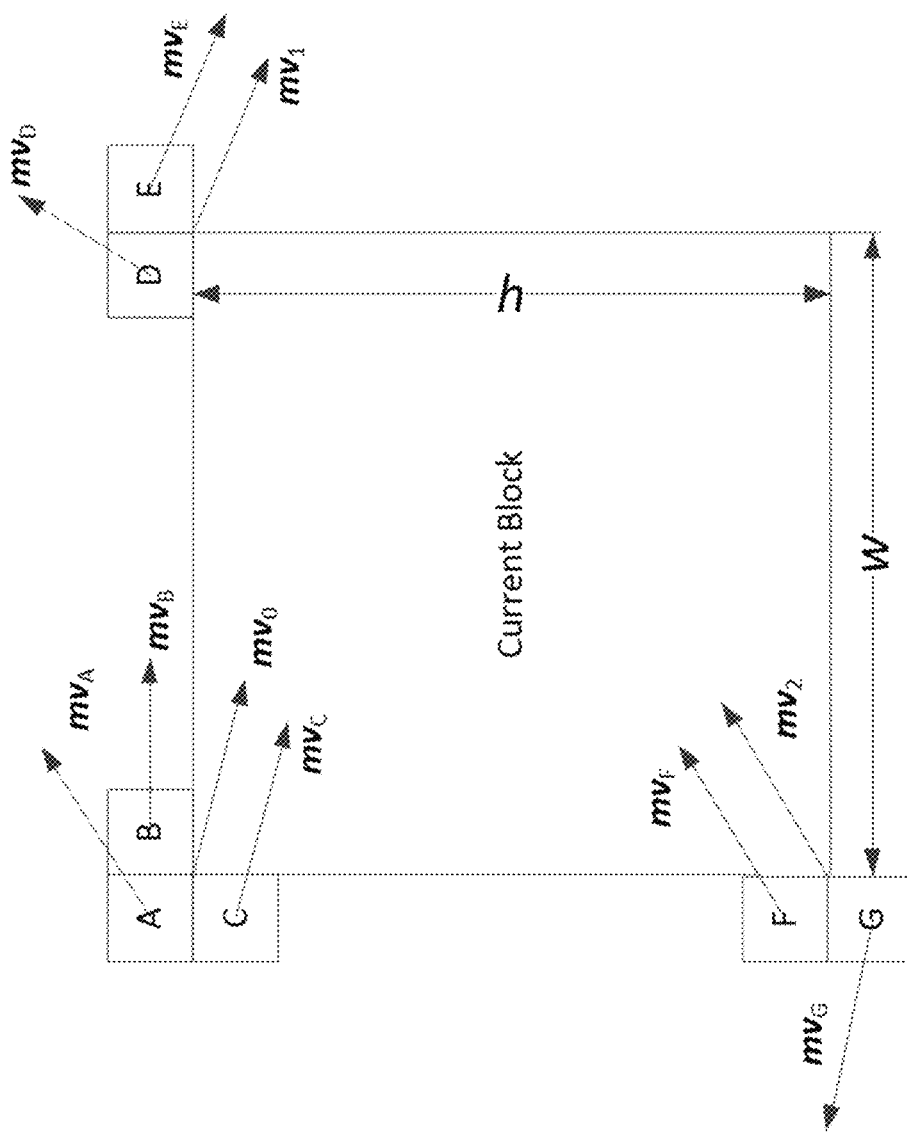
FIG. 17 shows an example of motion vector prediction for AF_INTER for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.

2) Derive an affine motion predictor by setting all CPMVs equal to $\overline{mv}_1$ if available.

3) Derive an affine motion predictor by setting all CPMVs equal to $\overline{mv}_0$ if available.

4) Derive an affine motion predictor by setting all CPMVs equal to HEVC TMVP if available.

5) Derive an affine motion predictor by setting all CPMVs to zero MV.

Note that $\overline{mv}_i$ is already derived in constructed affine motion predictor.

Figure 15B:
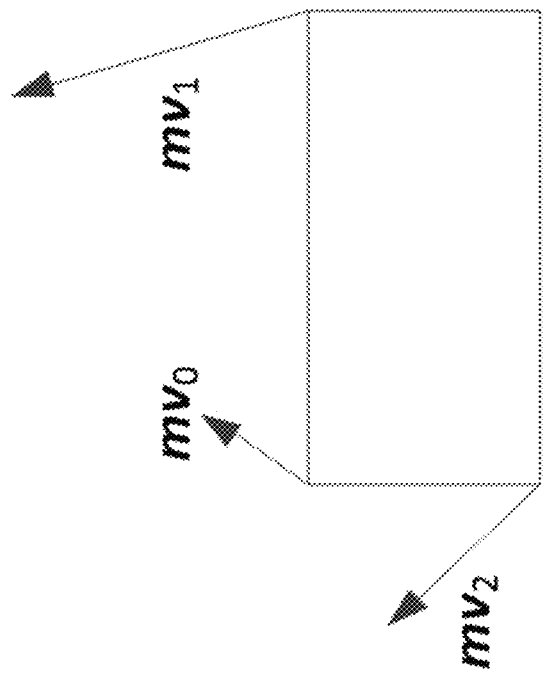
FIGS. 15A and 15B show examples of the 4-parameter and 6-parameter affine models, respectively.
Figure 15A:
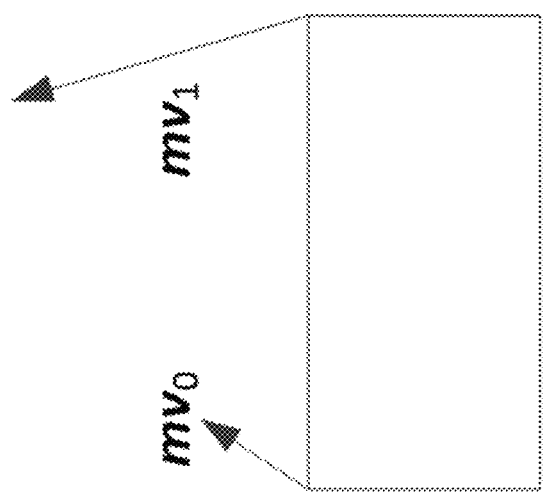

In AF_INTER mode, when 4/6 parameter affine mode is used, 2/3 control points are required, and therefore 2/3 MVD needs to be coded for these control points, as shown in FIGS. 15A and 15B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.3.3.3 Examples of AF_MERGE Mode

When a CU is applied in AF_MERGE mode, it gets the first block coded with an affine mode from the valid neighboring reconstructed blocks. And the selection order for the candidate block is from left, above, above right, left bottom to above left as shown in FIG. 18A (denoted by A, B, C, D, E in order). For example, if the neighbour left bottom block is coded in affine mode as denoted by A0 in FIG. 18B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU v0 and v1 are computed according to the affine motion model in Eqs. (1) and (2), the MVF of the current CU can be generated. In order to identify whether the current CU is coded with AF_MERGE mode, an affine flag can be signaled in the bitstream when there is at least one neighboring block is coded in affine mode.

In some embodiments (e.g., JVET-L0142 and JVET-L0632), an affine merge candidate list may be constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 19:
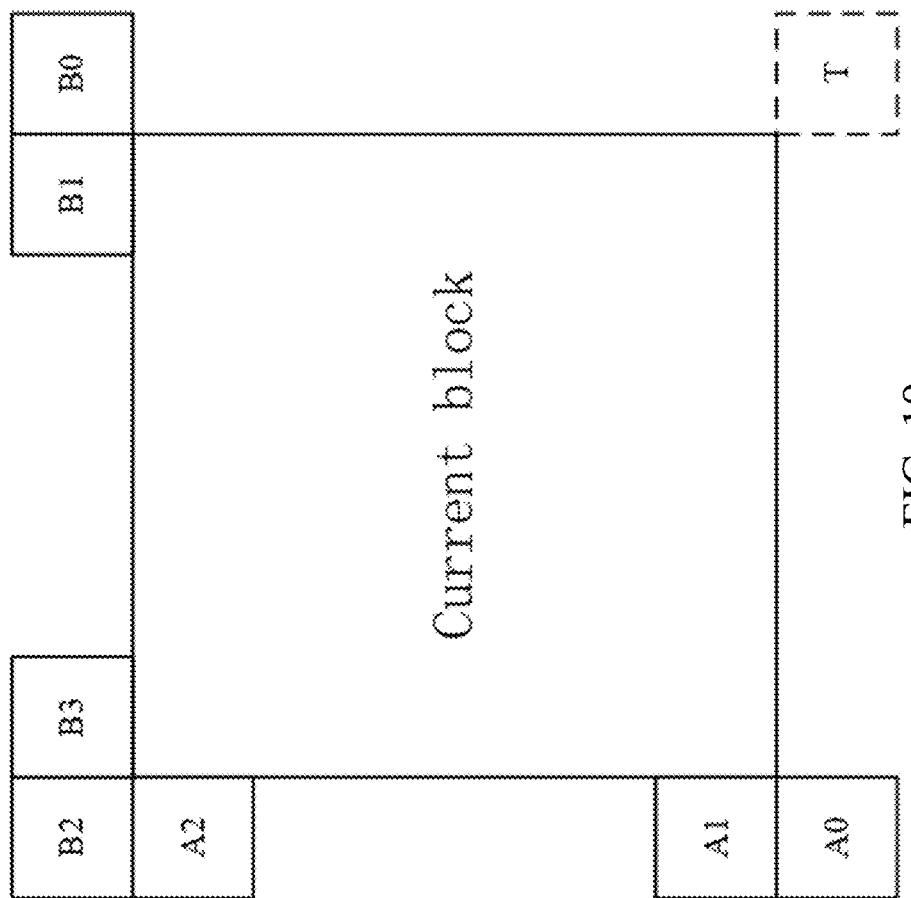
FIG. 19 shows an example of candidate positions for affine merge mode.
Figure 20:
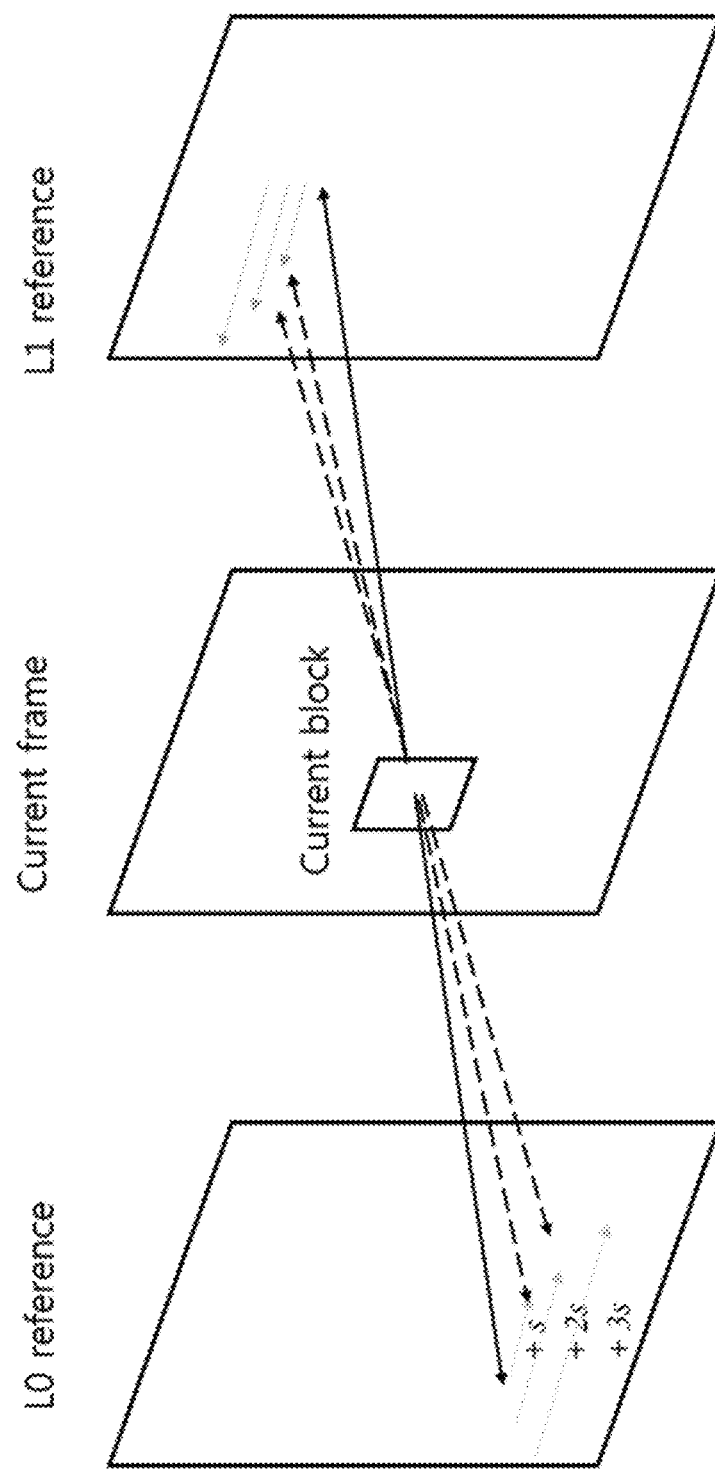
FIG. 20 shows an example of an UMVE search process.
Figure 21:
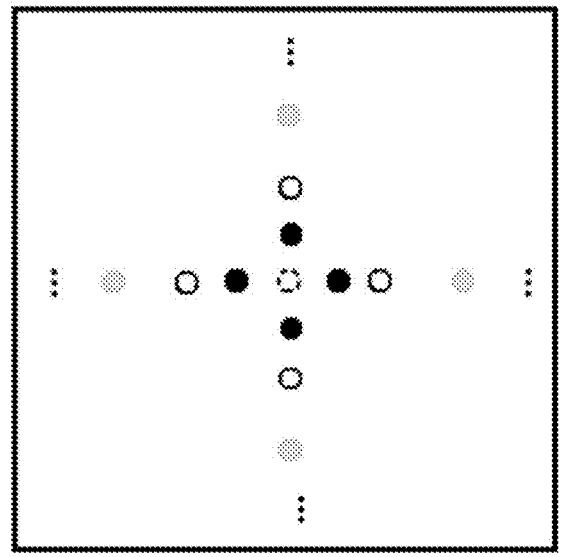
FIG. 21 shows an example of an UMVE search point.
Figure 21:
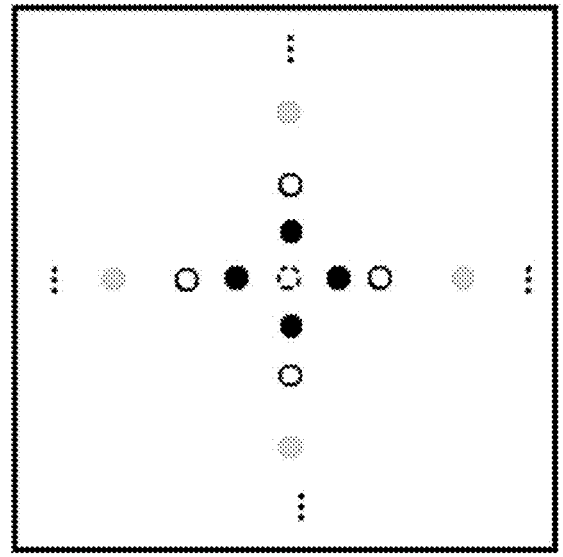

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

b) Secondly, the combinations of controls points are used to construct an affine merge candidate.
  I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.
  II. Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.
  III. The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4} i. For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.3.4 Examples of Merge with Motion Vector Differences (MMVD)

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| | Base candidate IDX | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| | Distance IDX | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| | Direction IDX | | | |
|---|---|---|---|---|
| Direction IDX | 00 | 01 | 10 | 11 |
| x-axis | + | − | N/A | N/A |
| y-axis | N/A | N/A | + | − |

In some embodiments, the UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

2.3.5 Examples of Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 22:
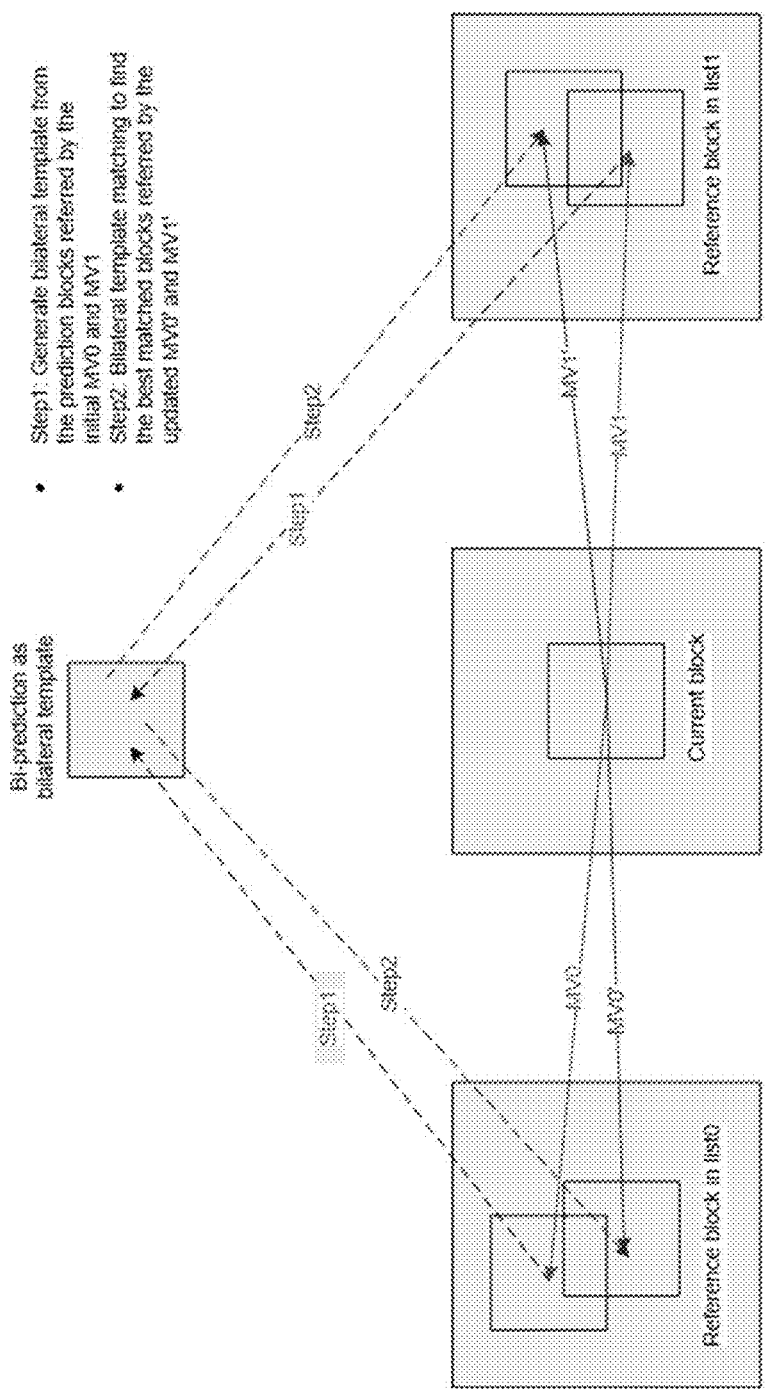
FIG. 22 shows an example of decoder side motion vector refinement (DMVR) based on bilateral template matching.

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 22. The bilateral template is generated as the weighted combination (i.e. average) of the two prediction blocks, from the initial MV0 of list0 and MV1 of list1, respectively, as shown in FIG. 22. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 22, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

To further simplify the process of DMVR, JVET-M0147 proposed several changes to the design in JEM. More specifically, the adopted DMVR design to VTM-4.0 (to be released soon) has the following main features:

Early termination w/(0,0) position SAD between list0 and list1

Block sizes for DMVR W*H>=64 && H>=8

Split the CU into multiple of 16×16 sub-blocks for DMVR of CU size >16*16

Reference block size (W+7)*(H+7) (for luma)

25 points SAD-based integer-pel search (i.e. (+−) 2 refinement search range, single stage)

Bilinear-interpolation based DMVR

MVD mirroring between list0 and list1 to allow bilateral matching

"Parametric error surface equation" based sub-pel refinement

Luma/chroma MC w/reference block padding (if needed)

Refined MVs used for MC and TMVPs only 2.3.6 Examples of Combined Intra and Inter Prediction (CIIR)

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true.

For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as $(w\_intra_i, w\_inter_i)$, where i is from 1 to 4 and $(w\_intra_1, w\_inter_1)=(6, 2)$, $(w\_intra_2, w\_inter_2)=(5, 3)$, $(w\_intra_3, w\_inter_3)=(3, 5)$, and $(w\_intra_4, w\_inter_4)=(2, 6)$, will be applied to a corresponding region. $(w\_intra_i, w\_inter_i)$ is for the region closest to the reference samples and $(w\_intra_4, w\_inter_4)$ is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.4 In-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r=FwdLUT[Y_i]$. The other LUT is an inverse LUT, InvLUT, that maps altered code values $Y_r$ to $\hat{Y}_i$: $\hat{Y}_i=InvLUT[\hat{Y}_r]$. ($\hat{Y}_i$ represents the reconstruction values of $Y_i$.)

2.4.1 Piece-Wise Linear (PWL) Model

In some embodiments, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2FP\_PREC-1)>>FP\_PREC)+c$$

where m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.4.2 Test CE12-2

2.4.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 23:
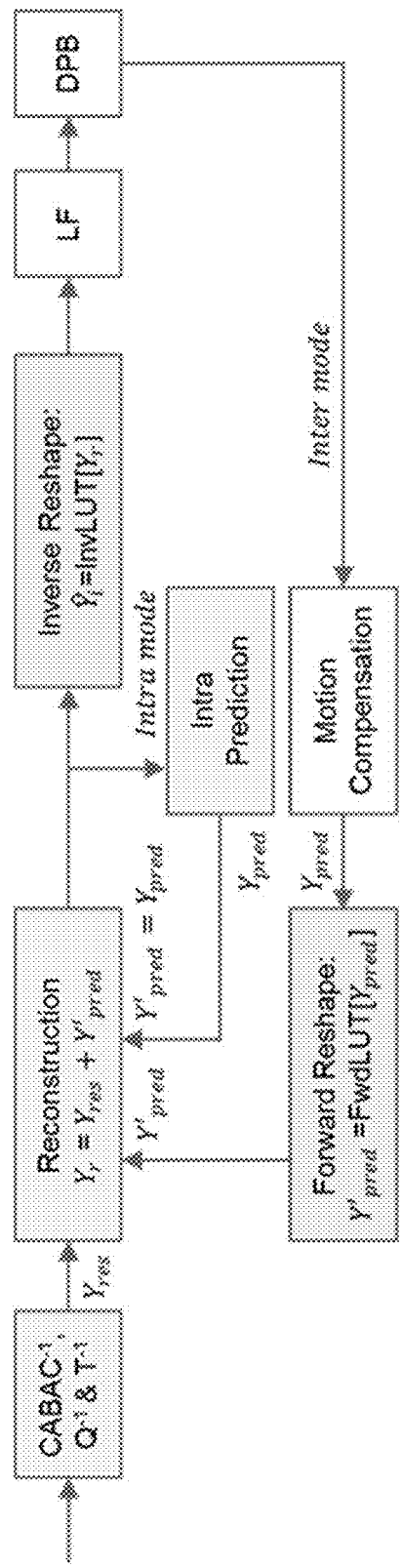
FIG. 23 shows an exemplary flowchart of a decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 23 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (light-green shaded blocks indicate signal in reshaped domain: luma residue; intra luma predicted; and intra luma reconstructed).

2.4.2.2 Luma-Dependent Chroma Residue Scaling (LCRS)

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

2.4.2.3 Signaling of ILR Side Information

The parameters are (currently) sent in the tile group header (similar to ALF). These reportedly take 40-100 bits. A tile group can be another way to represent a picture. The following table is based on version 9 of JVET-L1001. The added syntax is highlighted in italics.

In 7.3.2.1 Sequence parameter set RBSP syntax

|  | Descriptor |
|---|---|
| seq_parameter_set_rbsp( ) { |  |
|     sps_seq_parameter_set_id | ue(v) |
|     ... |  |
|     sps_triangle_enabled_flag | u(1) |
|     sps_ladf_enabled_flag | u(1) |
|     if ( sps_ladf_enabled_flag ) { |  |
|         sps_num_ladf_intervals_minus2 | u(2) |
|         sps_ladf_lowest_interval_qp_offset | se(v) |
|         for( i = 0; i < sps_num_ladf_intervals_minus2 + 1; i++ ) { |  |
|             sps_ladf_qp_offset[ i ] | se(v) |
|             sps_ladf_delta_threshold_minus1[ i ] | ue(v) |
|         } |  |
|     } |  |
|     *sps_reshaper_enabled_flag* | *u(1)* |
|     rbsp_trailing_bits( ) |  |
| } |  |

In 7.3.3.1 General tile group header syntax

|  | Descriptor |
|---|---|
| tile_group_header( ) { |  |
|     ... |  |
|     if( num_tiles_in_tile_group_minus1 > 0 ) { |  |
|         offset_len_minus1 | ue(v) |
|         for( i = 0; i < num_tiles_in_tile_group_minus1; i++ ) |  |
|             entry_point_offset_minus1[ i ] | u(v) |
|     } |  |
|     *if ( sps_reshaper_enabled_flag ) {* |  |
|         *tile_group_reshaper_model_present_flag* | *u(1)* |
|         *if ( tile_group_reshaper_model_present_flag )* |  |
|             *tile_group_reshaper_model ( )* |  |
|         *tile_group_reshaper_enable_flag* | *u(1)* |
|         *if ( tile_group_reshaper_enable_flag && (!( qtbtt_dual_tree_intra_flag && tile_group_type = = I ) ) )* |  |
|             *tile_group_reshaper_chroma_residual_scale_flag* | *u(1)* |
|     *}* |  |
|     byte_alignment( ) |  |
| } |  |

Add a new syntax table tile group reshaper model:

| | Descriptor |
|---|---|
| *tile_group_reshaper_model* ( ) { | |
|     *reshaper_model_min_bin_idx* | ue(v) |
|     *reshaper_model_delta_max_bin_idx* | ue(v) |
|     reshaper_model_bin_delta_abs_cw_prec_minus1 | ue(v) |
|     *for ( i = reshaper_model_min_bin_idx; i <= reshaper_model_max_bin_idx; i++ ) {* | |
|         reshape_model_bin_delta_abs_CW[ i ] | u(v) |
|         *if ( reshaper_model_bin_delta_abs_CW[ i ] ) > 0 )* | |
|             reshaper_model_bin_delta_sign_CW_flag[ i ] | u(1) |
|     } | |
| } | |

In General sequence parameter set RBSP semantics, add the following semantics:
sps_reshaper_enabled_flag equal to 1 specifies that reshaper is used in the coded video sequence (CVS). sps_reshaper_enabled_flag equal to 0 specifies that reshaper is not used in the CVS.
In tile group header syntax, add the following semantics tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
Add tile_group_reshaper_model( ) syntax
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx—reshape_model_delta_max_bin_idx.
reshaper_model_bin_delta_abs_cw_prec_minus1 plus 1 specifies the number of bits used for the representation of the syntax reshape_model_bin_delta_abs_CW[i].
reshape_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:
    If reshape_model_bin_delta_sign_CW_flag[i] is equal to 0, the corresponding variable RspDeltaCW[i] is a positive value.
    Otherwise (reshape_model_bin_delta_sign_CW_flag[i] is not equal to 0), the corresponding variable RspDeltaCW[i] is a negative value.
When reshape_model_bin_delta_sign_CW_flag[i] is not present, it is inferred to be equal to 0.
The variable RspDeltaCW[i] (1 2*reshape_model_bin_delta_sign_CW [i])*reshape_model_bin_delta_abs_CW [i];
The variable RspCW[i] is derived as following steps:
The variable OrgCW is set equal to $(1<<BitDepth_Y)/(MaxBinIdx+1)$.
    If
        reshaper_model_min_bin_idx<=i<=reshaper_model_max_bin_idx
        RspCW[i]=OrgCW+RspDeltaCW[i].
    Otherwise, RspCW[i]=0.
The value of RspCW [i] shall be in the range of 32 to 2*OrgCW−1 if the value of $BitDepth_Y$ is equal to 10.
The variables InputPivot[i] with i in the range of 0 to MaxBinIdx+1, inclusive are derived as follows InputPivot[i]=i*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shift Y = 14
ReshapePivot[ 0 ] = 0;
for( i = 0; i <= MaxBinIdx ; i++) {
    ReshapePivot[ i + 1 ] = ReshapePivot[ i ] + RspCW[ i ]
    ScaleCoef[ i ] = ( RspCW[ i ] * (1 << shiftY) + (1 << (Log2(OrgCW) − 1))) >> (Log2(OrgCW))
    if ( RspCW[ i ] == 0 )
        InvScaleCoeff[ i ] = 0
    else
        InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:

ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC = 11
- if ( RspCW[ i ] == 0 )
  ChromaScaleCoef [ i ] = (1 << shiftC)
- Otherwise (RspCW[ i ] != 0), ChromaScaleCoef[ i ] = ChromaResidualScaleLut[RspCW[ i ] >> 1]

2.4.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual is generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:

Current block is intra-coded

Current block is coded as CPR (current picture referencing, aka intra block copy, IBC)

Current block is coded as combined inter-intra mode (CIIP) and the forward reshaping is disabled for the intra prediction block

JVET-N0805

To avoid signaling the side information of ILR in tile group header, in JVET-N0805, it is proposed to signal them in APS. It includes the following main ideas:

Optionally send LMCS parameters in the SPS. LMCS refers to a luma mapping with chroma scaling (LMCS) techniques as defined in relevant video coding standards.

Define APS types for ALF and LMCS parameters. Each APS has only one type.

Send LMCS parameters in APS

If LMCS tool enabled, have a flag in the TGH to indicate that LMCS aps_id is present or not. If not signaled, the SPS parameters are used.

*Need to add semantic constraint to always have something valid that is referred to when tool enabled.

2.5.2.5.1 Implementation of the Suggested Design on Top of JVET-M1001 (VVC Working Draft 4)

In the below, the suggested changes are shown in Italic and the double brackets are placed before and after the text deleted.

| | Descriptor |
|---|---|
| seq_parameter_set_rbsp( ) { | |
| ... | |
| sps_lmcs_enabled_flag | u(1) |

-continued

| | Descriptor |
|---|---|
| if( sps_lmcs_enabled_flag ) { | |
| *sps_lmcs_default_model_present_flag* | u(1) |
| if( sps_lmcs_default_model_present_flag ) | |
| lmcs_data( ) | |
| ... | |
| } | | sps_lmcs_enabled_flag equal to 1 specifies that luma mapping with chroma scaling is used in the coded video sequence (CVS). sps_lmcs_enabled_flag equal to 0 specifies that luma mapping with chroma scaling is not used in the CVS.

sps_lmcs_default_model_present_flag equal to 1 specifies that default lmcs data is present in this SPS. sps_lmcs_default_modeljlag equal to 0 specifies that default lmcs data is not present in this SPS. When not present, the value of sps_lmcs_default_model_presentjlag is inferred to be equal to 0.

| | Descriptor |
|---|---|
| adaptation_parameter_set_rbsp( ) { | |
| adaptation_parameter_set_id | u(5) |
| *aps_params_type* | u(3) |
| if( aps_params_type = = ALF_APS ) // 0 | |
| alf_data( ) | |
| else if ( aps_params_type = = LMCS_APS ) // 1 | |
| lmcs_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | | aps_params_type specifies the type of APS parameters carried in the APS as specified in the following table:

TABLE 7-x

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 . . . 7 | Reserved | Reserved |

|  | Descriptor |
|---|---|
| tile_group_header( ) { |  |
| ... |  |
| if( sps_alf_enabled_flag ) { |  |
|     tile_group_alf_enabled_flag | u(1) |
|     if( tile_group_alf_enabled_flag ) |  |
|         tile_group_alf_aps_id | u(5) |
| } |  |
| ... |  |
| if( sps_lmcs_enabled_flag) { |  |
|     [[tile_group_reshaper_model_present_flag | ~~u(1)~~ |
|     if(tile_group_reshaper_model_present_flag ) |  |
|         tile_group_reshaper_model ( )]] |  |
|     tile_group_lmcs_enable_flag | u(1) |
|     if( tile_group_lmcs_enable_flag ) { |  |
|         if( sps_lmcs_default_model_present_flag ) |  |
|             *tile_group_lmcs_use_default_model_flag* | *u(1)* |
|         if( !tile_group_lmcs_use_default_model_flag ) |  |
|             *tile_group_lmcs_aps_id* | *u(5)* |
|         if( !( qtbtt_dual_tree_intra_flag && tile_group_type = = I ) ) |  |
|         [[if( tile_group_reshaper_enable_flag && ( ! ( qtbtt_dual_tree_intra_flag && tile_group_type = = I ) ) ]] |  |
|             tile_group_chroma_residual_scale_flag | u(1) |
|     } |  |
| } |  |
| ... |  |
| if( NumTilesInCurrTileGroup > 1 ) { |  |
|     offset_len_minus1 | ue(v) |
|     for( i = 0; i < NumTilesInCurrTileGroup − 1; i++ ) |  |
|         entry_point_offset_minus1[ i ] | u(v) |
| } |  |
| byte_alignment( ) |  |
| } |  |

Adding the following definitions to clause 3:
ALF APS: An APS that has aps_params_type equal to ALF_APS.
LMCS APS: An APS that has aps_params_type equal to LMCS_APS.
Make the following semantics changes:
tile_group_alf_aps_id specifies the adaptation_parameter_set_id of the ALF APS that the tile group refers to. The TemporalId of the ALF APS NAL unit having adaptation_parameter_set_id equal to tile_group_alf_aps_id shall be less than or equal to the TemporalId of the coded tile group NAL unit.
When multiple ALF APSs with the same value of adaptation_parameter_set_id are referred to by two or more tile groups of the same picture, the multiple ALF APSs with the same value of adaptation_parameter_set_id shall have the same content.
[[tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.]]
tile_group_lmcs_enabled_flag equal to 1 specifies that luma mapping with chroma scaling is enabled for the current tile group. tile_group_lmcs_enabled_flag equal to 0 specifies that luma mapping with chroma scaling is not enabled for the current tile group. When tile_group_lmcs_enable_flag is not present, it is inferred to be equal to 0.
tile_group_lmcs_use_default_model_flag equal to 1 specifies that luma mappin with chroma scaling operation for the tile group uses default lmcs model. tile_group_lmcs_use_default_model_flag equal to 0 specifies that that luma mappin with chroma scaling operation for the tile group uses lmcs model in the LMCS APS referred to by tile_group_lmcs_aps_id. When tile_group_reshaper_use_default_model_flag is not present, it is inferred to be equal to 0.
tile_group_lmcs_aps_id specifies the adaptation_parameter_set_id of the LMCS APS that the tile group refers to. The TemporalId of the LMCS APS NAL unit having adaptation_parameter_set_id equal to tile_group_lmcs_aps_id shall be less than or equal to the TemporalId of the coded tile group NAL unit.
When multiple LMCS APSs with the same value of adaptation_parameter_set_id are referred to by two or more tile groups of the same picture, the multiple LMCS APSs with the same value of adaptation_parameter_set_id shall have the same content.
tile_group_chroma_residual_scale_flag equal to 1 specifies that chroma residual scaling is enabled for the current tile group. tile_group_chroma_residual_scale_flag equal to 0 specifies that chroma residual scaling is not enabled for the current tile group. When tile_group_chroma_residual_scale_flag is not present, it is inferred to be equal to 0.

2.4.2.6 JVET-N0138

This contribution proposes extended usage of adaptation parameter set (APS) for carriage of reshaper model parameters as well as ALF parameters. In the last meeting, it is decided for ALF parameters to be carried by APS instead of tile group header for coding efficiency improvement by avoiding unnecessary redundant signaling of parameters in multiple tile groups. Based on the same reason, it is proposed to carry reshaper model parameters by APS instead of tile group header. To identify the type of parameters in the APS (whether ALF or reshaper model at least), APS type information is required in APS syntax as well as APS ID.

Adaptation Parameter Set Syntax and Semantics

In the below, the suggested changes are shown in Italic.

|  | Descriptor |
|---|---|
| adaptation_parameter_set_rbsp( ) { |  |
|     adaptation_parameter_set_id | u(5) |
|     *adaptation_parameter_set_type* | *u(1)* |
|     if( adaptation_parameter_set_type == 0 ) |  |
|         alf_data( ) |  |
|     else |  |
|         reshaper_model( ) |  |
|     aps_extension_flag | u(1) |
|     if( aps_extension_flag ) |  |
|         while( more_rbsp_data( ) ) |  |
|             aps_extension_data_flag | u(1) |
|     rbsp_trailing_bits( ) |  |
| } |  | adaptation_parameter_set_type identifies the type of parameters in APS. The value of adaptation_parameter_set_type shall be in the range of 0 to 1, inclusive. If adaptation_parameter_set_type is equal to 0, the ALF parameters are signaled. Otherwise, reshaper model parameters are signaled.

General Tile Group Header Syntax and Semantics

|  | Descriptor |
|---|---|
| tile_group_header( ) { |  |
|     ... |  |
|     if ( sps_reshaper_enabled_flag ) { |  |
|         tile_group_reshaper_model_present_flag | u(1) |
|         if ( tile_group_reshaper_model_present_flag ) |  |
|             [[tile_group_reshaper_model ( )]] *tile_group_aps_id* |  |
|         tile_group_reshaper_enable_flag | u(1) |
|         if (tile_group_reshaper_enable_flag && (!( qtbtt_dual_tree_intra_flag && tile_group_type == I ) ) ) |  |
|             tile_group_reshaper_chroma_residual_scale_flag | u(1) |
|     } |  |
|     ... |  |
| } |  |

2.5 Virtual Pipelining Data Units (VPDU)

Virtual pipeline data units (VPDUs) are defined as non-overlapping M×M-luma(L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEVC.

However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

2.6 Adaptation Parameter Set

An Adaptation Parameter Set (APS) is adopted in VVC to carry ALF parameters. The tile group header contains an aps_id which is conditionally present when ALF is enabled. The APS contains an aps_id and the ALF parameters. A new NUT (NAL unit type, as in AVC and HEVC) value is assigned for APS (from JVET-M0132). For the common test conditions in VTM-4.0 (to appear), it is suggested just using aps_id=0 and sending the APS with each picture. For now, the range of APS ID values will be 0.31 and APSs can be shared across pictures (and can be different in different tile groups within a picture). The ID value should be fixed-length coded when present. ID values cannot be re-used with different content within the same picture.

2.7 Related Tools

2.7.1 Diffusion Filter (DF)

In JVET-L0157, diffusion filter is proposed, wherein the intra/inter prediction signal of the CU may be further modified by diffusion filters.

Uniform diffusion filter. The Uniform Diffusion Filter is realized by convolving the prediction signal with a fixed mask that is either given as $h^I$ or as $h^{IV}$, defined below. Besides the prediction signal itself, one line of reconstructed samples left and above of the block are used as an input for the filtered signal, where the use of these reconstructed samples can be avoided on inter blocks.

Let pred be the prediction signal on a given block obtained by intra or motion compensated prediction. In order to handle boundary points for the filters, the prediction signal needs to be extended to a prediction signal $pred_{ext}$. This extended prediction can be formed in two ways:

Either, as an intermediate step, one line of reconstructed samples left and above the block are added to the prediction signal and then the resulting signal is mirrored in all directions. Or only the prediction signal itself is mirrored in all directions. The latter extension is used for inter blocks. In this case, only the prediction signal itself comprises the input for the extended prediction signal $pred_{ext}$.

If the filter $h^I$ is to be used, it is proposed to replace the prediction signal pred by $$h^I * pred,$$

using the aforementioned boundary extension. Here, the filter mask $h^I$ is given as $$h^I = (0.25)^4 \begin{pmatrix} 0 & 0 & 0 & 0 & 1 & 0 & 0 & 0 & 0 \\ 0 & 0 & 0 & 4 & 0 & 4 & 0 & 0 & 0 \\ 0 & 0 & 6 & 0 & 16 & 0 & 6 & 0 & 0 \\ 0 & 4 & 0 & 24 & 0 & 24 & 0 & 4 & 0 \\ 1 & 0 & 16 & 0 & 36 & 0 & 16 & 0 & 1 \\ 0 & 4 & 0 & 24 & 0 & 24 & 0 & 4 & 0 \\ 0 & 0 & 6 & 0 & 16 & 0 & 6 & 0 & 0 \\ 0 & 0 & 0 & 4 & 0 & 4 & 0 & 0 & 0 \\ 0 & 0 & 0 & 1 & 1 & 0 & 0 & 0 & 0 \end{pmatrix}.$$

If the filter $h^{IV}$ is to be used, it is proposed to replace the prediction signal pred by $$h^{IV} * pred$$

Here, the filter $h^{IV}$ is given as $$h^{IV} = h^I * h^I * h^I * W.$$

Directional diffusion filter. Instead of using signal adaptive diffusion filters, directional filters, a horizontal filter $h^{hor}$ and a vertical filter $h^{ver}$, are used which still have a fixed mask. More precisely, the uniform diffusion filtering corresponding to the mask $h^I$ of the previous section is simply restricted to be either applied only along the vertical or along the horizontal direction. The vertical filter is realized by applying the fixed filter mask $$h_{ver} = (0.5)^4 \begin{pmatrix} 1 \\ 0 \\ 4 \\ 0 \\ 6 \\ 0 \\ 4 \\ 0 \\ 1 \end{pmatrix}$$

to the prediction signal and the horizontal filter is realized by using the transposed mask $h_{hor} = h_{ver}^t$.

2.7.2 Bilateral Filter (BF)

Bilateral filter is proposed in JVET-L0406, and it is always applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

The filtering process is defined as:

$$P'_{0,0} = P'_{0,0} + \sum_{k=1}^{K} W_k(\text{abs}(P_{k,0} - P_{0,0})) \times (P_{k,0} - P_{0,0}). \quad (1)$$

Figure 24:
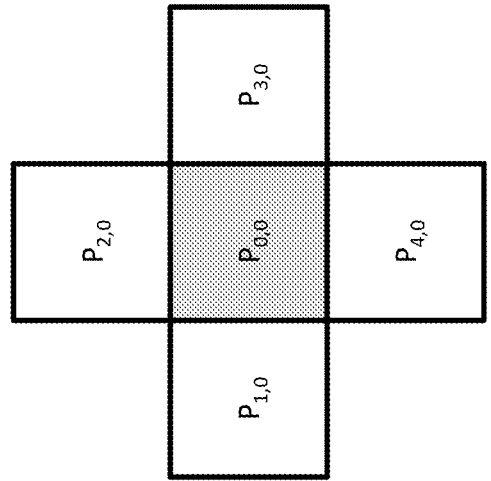
FIG. 24 shows an example of neighboring samples utilized in a bilateral filter.

Herein, $P_{0,0}$ is the intensity of the current sample and $P'_{0,0}$ is the modified intensity of the current sample, $P_{k,0}$ and $W_k$ are the intensity and weighting parameter for the k-th neighboring sample, respectively. An example of one current sample and its four neighboring samples (i.e., K=4) is depicted in FIG. 24.

More specifically, the weight $W_k(x)$ associated with the k-th neighboring sample is defined as follows:

$$W_k(x) = \text{Distance}_k \times \text{Range}_k(x). \quad (2)$$

Herein, $$\text{Distance}_k = e^{\left(-\frac{10000}{2\sigma_d^2}\right)} / 1 + 4 * e^{\left(-\frac{10000}{2\sigma_d^2}\right)} \text{ and}$$

$$\text{Range}_k(x) = e^{\left(-\frac{x^2}{8*(QP-17)*(QP-17)}\right)}.$$

Herein, $\sigma_d$ is dependent on the coded mode and coding block sizes. The described filtering process is applied to intra-coded blocks, and inter-coded blocks when TU is further split, to enable parallel processing.

To better capture statistical properties of video signal, and improve performance of the filter, weights function resulted from Equation (2) are being adjusted by the $\sigma_d$ parameter, tabulated in Table 4 as being dependent on coding mode and parameters of block partitioning (minimal size).

TABLE 4

Value of for $\sigma_d$ different block sizes and coding modes

| Min(block width, block height) | Intra mode | Inter mode |
|---|---|---|
| 4 | 82 | 62 |
| 8 | 72 | 52 |
| Other | 52 | 32 |

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P'_{0,0} = P'_{0,0} + \sum_{k=1}^{N} W_k \left( \frac{1}{M} \sum_{m=-M/2}^{M/2} \text{abs}(P_{k,m} - P_{0,m}) \right) \times (P_{k,0} - P_{0,0}) \quad (4)$$

Figures 25, 26:
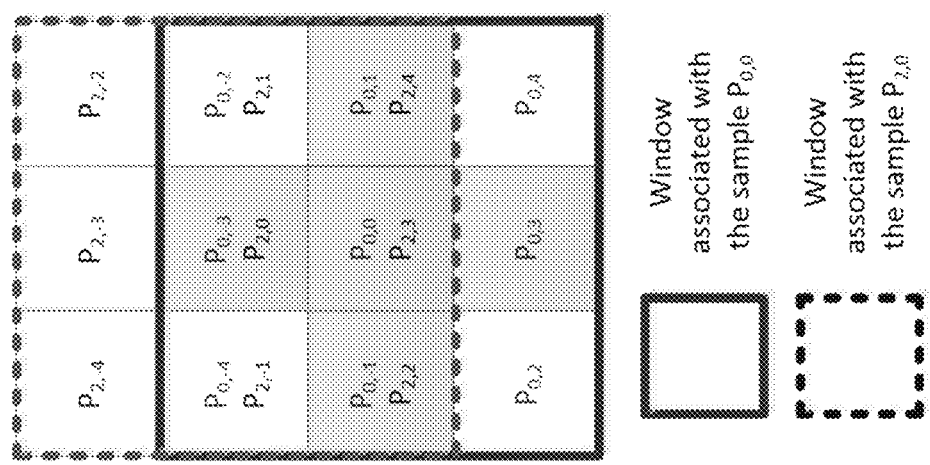
FIG. 25 shows an example of windows covering two samples utilized in weight calculations.
FIG. 26 shows an example of a scan pattern.

Herein, $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 25.

2.7.3 Hadamard Transform Domain Filter (HF)

In JVET-K0068, in-loop filter in 1D Hadamard transform domain which is applied on CU level after reconstruction and has multiplication free implementation. Proposed filter is applied for all CU blocks that meet the predefined condition and filter parameters are derived from the coded information.

Proposed filtering is always applied to luma reconstructed blocks with non-zero transform coefficients, excluding 4×4 blocks and if slice quantization parameter is larger than 17.

The filter parameters are explicitly derived from the coded information. Proposed filter, if applied, is performed on decoded samples right after inverse transform.

For each pixel from reconstructed block pixel processing comprises the following steps:
- Scan 4 neighboring pixels around processing pixel including current one according to scan pattern
- 4 point Hadamard transform of read pixels
- Spectrum filtering based on the following formula:

$$F(i, \sigma) = \frac{R(i)^2}{R(i)^2 + \sigma^2} * R(i)$$

Herein, (i) is index of spectrum component in Hadamard spectrum, R(i) is spectrum component of reconstructed pixels corresponding to index, σ is filtering parameter deriving from codec quantization parameter QP using following equation:

$$\sigma = 2^{(1+0.126*(QP-27))}.$$

The example of scan pattern is shown in FIG. 26, wherein A is the current pixel and {B,C,D} are surrounding pixels.

For pixels laying on CU boundary, the scan pattern is adjusted ensuring all required pixels are within current CU.

3 Drawbacks of Existing Implementations

In existing ILR implementations, the following drawbacks may exist:
1) Signaling of ILR side information at tile group header is not proper since it requires too many bits. In addition, prediction among different pictures/tile groups is disallowed. Therefore, for each tile group, the side information of ILR need to be transmitted which may cause coding loss under low bitrates, especially for low resolution.
2) Interaction between ILR and DMVR (or other newly introduced coding tools) is unclear. For example, ILR is applied to the inter-prediction signal to convert the original signal to the reshaped domain and decoded residuals are in the reshaped domain. While DMVR also relies on the prediction signal to refine motion vectors for one block. Whether to apply DMVR in original domain or the reshaped domain is unclear.
3) Interaction between ILR and screen content coding tools, e.g. palette, B-DPCM, IBC, transform skip, transquant-bypass, I-PCM modes, is not clear.
4) Luma-dependent chroma residue scaling is used in ILR. Therefore, additional delay (due to dependency between luma and chroma) is introduced which is not beneficial for hardware design.
5) The goal of VPDU is to guarantee completion of the processing of one 64×64 square region before starting the processing of other 64×64 square regions. However, according to the design of ILR, there is no restriction on the usage of ILR which may cause violation of VPDU since chroma relies on the luma's prediction signal.
6) When all zero coefficients happen for one CU, the prediction block and reconstruction block still perform forward and inverse reshaping processes, which waste computational complexity.
7) In JVET-N0138, it is proposed to signal the ILR information in APS. Several new problems may be caused by this solution. For example, Two kinds of APS are designed. But the adaptation_parameter_set_id signaled for ILR may refer to an APS that does not contain ILR information. Similarly, adaptation_parameter_set_id signaled for adaptive loop filtering (ALF) may refer to an APS that does not contain ALF information.

4 Example Methods for In-Loop Reshaping for Video Coding

Embodiments of the presently disclosed technology overcome the drawbacks of existing implementations, thereby providing video coding with higher coding efficiencies. The methods of in-loop reshaping, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined. It should be noted that some of the proposed technologies could be applied to existing candidate list construction process.

In this document, decoder side motion vector derivation (DMVD) includes methods like DMVR and FRUC which perform motion estimation to derive or refine the block/sub-block motion information, and BIO which performs sample-wise motion refinement. Various examples (Examples 1 to 42) are provided in a numbered list below.

1. Motion information refinement process in the DMVD technologies, such as DMVR, may depend on information in the reshaped domain.
   a. In one example, the prediction blocks generated from reference pictures in the original domain may be firstly converted to the reshaped domain before being used for motion information refinement.
      i. Alternatively, furthermore, the cost calculations (e.g., SAD, MR-SAD)/gradient calculations are performed in the reshaped domain.
      ii. Alternatively, furthermore, after motion information is refined, the reshaping process is disabled for prediction blocks generated with the refined motion information.
   b. Alternatively, motion information refinement process in the DMVD technologies, such as DMVR, may depend on information in the original domain.
      i. DMVD processes may be invoked with prediction blocks in the original domain.
      ii. In one example, after motion information refinement, the prediction blocks obtained with the refined motion information or the final prediction block (e.g., the weighted average of two prediction blocks) may be further converted to the reshaped domain to generate the final reconstruction block.
      iii. Alternatively, furthermore, after motion information is refined, the reshaping process is disabled for prediction blocks generated with the refined motion information.
2. It is proposed to align the domain for samples in current tile/tile group/picture and samples derived from reference pictures (either both in original domain or reshaped domain) utilized to derive local illumination compensation (LIC) parameters.
   a. In one example, the reshaped domain is utilized to derive LIC parameters.
      i. Alternatively, furthermore, the samples (e.g., reference samples in reference pictures (via interpolation or not) as well as neighboring/non-adjacent samples of the reference samples (via interpolation or not)) may be firstly converted to the reshaped domain before being used to derive LIC parameters.
b. In one example, the original domain is utilized to derive LIC parameters.
   i. Alternatively, furthermore, the spatially neighboring/non-adjacent samples of current block (e.g., in current tile group/picture/tile) may be firstly converted to the original domain before being used to derive LIC parameters.
c. It is proposed that when LIC parameters are derived in one domain, the same domain of prediction blocks should be used when applying LIC parameters to the prediction blocks.
   i. In one example, when bullet a. is invoked, the reference blocks may be converted to the reshaped domain, and LIC model is applied to the reshaped reference blocks.
   ii. In one example, when bullet b. is invoked, the reference blocks are kept in the original domain, and LIC model is applied to the reference blocks in the original domain.
d. In one example, LIC model is applied to the prediction blocks in the reshaped domain (e.g., prediction blocks are firstly converted to the reshaped domain via forward reshaping).
e. In one example, LIC model is firstly applied to the prediction blocks in the original domain, afterwards, the final prediction block dependent on the LIC-applied prediction blocks may be then converted to the reshaped domain (e.g., via forward reshaping) and utilized to derive the reconstruction block.
f. The above methods may be extended to other coding tools which rely on both spatially neighboring/non-adjacent samples and reference samples in reference pictures.

Figure 27:
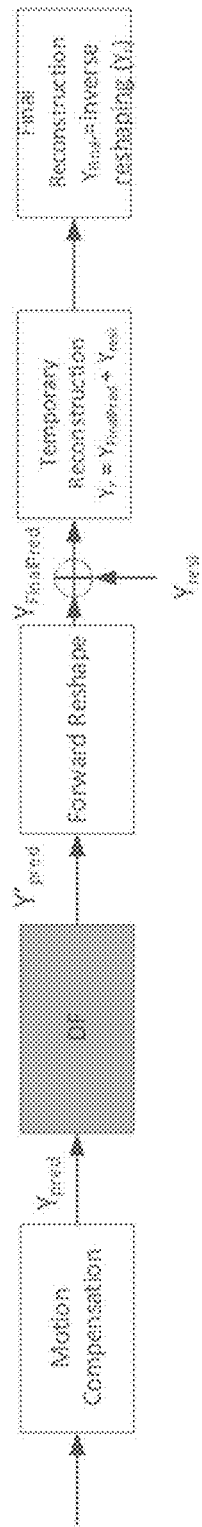
FIG. 27 shows an example of an inter-mode decoding process.
Figure 28:
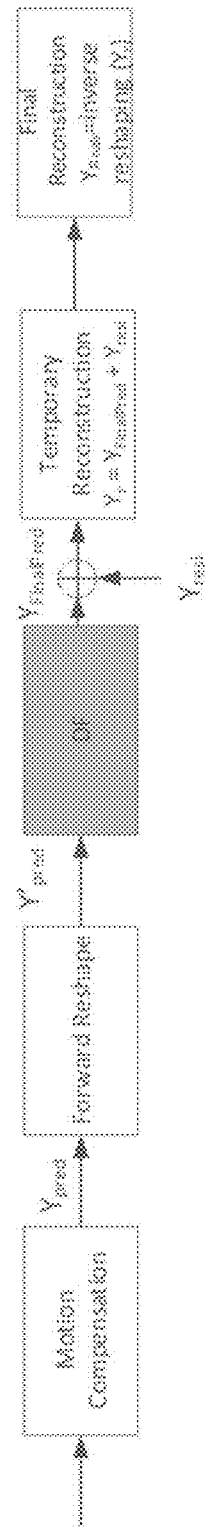
FIG. 28 shows another example of an inter-mode decoding process.

3. For filters applied to prediction signal (such as the Diffusion Filter (DF)), filter is applied to the prediction block in the original domain.
a. Alternatively, furthermore, afterwards, reshaping is applied to the filtered prediction signal to generate the reconstruction block.
b. An example of the process for inter-coding is depicted in FIG. 27.
c. Alternatively, filters are applied to the prediction signal in the reshape domain.
   i. Alternatively, furthermore, reshaping is firstly applied to the prediction block; afterwards, the filtering methods may be further applied to the reshaped prediction block to generate the reconstruction block.
   ii. An example of the process for inter-coding is depicted in FIG. 28.
d. Filter parameters may depend on whether ILR is enabled or not.

Figure 29:
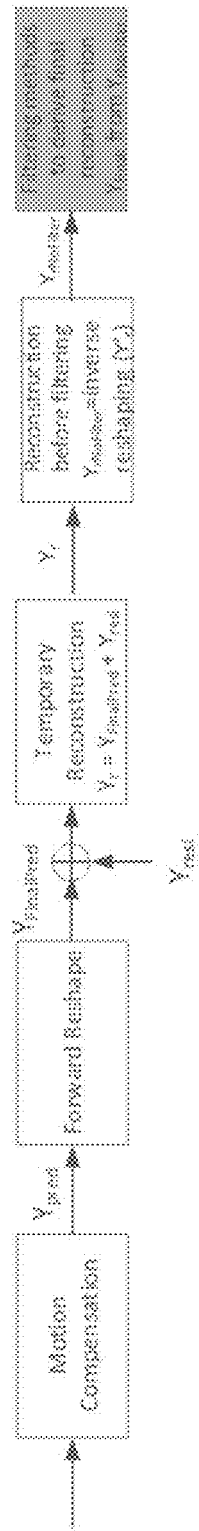
FIG. 29 shows an example of an inter-mode decoding process with post-reconstruction filters.
Figure 30:
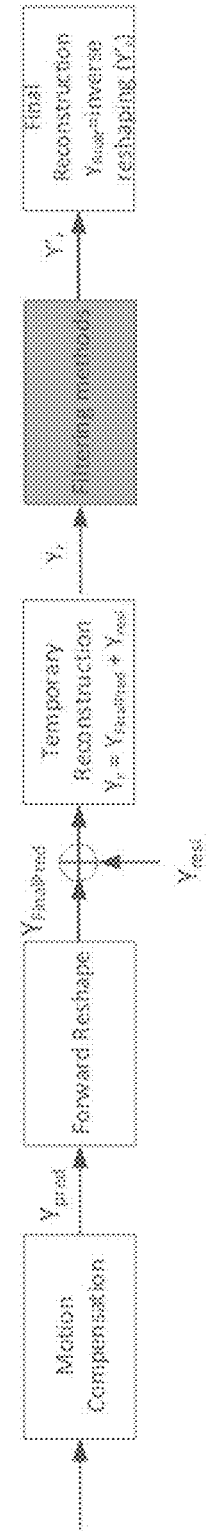
FIG. 30 shows another example of an inter-mode decoding process with post-reconstruction filters.

4. For filters applied to reconstruction blocks (e.g., bilateral filter (BF), Hadamard transform domain filter (HF)), filters are applied to the reconstruction blocks in the original domain instead of reshaped domain.
a. Alternatively, furthermore, the reconstruction block in the reshaped domain is firstly converted to the original domain, afterwards, filters may be applied and utilized to generate the reconstruction block.
b. An example of the process for inter-coding is depicted in FIG. 29.
c. Alternatively, filters may be applied to the reconstruction block in the reshaped domain.
   i. Alternatively, furthermore, before applying reverse reshaping, filters may be applied firstly. Afterwards, the filtered reconstruction block may be then converted to the original domain.
   ii. An example of the process for inter-coding is depicted in FIG. 30.
d. Filter parameters may depend on whether ILR is enabled or not.

5. It is proposed to apply the filtering process which may apply to the reconstruction blocks (e.g., after intra/inter or other kinds of prediction methods) in the reshaped domain.
a. In one example, the deblocking filter (DBF) process is performed in the reshaped domain. In this case, inverse reshaping is not applied before DBF.
   i. In this case, the DBF parameters may be different depending on whether reshaping is applied or not.
   ii. In one example, DBF process may depend on whether reshaping is enabled or not.
      1. In one example, this method is applied when DBF is invoked in the original domain.
      2. Alternatively, this method is applied when DBF is invoked in the reshaped domain.
b. In one example, the sample adaptive offset (SAO) filtering process is performed in the reshaped domain. In this case, inverse reshaping is not applied before SAO.
c. In one example, the adaptive loop filter (ALF) filtering process is performed in the reshaped domain. In this case, inverse reshaping is not applied before ALF.
d. Alternatively, furthermore, inverse reshaping may be applied to the blocks after the DBF.
e. Alternatively, furthermore, inverse reshaping may be applied to the blocks after the SAO.
f. Alternatively, furthermore, inverse reshaping may be applied to the blocks after the ALF.
g. The above-mentioned filtering method may be replaced by other kinds of filtering methods.

6. It is proposed to signal ILR parameters in a new parameter set (such as ILR APS) instead of tile group headers.
a. In one example, the tile group header may contain an aps_id. Alternatively, furthermore, aps_id is conditionally present when ILR is enabled.
b. In one example, the ILR APS contains an aps_id and the ILR parameters.
c. In one example, a new NUT (NAL unit type, as in AVC and HEVC) value is assigned for the ILR APS.
d. In one example, the range of ILR APS ID values will be 0 . . . M (e.g., M=2K−1).
e. In one example, ILR APSs may be shared across pictures (and can be different in different tile groups within a picture).
f. In one example, the ID value may be fixed-length coded when present. Alternatively, it may be coded with exponential-Golomb (EG) coding, truncated unary or other binarization methods.
g. In one example, ID values cannot be re-used with different content within the same picture.
h. In one example, the ILR APS and the APS for ALF parameters may share the same NUT.
i. Alternatively, ILR parameters may be carried with the current APS for ALF parameters. In this case, the above methods which mention ILR APS may be replaced by the current APS.

j. Alternatively, the ILR parameters may be carried in the SPS/VPS/PPS/sequence header/picture header.
k. In one example, ILR parameters may include reshaper model information, usage of ILR method, chroma residual scaling factors.
l. Alternatively, furthermore, ILR parameters may be signalled in one level (such as in APS), and/or usage of ILR may be further signalled in a second level (such as tile group header).
m. Alternatively, furthermore, predictive coding may be applied to code ILR parameters with different APS indices.

7. Instead of applying the Luma-dependent chroma residue scaling (LCRS) to chroma blocks, it is proposed to apply the forward/inverse reshaping processes to chroma blocks to remove the dependency between luma and chroma.
   a. In one example, one M-piece piece-wise linear (PWL) model and/or forward/backward look-up table may be utilized for one chroma component. Alternatively, two PWL models model and/or forward/backward look-up tables may be utilized for coding the two chroma components respectively.
   b. In one example, chroma's PWL model and/or forward/backward look-up table may be derived from luma's PWL model and/or forward/backward look-up tables.
      i. In one example, there is no need to further signal chroma's PWL models/look-up tables.
   c. In one example, chroma's PWL model and/or forward/backward look-up table may be signaled in SPS/VPS/APS/PPS/sequence header/picture header/tile group header/tile header/CTU row/group of CTUs/regions.

8. In one example, how to signal the ILR parameters of one picture/tile group may depend on ILR parameters of previously coded pictures/tile groups.
   a. For example, the ILR parameters of one picture/tile group may be predicted by ILR parameters of one or multiple previously coded pictures/tile groups.

9. It is proposed to disable Luma-dependent chroma residue scaling (LCRS) for certain block dimensions/temporal layers/tile group types/picture types/coded modes/certain type of motion information.
   a. In one example, even when the forward/inverse reshaping process is applied to luma blocks, the LCRS may not be applied to the corresponding chroma blocks.
   b. Alternatively, even when the forward/inverse reshaping process is not applied to luma blocks, the LCRS may still be applied to the corresponding chroma blocks.
   c. In one example, LCRS is not used when cross-component linear model (CCLM) modes are applied. CCLM modes includes LM, LM-A and LM-L.
   d. In one example, LCRS is not used when cross-component linear model (CCLM) modes are not applied. CCLM modes includes LM, LM-A and LM-L.
   e. In one example, when the coded luma block exceeds one VPDU (e.g., 64×64).
      i. In one example, when a luma block size contains smaller than M*H samples, e.g., 16 or 32 or 64 luma samples, LCRS is not allowed.
      ii. Alternatively, when minimum size of a luma block's width or/and height is smaller than or no larger than X, LCRS is not allowed. In one example, X is set to 8.
      iii. Alternatively, when minimum size of a luma block's width or/and height is no smaller than X, LCRS is not allowed. In one example, X is set to 8.
      iv. Alternatively, when a block's width >th1 or >=th1 and/or a luma block's height >th2 or >=th2, LCRS is not allowed. In one example, th1 and/or th2 is set to 8.
         1. In one example, th1 and/or th2 is set to 128.
         2. In one example, th1 and/or th2 is set to 64.
      v. Alternatively, when a luma block's width <th1 or <=th1 and/or a luma block's height <th2 or <a=th2, LCRS is not allowed. In one example, th1 and/or th2 is set to 8.

10. Whether to disable ILR (forward reshaping process and/or inverse reshaping process) may depend on the coefficients.
    a. In one example, when one block is coded with all zero coefficients, the process of forward reshaping applied to prediction blocks is skipped.
    b. In one example, when one block is coded with all zero coefficients, the process of inverse reshaping applied to reconstruction blocks is skipped.
    c. In one example, when one block is coded with only one non-zero coefficient located at certain positions (e.g., DC coefficient located at the top-left position of one block, a coefficient located at the top-left coding group within one block) the process of forward reshaping applied to prediction blocks and/or inverse reshaping applied to reconstruction blocks is skipped.
    d. In one example, when one block is coded with only M (e.g., M=1) non-zero coefficients, the process of forward reshaping applied to prediction blocks and/or inverse reshaping applied to reconstruction blocks is skipped.

11. It is proposed to split the ILR application region into virtual pipeline data units (VPDU) units if the coded block exceeds one VPDU. Each application region (e.g., with maximum size of 64×64) is considered as an individual CU for ILR operation.
    a. In one example, when a block's width >th1 or >=th1 and/or a block's height >th2 or >=th2, it may be split into sub-blocks with width <th1 or <=th1 and/or height <th2 or <=th2, and ILR may be performed for each sub-block.
       i. In one example, sub-blocks may be with same width or/and height.
       ii. In one example, sub-blocks excluding that are at the right boundary or/and the bottom boundary may be with same width or/and height.
       iii. In one example, sub-blocks excluding that are at the left boundary or/and the top boundary may be with same width or/and height.
    b. In one example, when a block's size (i.e., width*height) >th3 or >=th3, it may be split into sub-blocks with size <th3 or <=th3, and ILR may be performed for each sub-block.
       i. In one example, sub-blocks may be with same size.
       ii. In one example, sub-blocks excluding that are at the right boundary or/and the bottom boundary may be with same size.

iii. In one example, sub-blocks excluding that are at the left boundary or/and the top boundary may be with same size.
c. Alternatively, usage of ILR is only restricted to certain block dimensions.
i. In one example, when the coded block exceeds one VPDU (e.g., 64×64), ILR is disallowed.
ii. In one example, when a block size contains smaller than M*H samples, e.g., 16 or 32 or 64 luma samples, ILR is not allowed.
iii. Alternatively, when minimum size of a block's width or/and height is smaller than or no larger than X, ILR is not allowed. In one example, X is set to 8.
iv. Alternatively, when minimum size of a block's width or/and height is no smaller than X, ILR is not allowed. In one example, X is set to 8.
v. Alternatively, when a block's width >th1 or >=th1 and/or a block's height >th2 or >=th2, ILR is not allowed. In one example, th1 and/or th2 is set to 8.
1. In one example, th1 and/or th2 is set to 128.
2. In one example, th1 and/or th2 is set to 64.
vi. Alternatively, when a block's width <th1 or <=th1 and/or a block's height <th2 or <a=th2, ILR is not allowed. In one example, th1 and/or th2 is set to 8.
12. The above methods (e.g., whether to disable ILR and/or whether to disable LCRS and/or whether to signal PWL/look-up tables for chroma coding) may depend on the color format, such as 4:4:4/4:2:0.
13. Indication of enabling ILR (e.g., tile_group_reshaper_enable_flag) may be coded under the condition of indications of presented reshaper model (e.g., tile_group_reshaper_model_present_flag).
a. Alternatively, tile_group_reshaper_model_present_flag may be coded under the condition of tile_group_reshaper_enable_flag.
b. Alternatively, only one of the two syntax elements, including tile_group_reshaper_model_present_flag and tile_group_reshaper_enable_flag may be coded. The value of the other one is set equal to the one that may be signalled.
14. Different clipping methods may be applied to the prediction signal and reconstruction process.
a. In one example, adaptively clipping method may be applied and the maximum and minimum values to be clipped may be defined in the reshaped domain.
b. In one example, the adaptively clipping may be applied to the prediction signal in the reshaped domain.
c. Alternatively, furthermore, the fixed clipping (e.g., according to the bit-depth) may be applied to the reconstruction block.
15. The filter parameters (such as that used in DF, BF, HF) may depend on whether ILR is enabled or not.
16. It is proposed that for blocks coded in Palette mode, ILR is disabled or applied differently.
a. In one example, when a block is coded in Palette mode, reshaping and inverse reshaping are skipped.
b. Alternatively, when a block is coded in Palette mode, a different reshaping and inverse reshaping functions may be applied.
17. Alternatively, when ILR is applied, Palette mode may be coded differently.
a. In one example, when ILR is applied, Palette mode may be coded in the original domain.
b. Alternatively, when ILR is applied, Palette mode may be coded in the reshaped domain.
c. In one example, when ILR is applied, Palette predictors may be signaled in the original domain.
d. Alternatively, palette predictors may be signalled in the reshaped domain.
18. It is proposed that for blocks coded in IBC mode, ILR is disabled or applied differently.
a. In one example, when a block is coded in IBC mode, reshaping and inverse reshaping are skipped.
b. Alternatively, when a block is coded in IBC mode, a different reshaping and inverse reshaping is applied.
19. Alternatively, when ILR is applied, IBC mode may be coded differently.
a. In one example, when ILR is applied, IBC may be performed in the original domain.
b. Alternatively, when ILR is applied, IBC may be performed in the reshaped domain.
20. It is proposed that for blocks coded in B-DPCM mode, ILR is disabled or applied differently.
a. In one example, when a block is coded in B-DPCM mode, reshaping and inverse reshaping are skipped.
b. Alternatively, when a block is coded in B-DPCM mode, a different reshaping and inverse reshaping is applied.
21. Alternatively, when ILR is applied, B-DPCM mode may be coded differently.
a. In one example, when ILR is applied, B-DPCM may be performed in the original domain.
b. Alternatively, when ILR is applied, B-DPCM may be performed in the reshaped domain.
22. It is proposed that for blocks coded in transform skip mode, ILR is disabled or applied differently.
a. In one example, when a block is coded in transform skip mode, reshaping and inverse reshaping are skipped.
b. Alternatively, when a block is coded in transform skip mode, a different reshaping and inverse reshaping may be applied.
23. Alternatively, when ILR is applied, transform skip mode may be coded differently.
a. In one example, when ILR is applied, transform skip may be performed in the original domain.
b. Alternatively, when ILR is applied, transform skip may be performed in the reshaped domain.
24. It is proposed that for blocks coded in I-PCM mode, ILR is disabled or applied differently.
a. In one example, when a block is coded in Palette mode, reshaping and inverse reshaping are skipped.
b. Alternatively, when a block is coded in Palette mode, a different reshaping and inverse reshaping functions may be applied.
25. Alternatively, when ILR is applied, I-PCM mode may be coded differently.
a. In one example, when ILR is applied, I-PCM mode may be coded in the original domain.
b. Alternatively, when ILR is applied, I-PCM mode may be coded in the reshaped domain.
26. It is proposed that for blocks coded in transquant-bypass mode, ILR is disabled or applied differently.
a. In one example, when a block is coded in transquant-bypass mode, reshaping and inverse reshaping are skipped.
27. Alternatively, when a block is coded in transquant-bypass mode, a different reshaping and inverse reshaping functions are applied.
28. For above bullets, when ILR is disabled, the forward reshaping and/or inverse reshaping process may be skipped.

a. Alternatively, the prediction and/or reconstruction and/or residual signal are in the original domain.
b. Alternatively, the prediction and/or reconstruction and/or residual signal are in the reshaped domain.

29. Multiple reshaping/inverse reshaping functions (such as multiple PWL models) may be allowed for coding one picture/one tile group/one VPDU/one region/one CTU row/multiple CUs.

a. How to select from multiple functions may depend on block dimension/coded mode/picture type/low delay check flag/motion information/reference pictures/video content, etc. al.
b. In one example, multiple sets of ILR side information (e.g., reshaping/inverse reshaping functions) may be signalled per SPS/VPS/PPS/sequence header/Picture header/tile group header/tile header/regions/VPDU/etc. al.
  i. Alternatively, furthermore, predictive coding of ILR side information may be utilized.
c. In one example, more then one aps_idx may be signalled in PPS/Picture header/tile group header/tile header/regions/VPDU/etc.

30. In one example, reshape information is signaled in a new syntax set other than VPS, SPS, PPS, or APS. For example, reshape information is signaled in a set denoted as inloop_reshaping_parameter_set( )(IRPS, or any other name).

a. An exemplary syntax design is as below. The added syntax is highlighted in italics.

|  | Descriptor |
|---|---|
| inloop_reshape_parameter_set_rbsp( ) { |  |
|     inloop_reshaping_parameter_set_id | u(5) |
|     reshaper_model( ) |  |
|     irps_extension_flag | u(1) |
|     if(irps_extension_flag) |  |
|         while( more_rbsp_data( ) ) |  |
|             irps_extension_data_flag | u(1) |
|     rbsp_trailing_bits( ) |  |
| } |  | inloop_reshaping_parameter_set_id provides an identifier for the IRPS for reference by other syntax elements.

NOTE—IRPSs can be shared across pictures and can be different in different tile groups within a picture.

irps_extension_flag equal to 0 specifies that no irps_extension_data_flag syntax elements are present in the IRPS RBSP syntax structure. irps_extension_flag equal to 1 specifies that there are irps_extension_data_flag syntax elements present in the IRPS RBSP syntax structure.

irps_extension_data_flag may have any value. Its presence and value do not affect decoder conformance to profiles specified in this version of this Specification. Decoders conforming to this version of this Specification shall ignore all irps_extension_data_flag syntax elements.

b. An exemplary syntax design is as below. The added syntax is highlighted in italics.

General Tile Group Header Syntax and Semantics

|  | Descriptor |
|---|---|
| tile_group_header( ) { |  |
|   ... |  |
|   if ( sps_reshaper_enabled_flag ) { |  |
|     tile_group_reshaper_model_present_flag | u(1) |
|     if ( tile_group_reshaper_model_present_flag ) |  |
|         [[tile_group_reshaper_model ( )]] *tile_group_irps_id* |  |
|     tile_group_reshaper_enable_flag | u(1) |
|     if ( tile_group_reshaper_enable_flag && (!( qtbtt_dual_tree_intra_flag && tile_group_type == I ) ) ) |  |
|         tile_group_reshaper_chroma_residual_scale_flag | u(1) |
|   } |  |
|   ... |  |
| } |  | tile_group_irps_id specifies the inloop_reshaping_parameter_set_id of the IRPS that the tile group refers to. The TemporId of the IRPS NAL unit having inloop_reshaping_parameter_set_id equal to tile_group_irps_id shall be less than or equal to the TemporId of the coded tile group NAL unit.

31. In one example, IRL information is signaled together with ALF information in APS.

a. An exemplary syntax design is as below. The added syntax is highlighted in italics.

Adaptation Parameter Set Syntax and Semantics

|  | Descriptor |
|---|---|
| adaptation_parameter_set_rbsp( ) { |  |
|     adaptation_parameter_set_id | u(5) |
|     alf_data( ) |  |
|     *reshaper_model( )* |  |
|     aps_extension_flag | u(1) |
|     if( aps_extension_flag) |  |
|         while( more_rbsp_data( ) ) |  |
|             aps_extension_data_flag | u(1) |
|     rbsp_trailing_bits( ) |  |
| } |  | b. In one example, one tile_group_aps_id is signaled in tile group header to specify the adaptation_parameter_set_id of the APS that the tile group refers to. Both ALF information and ILR information for the current tile group are signaled in the specified APS.

i. An exemplary syntax design is as below. The added syntax is highlighted in italics.

| if ( tile_group_reshaper_model_present_flag \|\| tile_group_alf_enabled_flag) |
| *tile_group_aps_id* |

32. In one example, ILR information and ALF information signaled in different APSs.
   a. a first ID (may named as tile_group_aps_id_alf) is signaled in tile group header to specify a first adaptation_parameter_set_id of a first APS that the tile group refers to. ALF information for the current tile group is signaled in the specified first APS.
   b. a second ID (may named as tile_group_aps_id_irps) is signaled in tile group header to specify a second adaptation_parameter_set_id of a second APS that the tile group refers to. ILR information for the current tile group is signaled in the specified second APS.
   c. In one example, the first APS must have ALF information in a conformance bit-stream;
   d. In one example, the second APS must have ILR information in a conformance bit-stream;
   e. An exemplary syntax design is as below. The added syntax is highlighted in italics.

|  |  |
|---|---|
| if( sps_alf_enabled_flag ) { | |
|     tile_group_alf_enabled_flag | u(1) |
|     if( tile_group_alf_enabled_flag ) | |
|         tile_group_aps_id_alf | u(5) |
| } | |

|  | Descriptor |
|---|---|
| tile_group_header( ) { | |
| ... | |
|   if( sps_alf_enabled_flag ) { | |
|     tile_group_alf_enabled_flag | u(1) |
|     if( tile_group_alf_enabled_flag ) | |
|       *tile_group_aps_id_alf* | u(5) |
|   } | |
| ... | |
|   if ( sps_reshaper_enabled_flag ) { | |
|     tile_group_reshaper_model_present_flag | u(1) |
|     if ( tile_group_reshaper_model_present_flag ) | |
|       *tile_group_aps_id_irps* | |
|     tile_group_reshaper_enable_flag | u(1) |
|     if ( tile_group_reshaper_enable_flag && (!( qtbtt_dual_tree_intra_flag && tile_group_type == I ) ) ) | |
|       tile_group_reshaper_chroma_residual_scale_flag | u(1) |
|   } | |
| ... | |
| } | |

33. In one example, some APSs with specified adaptation_parameter_set_id must have ALF information. For another example, some APSs with specified adaptation_parameter_set_id must have ILR information.
   a. For example, APSs with adaptation_parameter_set_id equal to 2N must have ALF information. N is any integer;
   b. For example, APSs with adaptation_parameter_set_id equal to 2N+1 must have ILR information. N is any integer;
   c. An exemplary syntax design is as below. The added syntax is highlighted in italics.

|  | Descriptor |
|---|---|
| adaptation_parameter_set_rbsp( ) { | |
|   adaptation_parameter_set_id | u(5) |
|   *if*(adaptation_pararneter_set_id %2= = 0 ) | |
|     alf_data( ) | |
|   *else* | |
|     *reshaper_model*( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

-continued

| | Descriptor |
|---|---|
| tile_group_header( ) { | |
| ... | |
|     if( sps_alf_enabled_flag ) { | |
|         tile_group_alf_enabled_flag | u(1) |
|         if( tile_group_alf_enabled_flag ) | |
|             *tile_group_aps_id_alf* | u(5) |
|     } | |
|     ... | |
|     if ( sps_reshaper_enabled_flag ) { | |
|         tile_group_reshaper_model_present_flag | u(1) |
|         if ( tile_group_reshaper_model_present_flag ) | |
|             *tile_group_aps_id_irps* | |
|         tile_group_reshaper_enable_flag | u(1) |
|         if ( tile_group_reshaper_enable_flag && (!( qtbtt_dual_tree_intra_flag && tile_group_type == I ) ) ) | |
|             tile_group_reshaper_chroma_residual_scale_flag | u(1) |
|     } | |
|     ... | |
| } | | i. For example, 2*tile_group_aps_id_alf specify a first adaptation_parameter_set_id of a first APS that the tile group refers to. ALF information for the current tile group is signaled in the specified first APS.

ii. For example, 2*tile_group_aps_id_irps+1 specify a second adaptation_parameter_set_id of a second APS that the tile group refers to. ILR information for the current tile group is signaled in the specified second APS.

34. In one example, a tile group cannot refer to an APS (or IRPS) signaled before a specified type of network abstraction layer (NAL) unit, which is signaled before the current tile group.

a. In one example, a tile group cannot refer to an APS (or IRPS) signaled before a specified type of tile group, which is signaled before the current tile group.

b. For example, a tile group cannot refer to an APS (or IRPS) signaled before a SPS, which is signaled before the current tile group.

c. For example, a tile group cannot refer to an APS (or IRPS) signaled before a PPS, which is signaled before the current tile group.

d. For example, a tile group cannot refer to an APS (or IRPS) signaled before an Access unit delimiter NAL (AUD), which is signaled before the current tile group.

e. For example, a tile group cannot refer to an APS (or IRPS) signaled before a End of bitstream NAL (EoB), which is signaled before the current tile group.

f. For example, a tile group cannot refer to an APS (or IRPS) signaled before an End of sequence NAL (EoS), which is signaled before the current tile group.

g. For example, a tile group cannot refer to an APS (or IRPS) signaled before an instantaneous decoding refresh (IDR) NAL, which is signaled before the current tile group.

h. For example, a tile group cannot refer to an APS (or IRPS) signaled before a clean random access (CRA) NAL, which is signaled before the current tile group.

i. For example, a tile group cannot refer to an APS (or IRPS) signaled before an intra random access point (IRAP) access unit, which is signaled before the current tile group.

j. For example, a tile group cannot refer to an APS (or IRPS) signaled before an I tile group (or picture, or slice), which is signaled before the current tile group.

k. Methods disclosed in IDF-P1903237401H and IDF-P1903234501H can also be applied when ILR information is carried in APS or IRPS.

35. A conformance bitstream shall satisfy that when the in-loop reshaping method is enabled for one video data unit (such as sequence), default ILR parameters, such as a default model shall be defined.

a. The sps_lmcs_default_model_present_flag shall be set to 1 when sps_lmcs_enabled_flag is set to 1.

b. The default parameters may be signalled under the condition of ILR enabling flag instead of default model present flag (such as sps_lmcs_default_model_present_flag).

c. For each tile group, a default model usage flag (such as tile_group_lmcs_use_default_model_flag) may be signaled without referring to the SPS default model usage flag.

d. A conformance bitstream shall satisfy that when there are no ILR information in corresponding APS types for ILR, and one video data unit (such as tile group) is forced to use the ILR technology, the default model shall be utilized.

e. Alternatively, a conformance bitstream shall satisfy that when there are no ILR information in corresponding APS types for ILR, and one video data unit (such as tile group) is forced to use the ILR technology (such as tile_group_lmcs_enable_flag is equal to 1), the indication of using default model shall be true, e.g., tile_group_lmcs_use_default_model_flag shall be 1.

f. It is constrained that default ILR parameters (such as default model) shall be sent in a video data unit (such as SPS).

i. Alternatively, furthermore, the default ILR parameters shall be sent when the SPS flag which indicates the usage of ILR is true.

g. It is constrained that there is at least one ILR APS sent in a video data unit (such as SPS).

i. In one example, at least one ILR APS contains the default ILR parameters (such as default model).
36. Default ILR parameters may be indicated by one flag. When this flag tells default ILR parameters are utilized, there is no need to further signal the ILR data.
37. The default ILR parameters may be predefined when it is not signaled. For example, the default ILR parameters may correspond to an identity mapping.
38. Temporal layer information may be signalled together with the ILR parameters, such as in an ILR APS.
   a. In one example, the temporal layer index may be signalled in the lmcs_data( ).
   b. In one example, the temporal layer index minus 1 may be signalled in the lmcs_data( ).
   c. Alternatively, furthermore, when coding/decoding one tile group/tile, it is restricted to refer to those ILR APSs which are associated with smaller or equal temporal layer index.
   d. Alternatively, when coding/decoding one tile group/tile, it is restricted to refer to those ILR APSs which are associated with smaller temporal layer index.
   e. Alternatively, when coding/decoding one tile group/tile, it is restricted to refer to those ILR APSs which are associated with larger temporal layer index.
   f. Alternatively, when coding/decoding one tile group/tile, it is restricted to refer to those ILR APSs which are associated with larger or equal temporal layer index.
   g. Alternatively, when coding/decoding one tile group/tile, it is restricted to refer to those ILR APSs which are associated with equal temporal layer index.
   h. In one example, whether the restrictions above are applied may depend on a piece of information, which may be signaled to the decoder or inferred by the decoder.
39. Temporal layer information may be signaled together with the ALF parameters, such as in an ALF APS.
   a. In one example, the temporal layer index may be signalled in the alf_data( ).
   b. In one example, the temporal layer index minus 1 may be signalled in the alf_data( ).
   c. Alternatively, furthermore, when coding/decoding one tile group/tile or one CTU within one tile/tile group, it is restricted to refer to those ALF APS s which are associated with smaller or equal temporal layer index.
   d. Alternatively, when coding/decoding one tile group/tile, it is restricted to refer to those ALF APS s which are associated with smaller temporal layer index.
   e. Alternatively, when coding/decoding one tile group/tile, it is restricted to refer to those ALF APSs which are associated with larger temporal layer index.
   f. Alternatively, when coding/decoding one tile group/tile, it is restricted to refer to those ALF APSs which are associated with larger or equal temporal layer index.
   g. Alternatively, when coding/decoding one tile group/tile, it is restricted to refer to those ALF APSs which are associated with equal temporal layer index.
   h. In one example, whether the restrictions above are applied may depend on a piece of information, which may be signaled to the decoder or inferred by the decoder.
40. In one example, the reshape mapping between the original samples and reshaped samples may not be a positive relationship that is, one larger value is disallowed to be mapped to a smaller value.
   a. For example, the reshape mapping between the original samples and reshaped samples may be a negative relationship, wherein for two values, the larger one in the original domain may be mapped to a smaller value in the reshaped domain.
41. In a conformance bitstream, the syntax element aps_params_type is only allowed to be several predefined values, such as 0 and 1.
   a. In another example, it is only allowed to be 0 and 7.
42. In one example, the default ILR information must be signaled if ILR can be applied (e.g. sps_lmcs_enabled_flag is true).

5 Example Implementations of the Disclosed Technology

In some embodiments, tile_group_reshaper_enable_flag is conditionally present when tile_group_reshaper_model_present_flag is enabled. The added syntax is highlighted in italics.

In 7.3.3.1 General Tile Group Header Syntax

|  | Descriptor |
|---|---|
| tile_group_header( ) { | |
| ... | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   if ( sps_reshaper_enabled_flag ) { | |
|     tile_group_reshaper_model_present_flag | u(1) |
|     if ( tile_group_reshaper_model_present_flag ) { | |
|       tile_group_reshaper_model ( ) | |
|       tile_group_reshaper_enable_flag | u(1) |
|     } | |
|     if ( tile_group_reshaper_enable_flag && (!( qtbtt_dual_tree_intra_flag && tile_group_type == I ) ) ) | |
|       tile_group_reshaper_chroma_residual_scale_flag | u(1) |
|   } | |
|   byte_alignment( ) | |
| } | |

Alternatively, tile_group_reshaper_model_present_flag is conditionally present when tile_group_reshaper_enable_flag is enabled.

|  | Descriptor |
|---|---|
| tile_group_header( ) { | |
| ... | |
|    if( num_tiles_in_tile_group_minus1 > 0 ) { | |
|       offset_len_minus1 | ue(v) |
|       for( i = 0; i < num_tiles_in_tile_group_minus1; i++ ) | |
|          entry_point_offset_minus1[i ] | u(v) |
|    } | |
|    if ( sps_reshaper_enabled_flag ) { | |
|       *tile_group_reshaper_enable_flag* | |
|       *if (tile_group_reshaper_enable_flag) {* | |
|          tile_group_reshaper_model_present_flag | u(1) |
|          if ( tile_group_reshaper_model_present_flag ) | |
|             tile_group_reshaper_model ( ) | |
|       } | |
|       [[ *tile_group_reshaper_enable_flag*]] | ~~u(1)~~ |
|       if ( tile_group_reshaper_enable_flag && (!( qtbtt_dual_tree_intra_flag && tile_group_type == I ) ) ) | |
|          tile_group_reshaper_chroma_residual_scale_flag | u(1) |
|    } | |
|    byte_alignment( ) | |
| } | |

Alternatively, only one of the two syntax elements tile_group_reshaper_model_present_flag or tile_group_reshaper_enable_flag may be signalled. The one that is not signalled is inferred to be equal to the one that may be signalled. In this case, the one syntax element controls the usage of ILR.

Alternatively, the conformance bitstream requires that tile_group_reshaper_model_present_flag should be equal to tile_group_reshaper_enable_flag.

Alternatively, tile_group_reshaper_model_present_flag and/or tile_group_reshaper_enable_flag and/or tile_group_reshaper_model( ), and/or tile_group_reshaper_chroma_residual_scale_flag may be signalled in APS instead of tile group header.

Embodiment #2 on top of JVET-N0805. The added syntax is highlighted in italics.

|  | Descriptor |
|---|---|
| seq_parameter_set_rbsp( ) { | |
| ... | |
|    sps_lmcs_enabled_flag | u(1) |
|    if( sps_lmcs_enabled_flag ) { | |
|       [[*sps_lmcs_default_model_present_flag* | ~~u(1)~~ |
|       *if( sps_lmcs_default_model_present_flag )*]] | |
|       lmcs_data( ) | |
| ... | |
| } | | sps_lmcs_enabled_flag equal to 1 specifies that luma mapping with chroma scaling is used in the coded video sequence (CVS). sps_lmcs_enabled_flag equal to 0 specifies that luma mapping with chroma scaling is not used in the CVS.

sps_lmcs_default_model_present_flag equal to 1 specifies that default lmcs data is present in this SPS. sps_lmcs_default_model_flag equal to 0 specifies that default lmcs data is not present in this SPS. When not present, the value of sps_lmcs_default_model_present_flag is inferred to be equal to 0.

|  | Descriptor |
|---|---|
| adaptation_parameter_set_rbsp( ) { | |
|    adaptation_parameter_set_id | u(5) |
|    aps_params_type | u(3) |
|    if( aps_params_type = = ALF_APS ) // 0 | |
|       alf_data( ) | |
|    else if ( aps_params_type = = LMCS_APS ) // 1 | |
|       lmcs_data( ) | |
|    aps_extension_flag | u(1) |
|    if( aps_extension_flag ) | |
|       while( more_rbsp_data( )) | |
|          aps_extension_data_flag | u(1) |
|    rbsp_trailing_bits( ) | |
| } | | aps_params_type specifies the type of APS parameters carried in the APS as specified in the following table:

TABLE 7-x

| APS parameters type codes and types of APS parameters | | |
|---|---|---|
| aps_params_type | Name of aps_params_type | Type of APS parameters |
| 0 | ALF_APS | ALF parameters |
| 1 | LMCS_APS | LMCS parameters |
| 2 . . . 7 | Reserved | Reserved |

TABLE 7-x-continued

APS parameters type codes and types of APS parameters

| | Descriptor |
|---|---|
| tile_group_header( ) { | |
| ... | |
|   if( sps_alf_enabled_flag ) { | |
|     tile_group_alf_enabled_flag | u(1) |
|     if( tile_group_alf_enabled_flag ) | |
|       tile_group_alf_aps_id | u(5) |
|   } | |
| ... | |
|   if( sps_lmcs_enabled_flag) { | |
|     tile_group_lmcs_enable_flag | u(1) |
|     if( tile_group_lmcs_enable_flag ) { | |
|       if( sps_lmcs_default_model_present_flag ) | |
|         tile_group_lmcs_use_default_model_flag | u(1) |
|       if( !tile_group_lmcs_use_default_model_flag ) | |
|         tile_group_lmcs_aps_id | u(5) |
|       if( !( qtbtt_dual_tree_intra_flag && tile_group_type = = I ) ) | |
|         tile_group_chroma_residual_scale_flag | u(1) |
|     } | |
|   } | |
| ... | |
|   if( NumTilesInCurrTileGroup > 1 ) { | |
|     offset_len_minus1 | ue(v) |
|     for( i = 0; i < NumTilesInCurrTileGroup − 1; i++ ) | |
|       entry_point_offset_minus1[i] | u(v) |
|   } | |
|   byte_alignment( ) | |
| } | |

ALF APS: An APS that has aps_params_type equal to ALF_APS.
LMCS APS: An APS that has aps_params_type equal to LMCS_APS.

Make the following semantics changes:
tile_group_alf_aps_id specifies the adaptation_parameter_set_id of the ALF APS that the tile group refers to. The TemporlId of the ALF APS NAL unit having adaptation_parameter_set_id equal to tile_group_alf_aps_id shall be less than or equal to the TemporalId of the coded tile group NAL unit.
When multiple ALF APSs with the same value of adaptation_parameter_set_id are referred to by two or more tile groups of the same picture, the multiple ALF APSs with the same value of adaptation_parameter_set_id shall have the same content.
tile_group_lmcs_enabled_flag equal to 1 specifies that luma mapping with chroma scaling is enabled for the current tile group. tile_group_lmcs_enabled_flag equal to 0 specifies that luma mapping with chroma scaling is not enabled for the current tile group. When tile_group_lmcs_enable_flag is not present, it is inferred to be equal to 0.
tile_group_lmcs_use_default_model_flag equal to 1 specifies that luma mappin with chroma scaling operation for the tile group uses default lmcs model. tile_group_lmcs_use_default_model_flag equal to 0 specifies that luma mappin with chroma scaling operation for the tile group uses lmcs model in the LMCS APS referred to by tile_group_lmcs_aps_id. When tile_group_reshaper_use_default_model_flag is not present, it is inferred to be equal to 0.
tile_group_lmcs_aps_id specifies the adaptation_parameter_set_id of the LMCS APS that the tile group refers to. The TemporalId of the LMCS APS NAL unit having adaptation_parameter_set_id equal to tile_group_lmcs_aps_id shall be less than or equal to the TemporalId of the coded tile group NAL unit.
When multiple LMCS APSs with the same value of adaptation_parameter_set_id are referred to by two or more tile groups of the same picture, the multiple LMCS APSs with the same value of adaptation_parameter_set_id shall have the same content.
tile_group_chroma_residual_scale_flag equal to 1 specifies that chroma residual scaling is enabled for the current tile group. tile_group_chroma_residual_scale_flag equal to 0 specifies that chroma residual scaling is not enabled for the current tile group. When tile_group_chroma_residual_scale_flag is not present, it is inferred to be equal to 0.

Luma Mapping with Chroma Scaling Data Syntax

| | Descriptor |
|---|---|
| lmcs_data ( ) { | |
|   temporal_id | u(3) |
|   lmcs_min_bin_idx | ue(v) |
|   lmcs_delta_max_bin_idx | ue(v) |
|   lmcs_delta_cw_prec_minusl | ue(v) |
|   for (i = lmcs_min_bin_idx; i <= LmcsMaxBinIdx; i++ ) { | |
|     lmcs_delta_abs_cw[ i ] | u(v) |
|     if ( lmcs_delta_abs_cw[ i ] ) > 0 ) | |
|       lmcs_delta_sign_cw_flag[ i ] | u(1) |
|   } | |
| } | |

The examples described above may be incorporated in the context of the method described below, e.g., methods as shown in FIGS. 31A to 39E, which may be implemented at a video decoder or a video encoder.

Figure 31A:
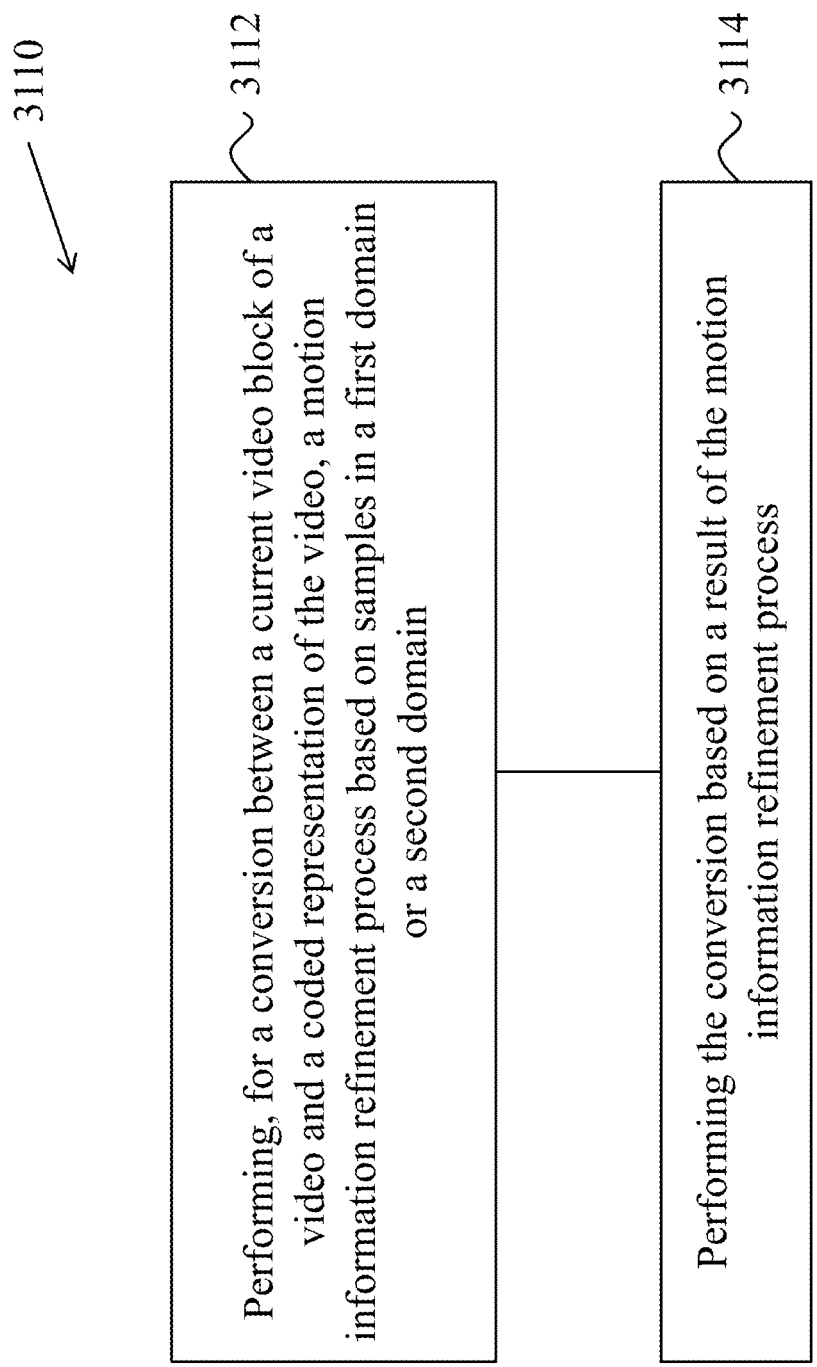
FIGS. 31A and 31B show flowcharts of example methods for video processing.
Figure 31B:
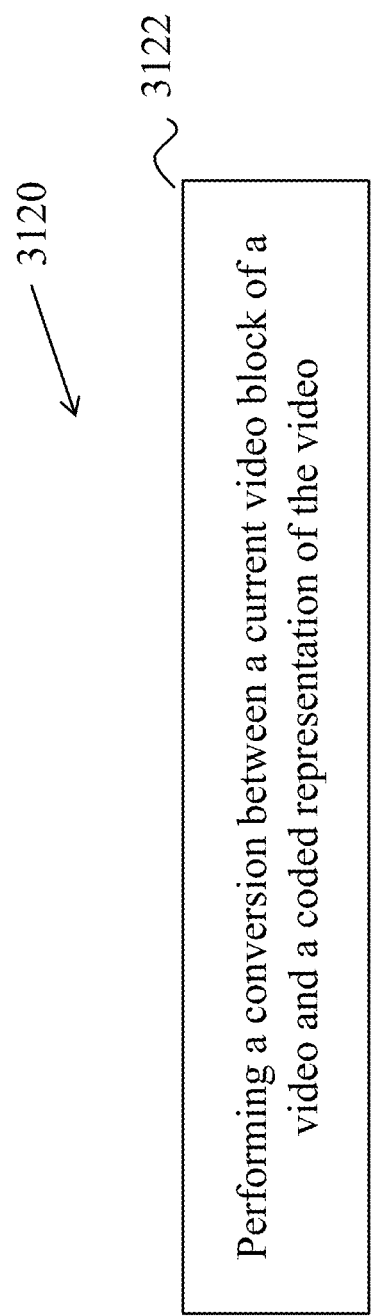

FIG. 31A shows a flowchart of an exemplary method for video processing. The method 3100 includes, at step 3110, performing, for a conversion between a current video block of a video and a coded representation of the video, a motion information refinement process based on samples in a first domain or a second domain. The method 3100 includes, at step 3120, performing the conversion based on a result of the motion information refinement process. In some implementations, during the conversion, the samples are obtained for the current video block from a first prediction block in the first domain using an unrefined motion information, at least a second prediction block is generated in the second domain using a refined motion information used for determining a reconstruction block, and reconstructed samples of the current video block are generated based on the at least the second prediction block FIG. 31B shows a flowchart of an exemplary method for video processing. The method 3120 includes, at step 3122, reconstructing, based on the at least one prediction block in the second domain, the current video block. In some implementations, during the conversion, the current video block is constructed based on a first domain and a second domain and/or chroma residue is scaled in a luma-dependent manner. In some implementations, a coding tool is applied during the conversion using parameters that are derived at least based on first set of samples in a video region of the video and second set of samples in a reference picture of the current video block. In some implementations, a domain for the first samples and a domain for the second samples are aligned.

Figure 32A:
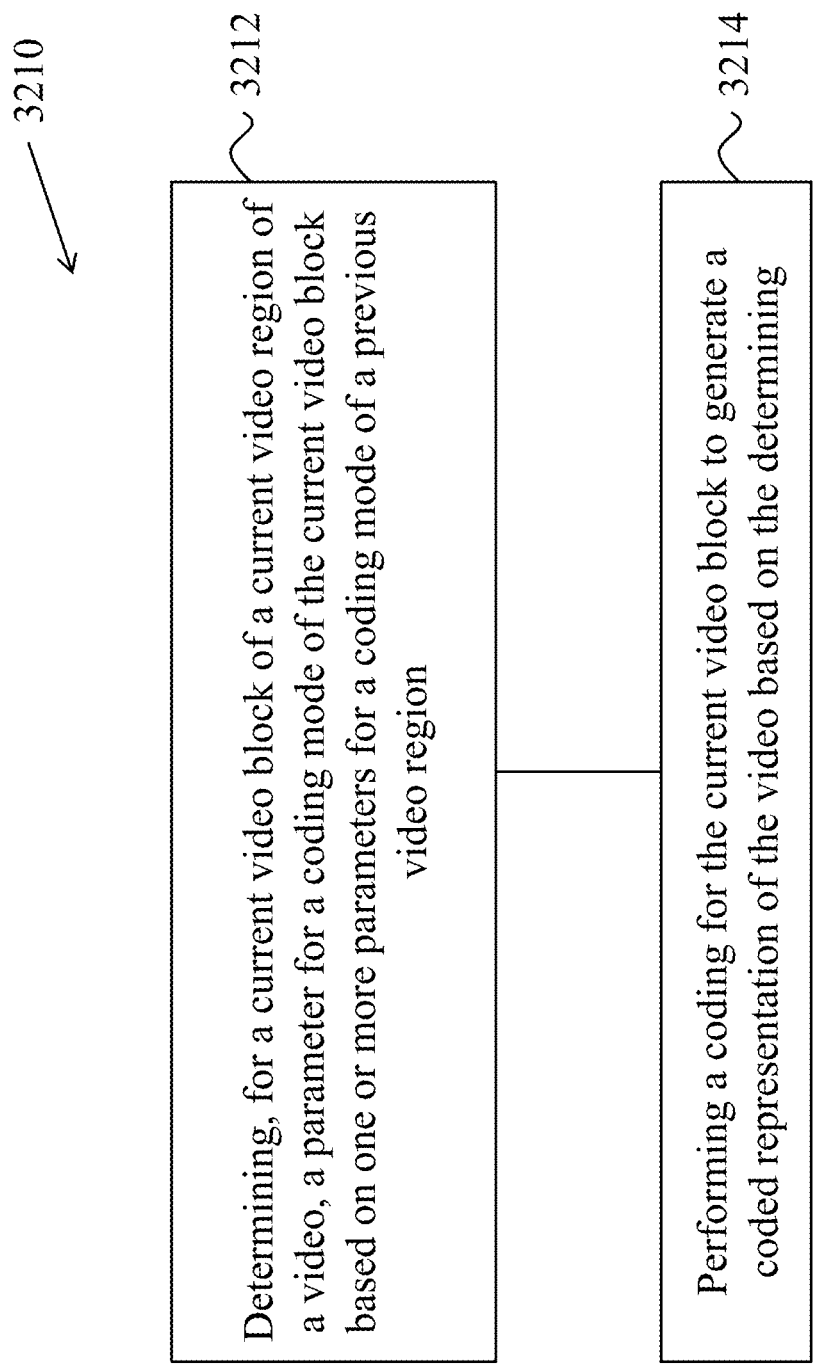
FIGS. 32A to 32D show flowcharts of example methods for video processing.

FIG. 32A shows a flowchart of an exemplary method for video processing. The method 3210 includes, at step 3212, determining, for a current video block of a current video region of a video, a parameter for a coding mode of the current video block based on one or more parameters for a coding mode of a previous video region. The method 3210 further includes, at step 3214, performing a coding for the current video block to generate a coded representation of the video based on the determining. In some implementations, the parameter for the coding mode is included in a parameter set in the coded representation of the video. In some implementations, the performing of the coding comprises transforming a representation of the current video block in a first domain to a representation of the current video block in a second domain. In some implementations, during the performing of the coding using the coding mode, the current video block is constructed based on the first domain and the second domain and/or chroma residue is scaled in a luma-dependent manner.

Figure 32B:
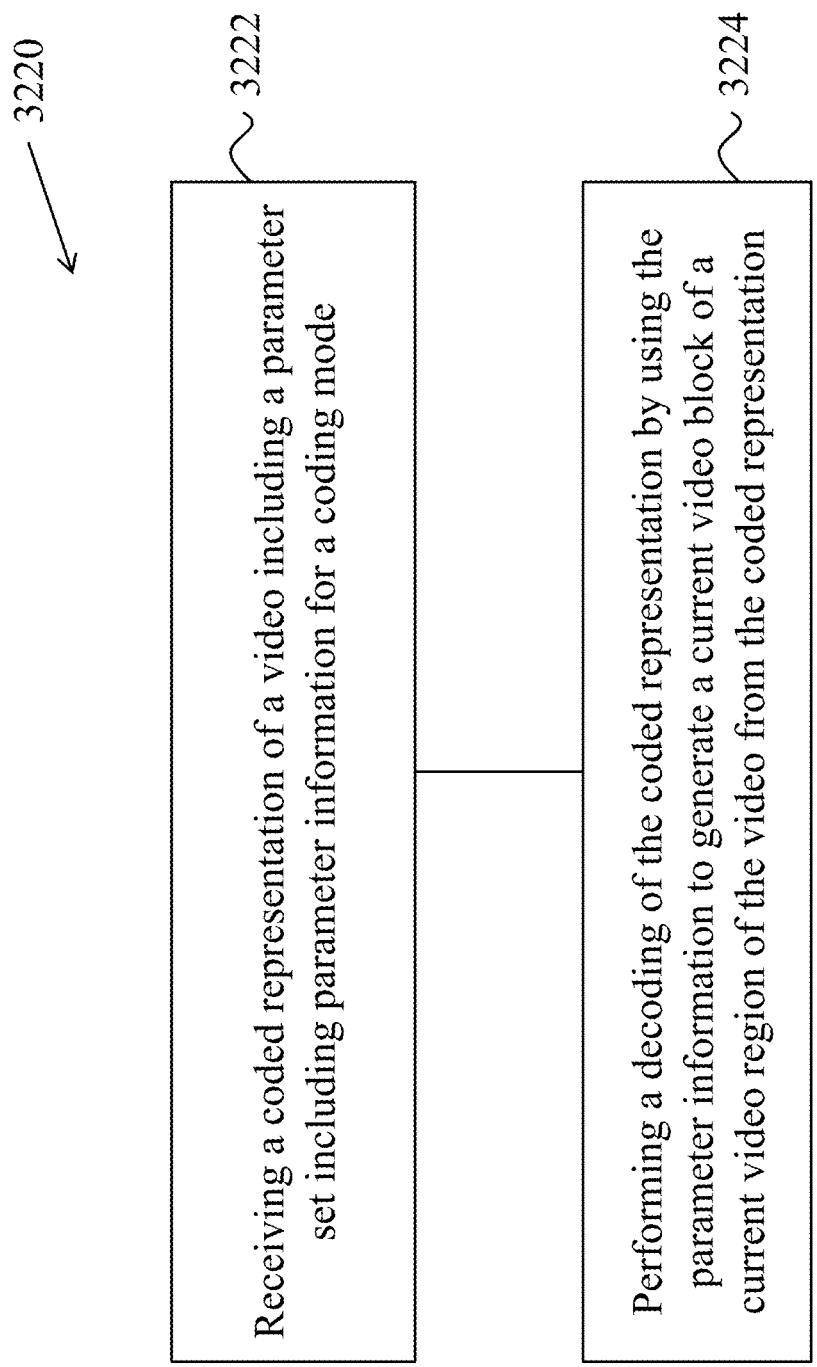

FIG. 32B shows a flowchart of an exemplary method for video processing. The method 3220 includes, at step 3222, receiving a coded representation of a video including a parameter set including parameter information for a coding mode. The method 3220 further includes, at step 3224, performing a decoding of the coded representation by using the parameter information to generate a current video block of a current video region of the video from the coded representation. In some implementations, the parameter information for the coding mode is based on one or more parameters for the coding mode of a previous video region. In some implementations, in the coding mode, the current video block is constructed based on the first domain and the second domain and/or chroma residue is scaled in a luma-dependent manner.

Figure 32C:
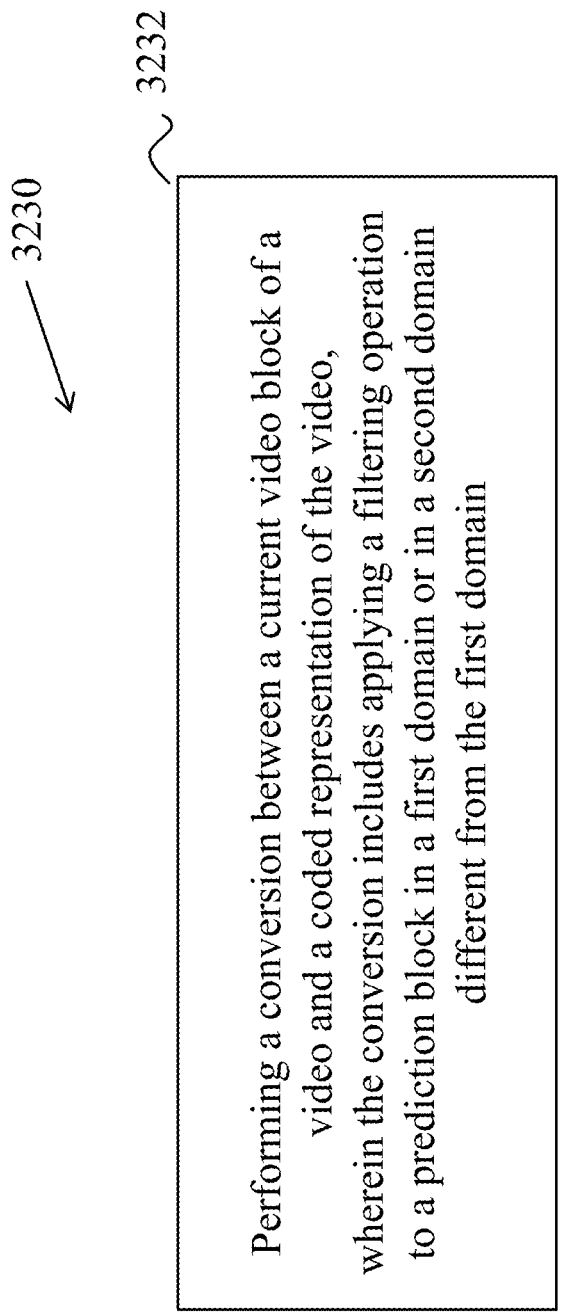

FIG. 32C shows a flowchart of an exemplary method for video processing. The method 3230 includes, at step 3232, performing a conversion between a current video block of a video and a coded representation of the video. In some implementations, the conversion includes applying a filtering operation to a prediction block in a first domain or in a second domain different from the first domain.

Figure 32D:
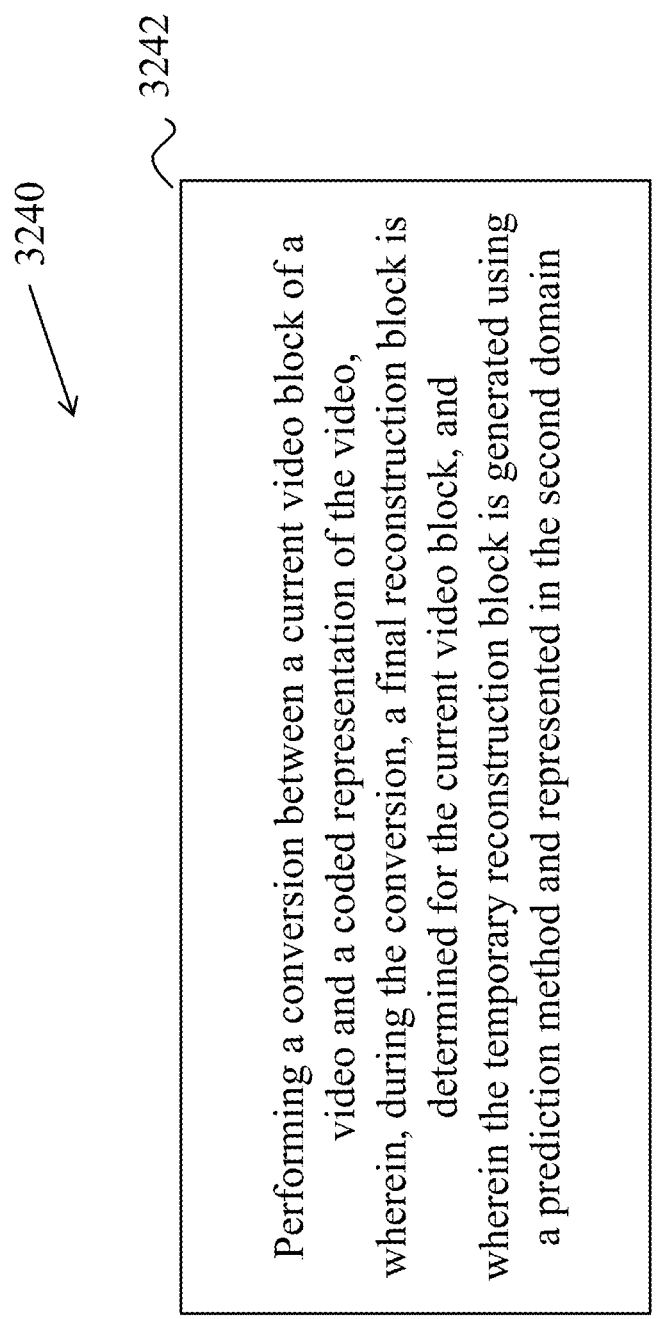

FIG. 32D shows a flowchart of an exemplary method for video processing. The method 3240 includes, at step 3242, performing a conversion between a current video block of a video and a coded representation of the video. In some implementations, during the conversion, a final reconstruction block is determined for the current video block. In some implementations, the temporary reconstruction block is generated using a prediction method and represented in the second domain.

Figure 33:
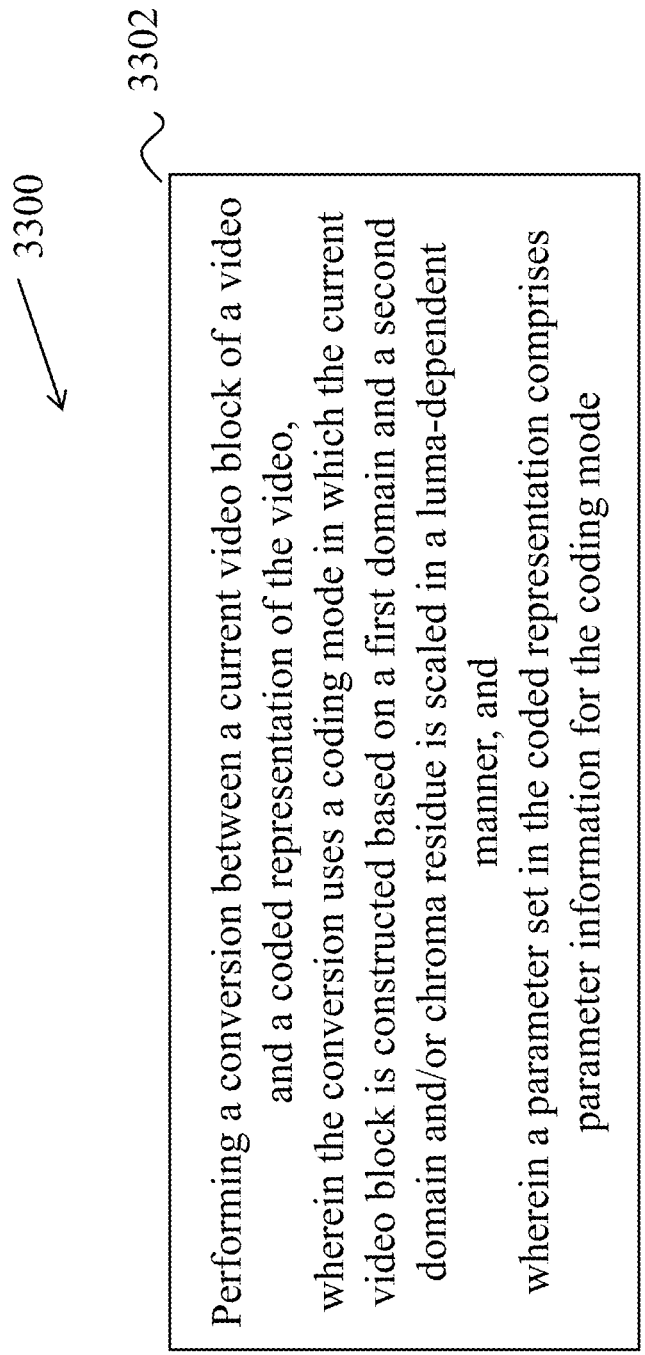
FIG. 33 shows a flowchart of an example method for video processing.

FIG. 33 shows a flowchart of an exemplary method for video processing. The method 3300 includes, at step 3302, performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein a parameter set in the coded representation comprises parameter information for the coding mode.

FIG. 34A shows a flowchart of an exemplary method for video processing. The method 3410 includes, at step 3412, performing a conversion between a current video block of a video that is a chroma block and a coded representation of the video, wherein, during the conversion, the current video block is constructed based on a first domain and a second domain, and wherein the conversion further includes applying a forward reshaping process and/or an inverse reshaping process to one or more chroma components of the current video block.

Figure 34B:
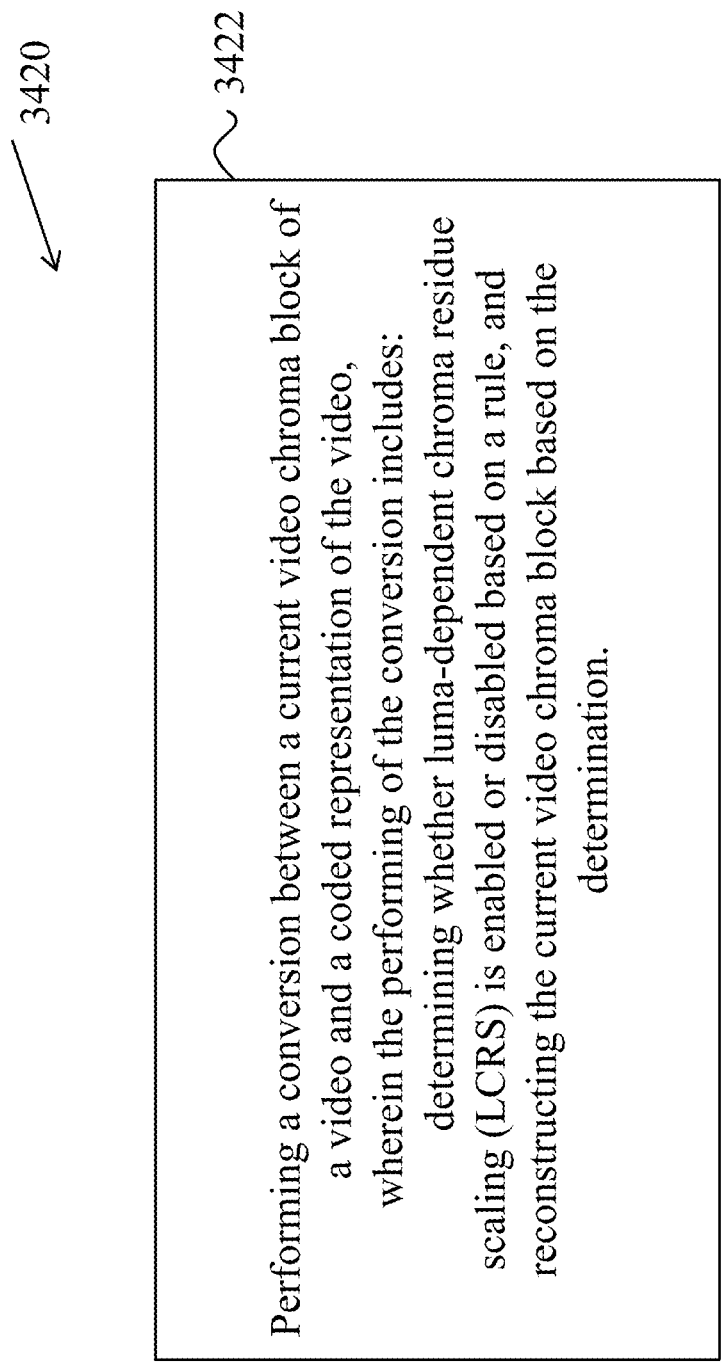

FIG. 34B shows a flowchart of an exemplary method for video processing. The method 3420 includes, at step 3422, performing a conversion between a current video chroma block of a video and a coded representation of the video, wherein the performing of the conversion includes: determining whether luma-dependent chroma residue scaling (LCRS) is enabled or disabled based on a rule, and reconstructing the current video chroma block based on the determination.

Figure 35A:
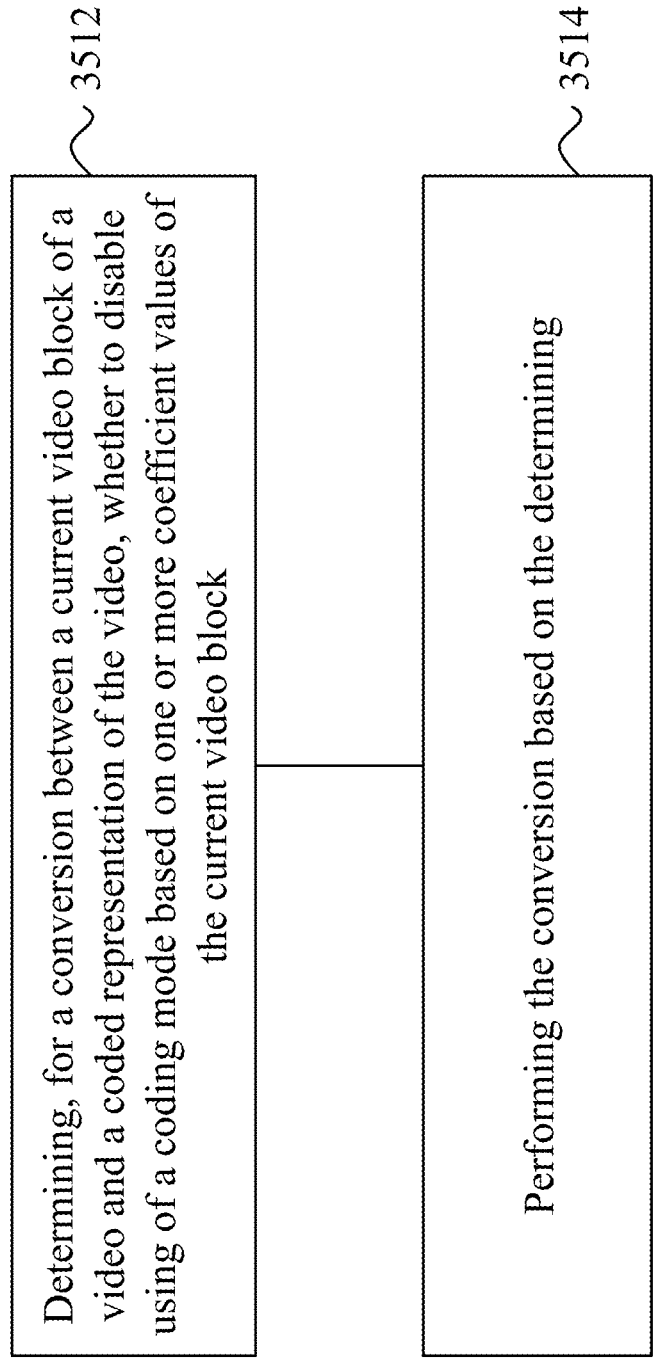

FIG. 35A shows a flowchart of an exemplary method for video processing. The method 3510 includes, at step 3512, determining, for a conversion between a current video block of a video and a coded representation of the video, whether to disable using of a coding mode based on one or more coefficient values of the current video block. The method 3510 further includes, at step 3514, performing the conversion based on the determining. In some implementations, during the conversion using the coding mode, the current video block is constructed based on a first domain and a second domain and/or chroma residue is scaled in a luma-dependent manner.

Figure 35B:
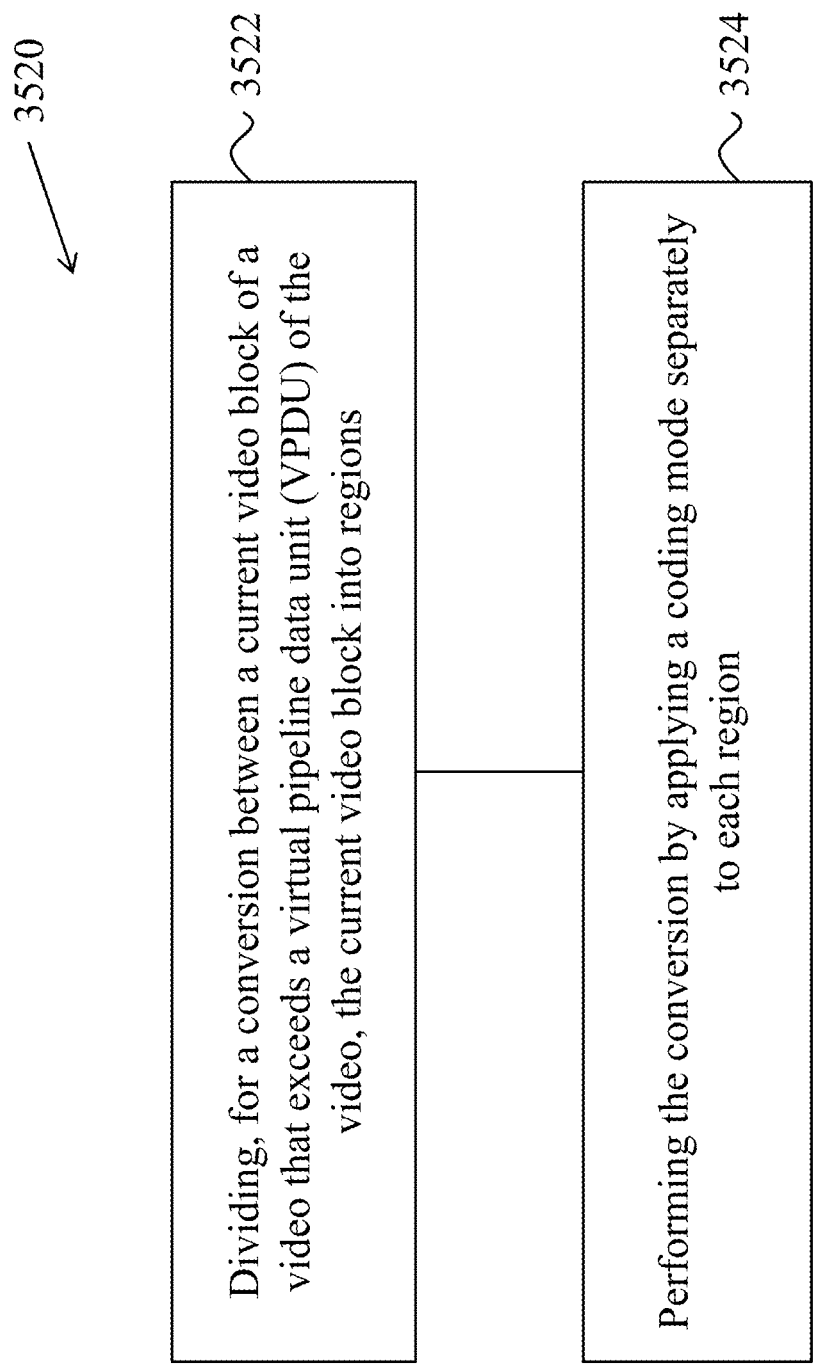

FIG. 35B shows a flowchart of an exemplary method for video processing. The method 3520 includes, at step 3522, dividing, for a conversion between a current video block of a video that exceeds a virtual pipeline data unit (VPDU) of the video, the current video block into regions. The method 3520 further includes, at step 3524, performing the conversion by applying a coding mode separately to each region.

In some implementations, during the conversion by applying the coding mode, the current video block is constructed based on a first domain and a second domain and/or chroma residue is scaled in a luma-dependent manner.

Figure 35C:
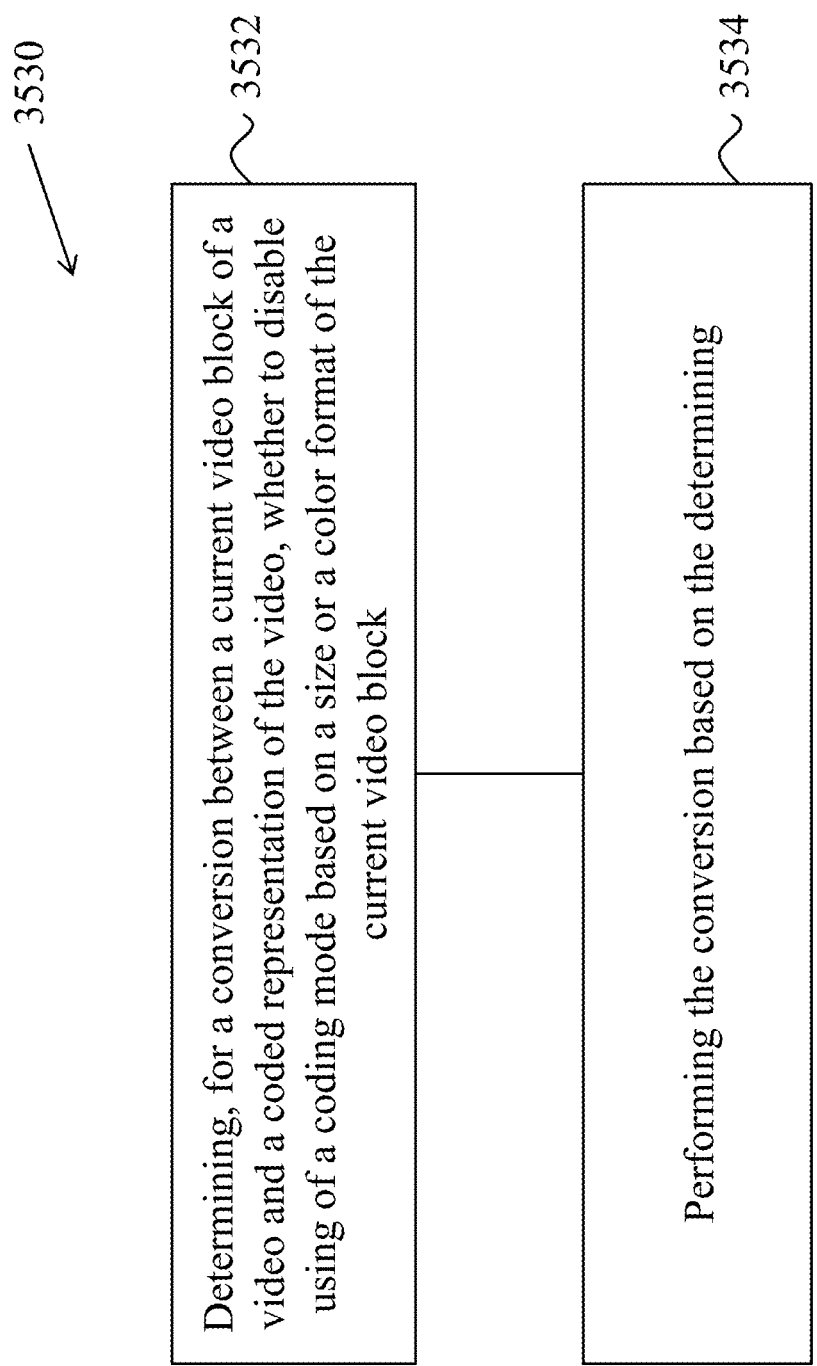

FIG. 35C shows a flowchart of an exemplary method for video processing. The method 3530 includes, at step 3532, determining, for a conversion between a current video block of a video and a coded representation of the video, whether to disable using of a coding mode based on a size or a color format of the current video block. The method 3530 further includes, at step 3534, performing the conversion based on the determining. In some implementations, during the conversion using the coding mode, the current video block is constructed based on a first domain and a second domain and/or chroma residue is scaled in a luma-dependent manner.

FIG. 35D shows a flowchart of an exemplary method for video processing. The method 3540 includes, at step 3542, performing a conversion between a current video block of a video and a coded representation of the video, wherein the conversion uses a coding mode in which the current video block is constructed based on a first domain and a second domain and/or chroma residue is scaled in a luma-dependent manner, and wherein at least one syntax element in the coded representation provides an indication of a usage of the coding mode and an indication of a reshaper model.

Figure 35E:
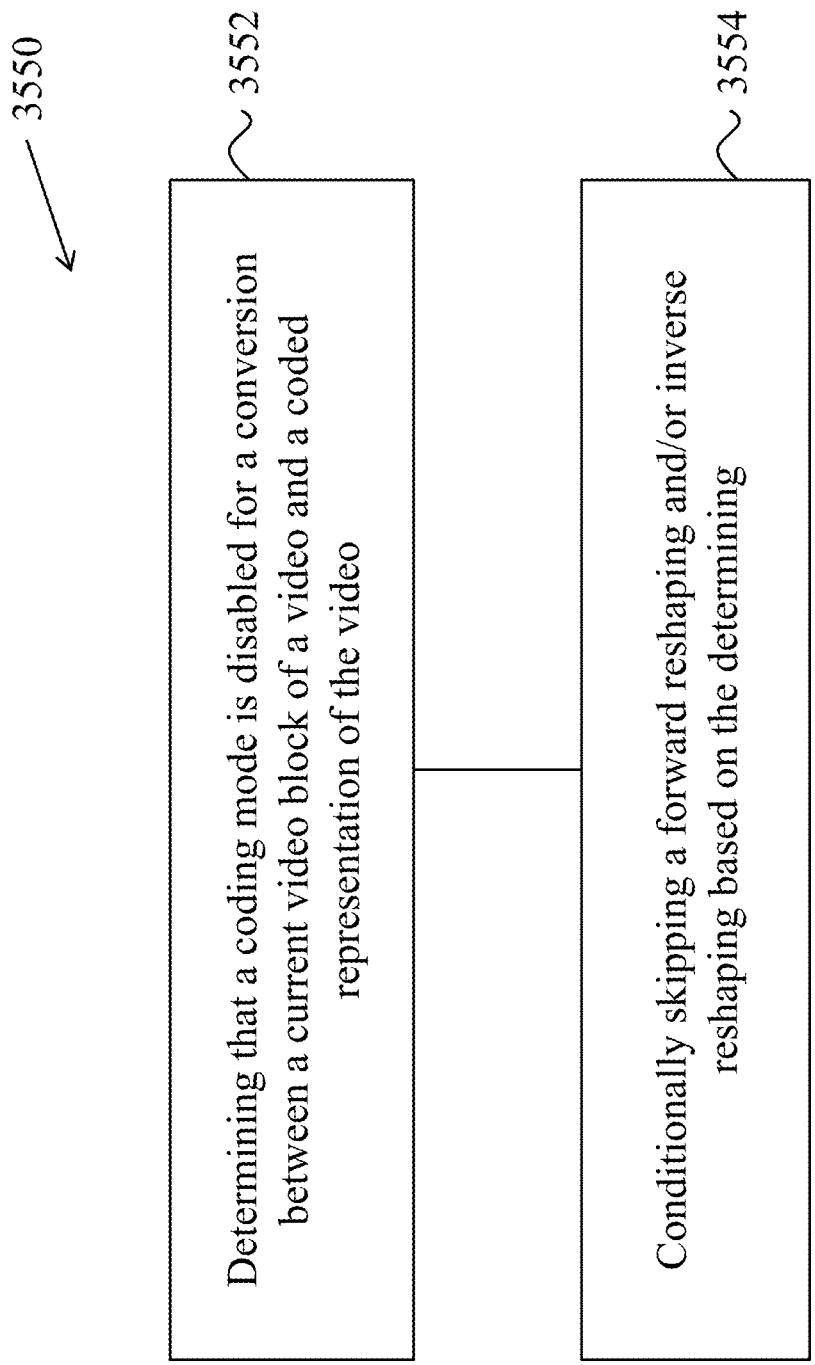

FIG. 35E shows a flowchart of an exemplary method for video processing. The method 3550 includes, at step 3552, determining that a coding mode is disabled for a conversion between a current video block of a video and a coded representation of the video. The method 3550 further includes, at step 3554, conditionally skipping a forward reshaping and/or inverse reshaping based on the determining. In some implementations, in the coding mode, the current video block is constructed based on a first domain and a second domain and/or chroma residue is scaled in a luma-dependent manner.

FIG. 35F shows a flowchart of an exemplary method for video processing. The method 3560 includes, at step 3562, performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein multiple forward reshaping and/or multiple inverse reshaping are applied in the reshaping mode for the video region.

Figure 36A:
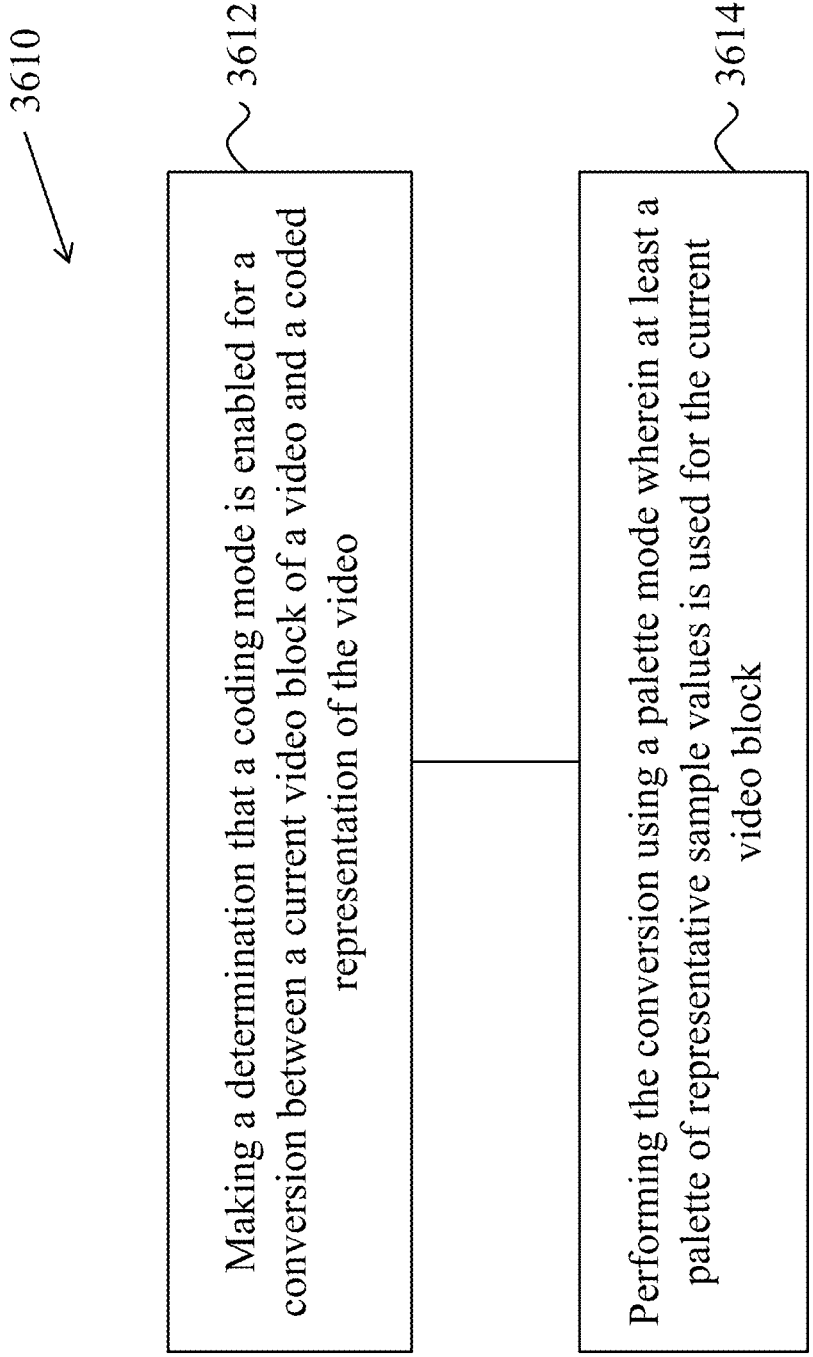
FIGS. 36A to 36C show flowcharts of example methods for video processing.

FIG. 36A shows a flowchart of an exemplary method for video processing. The method 3610 includes, at step 3612, making a determination that a coding mode is enabled for a conversion between a current video block of a video and a coded representation of the video. The method 3610 further includes, at step 3614, performing the conversion using a palette mode wherein at least a palette of representative sample values is used for the current video block. In some implementations, in the coding mode, the current video block is constructed based on samples in a first domain and a second domain and/or chroma residue is scaled in a luma-dependent manner.

Figure 36B:
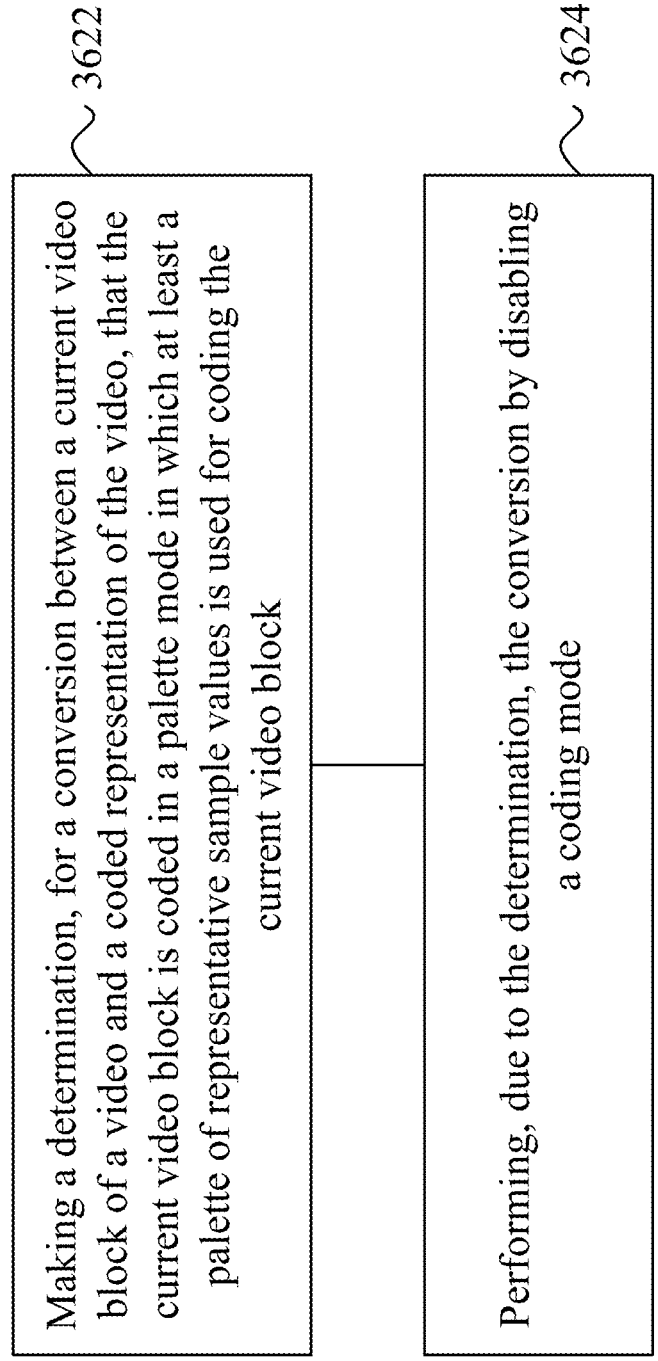
Figure 36C:
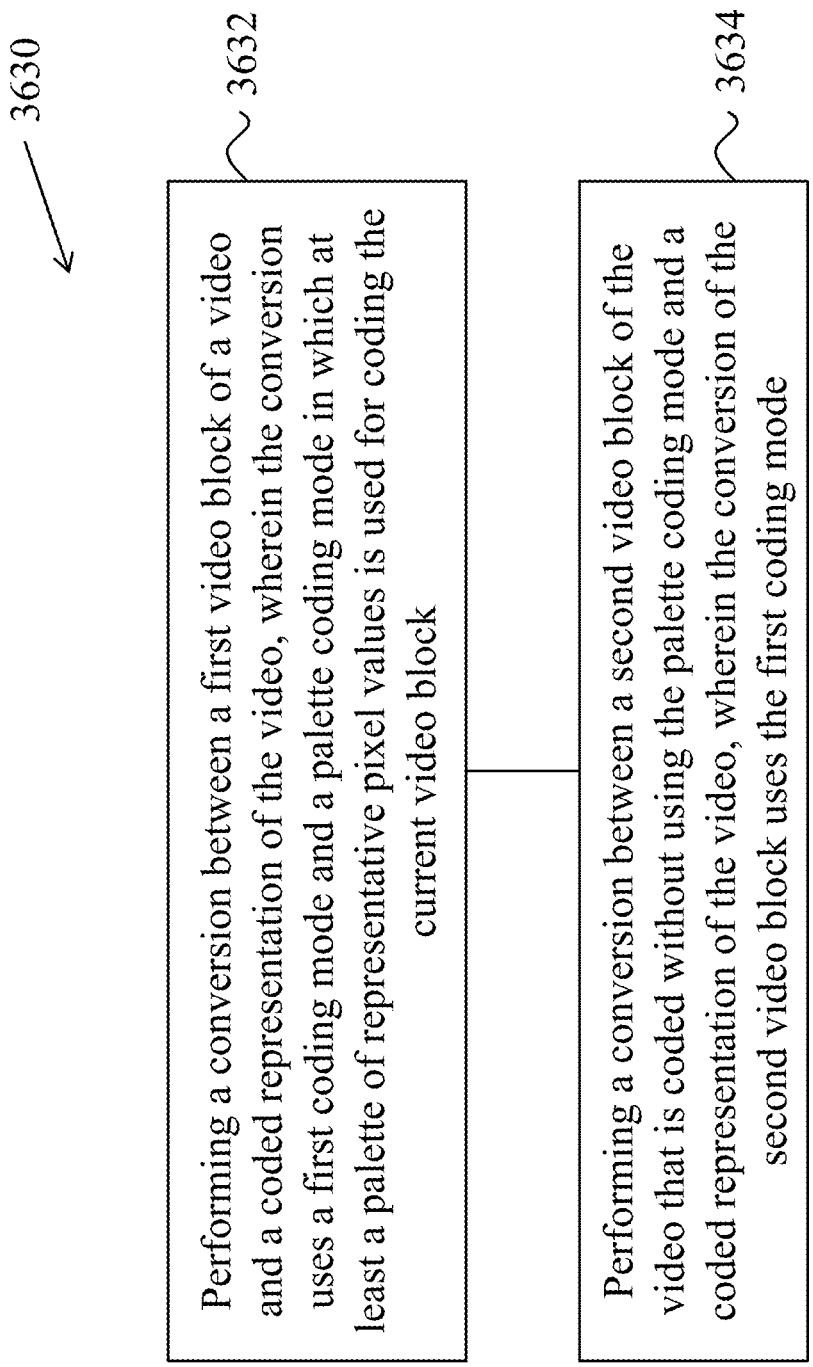

FIG. 36B shows a flowchart of an exemplary method for video processing. The method 3620 includes, at step 3622, making a determination, for a conversion between a current video block of a video and a coded representation of the video, that the current video block is coded in a palette mode in which at least a palette of representative sample values is used for coding the current video block. The method 3620 further includes, at step 2624, performing, due to the determination, the conversion by disabling a coding mode. In some implementations, when the coding mode is applied to a video block, the video block is constructed based on chroma residue that is scaled in a luma-dependent manner FIG. 36C shows a flowchart of an exemplary method for video processing. The method 3630 includes, at step 3632, performing a conversion between a first video block of a video and a coded representation of the video, wherein the conversion uses a first coding mode and a palette coding mode in which at least a palette of representative pixel values is used for coding the current video block. The method 3630 further includes, at step 3634, performing a conversion between a second video block of the video that is coded without using the palette coding mode and a coded representation of the video, wherein the conversion of the second video block uses the first coding mode. When the first coding mode is applied to a video block, the video block is constructed based on a first domain and a second domain and/or chroma residue is scaled in a luma-dependent manner. In some implementations, the first coding mode is applied in different manners to the first video block and second video block.

FIG. 37A shows a flowchart of an exemplary method for video processing. The method 3710 includes, at step 3712, making a determination that a coding mode is enabled for a conversion between a current video block of a video and a coded representation of the video. The method 3710 further includes, at step 3714, performing the conversion using an intra block copy mode which generates a prediction block using at least a block vector pointing to a picture that includes the current video block. In the coding mode, the current video block is constructed based on samples in a first domain and a second domain and/or chroma residue is scaled in a luma-dependent manner.

FIG. 37B shows a flowchart of an exemplary method for video processing. The method 3720 includes, at step 3722, making a determination, for a conversion between a current video block of a video and a coded representation of the video, that the current video block is coded in an intra block copy (IBC) mode that generates a prediction block using at least a block vector pointing to a video frame containing the current video block for coding the current video block. The method 3720 further includes, at step 3724, performing, due to the determination, the conversion by disabling a coding mode. When the coding mode is applied to a video block, the video block is constructed based on a first domain and a second domain and/or chroma residue is scaled in a luma-dependent manner.

Figure 37C:
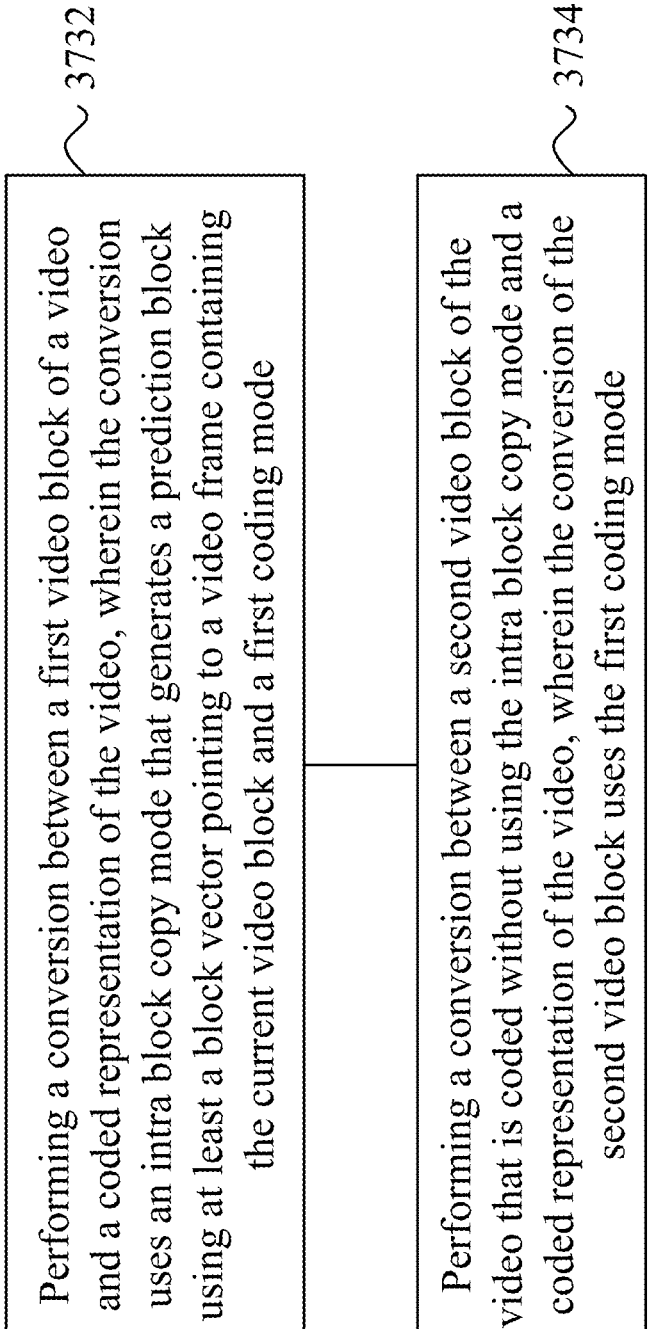

FIG. 37C shows a flowchart of an exemplary method for video processing. The method 3730 includes, at step 3732, performing a conversion between a first video block of a video and a coded representation of the video, wherein the conversion uses an intra block copy mode that generates a prediction block using at least a block vector pointing to a video frame containing the current video block and a first coding mode. The method 3730 further includes, at step 3734, performing a conversion between a second video block of the video that is coded without using the intra block copy mode and a coded representation of the video, wherein the conversion of the second video block uses the first coding mode. When the first coding mode is applied to a video block, the video block is constructed based on a first domain and a second domain and/or chroma residue is scaled in a luma-dependent manner, and the first coding mode is applied in different manners to the first video block and to the second video block.

Figure 38A:
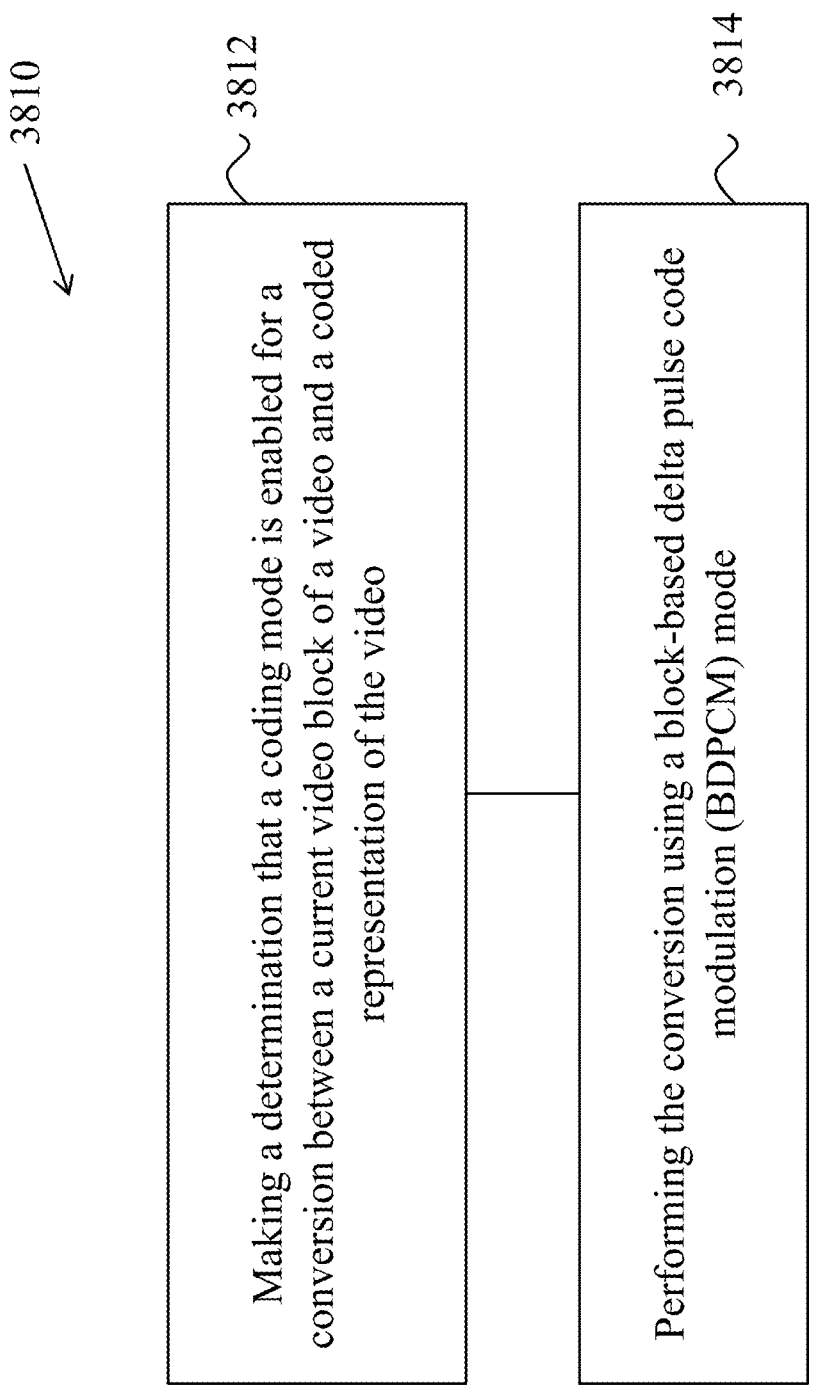

FIG. 38A shows a flowchart of an exemplary method for video processing. The method 3810 includes, at step 3812, making a determination that a coding mode is enabled for a conversion between a current video block of a video and a coded representation of the video. The method 3810 further includes, at step 3814, performing the conversion using a block-based delta pulse code modulation (BDPCM) mode. In the coding mode, the current video block is constructed based on samples in a first domain and a second domain and/or chroma residue is scaled in a luma-dependent manner.

Figure 38B:
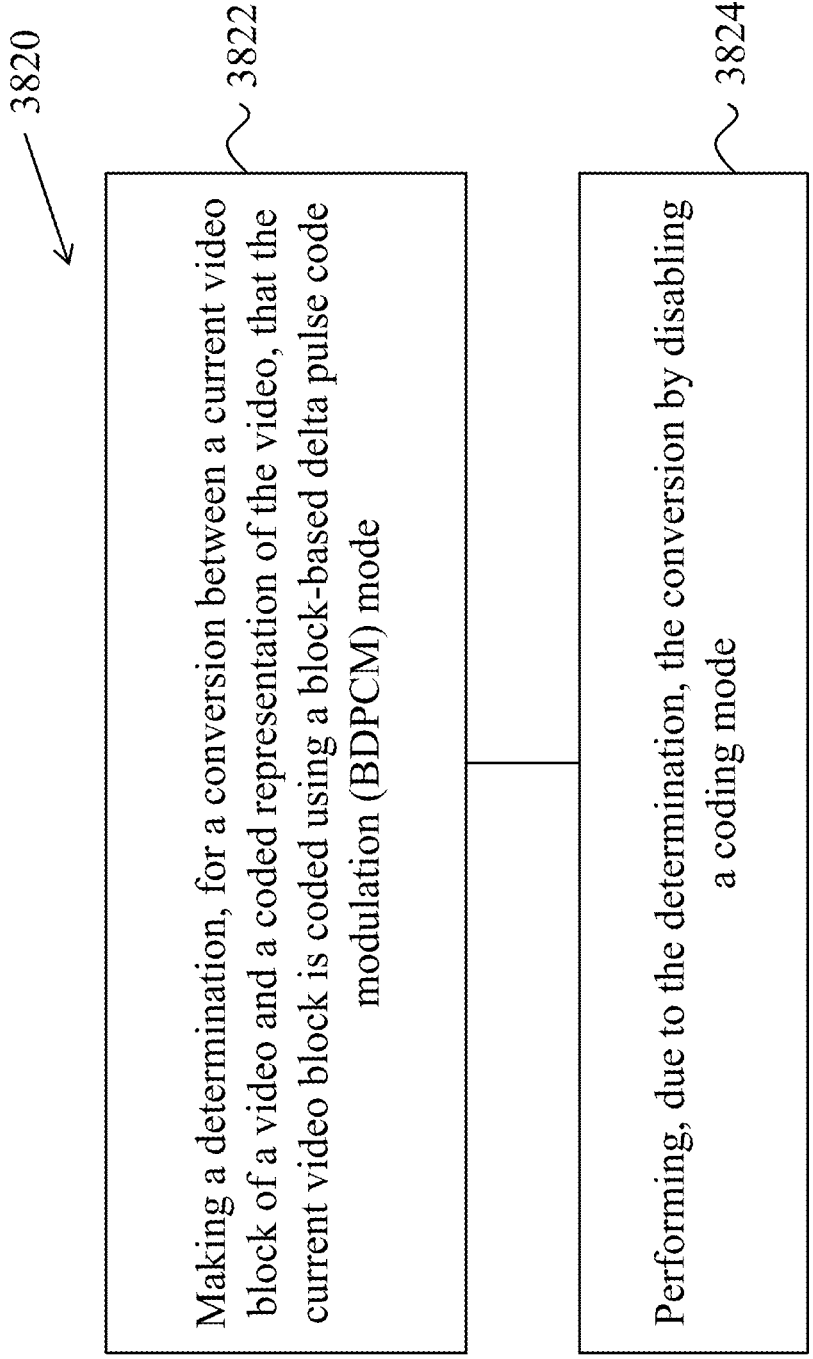

FIG. 38B shows a flowchart of an exemplary method for video processing. The method 3820 includes, at step 3822, making a determination, for a conversion between a current video block of a video and a coded representation of the video, that the current video block is coded using a block-based delta pulse code modulation (BDPCM) mode. The method 3820 further includes, at step 3824, performing, due to the determination, the conversion by disabling a coding mode. When the coding mode is applied to a video block, the video block is constructed based on a first domain and a second domain and/or chroma residue is scaled in a luma-dependent manner.

FIG. 38C shows a flowchart of an exemplary method for video processing. The method 3830 includes, at step 3832, performing a conversion between a first video block of a video and a coded representation of the video, wherein the conversion of the first video block uses a first coding mode and a block-based delta pulse code modulation (BDPCM) mode. The method 3830 further includes, at step 3834, performing a conversion between a second video block of the video and a coded presentation of the video, wherein the second video block is coded without using the BDPCM mode and the conversion of the second video block uses the first coding mode. When the first coding mode is applied to a video block, the video block is constructed based on a first domain and a second domain and/or chroma residue is scaled in a luma-dependent manner, and the first coding mode is applied in different manners to the first video block and the second video block.

Figure 38D:
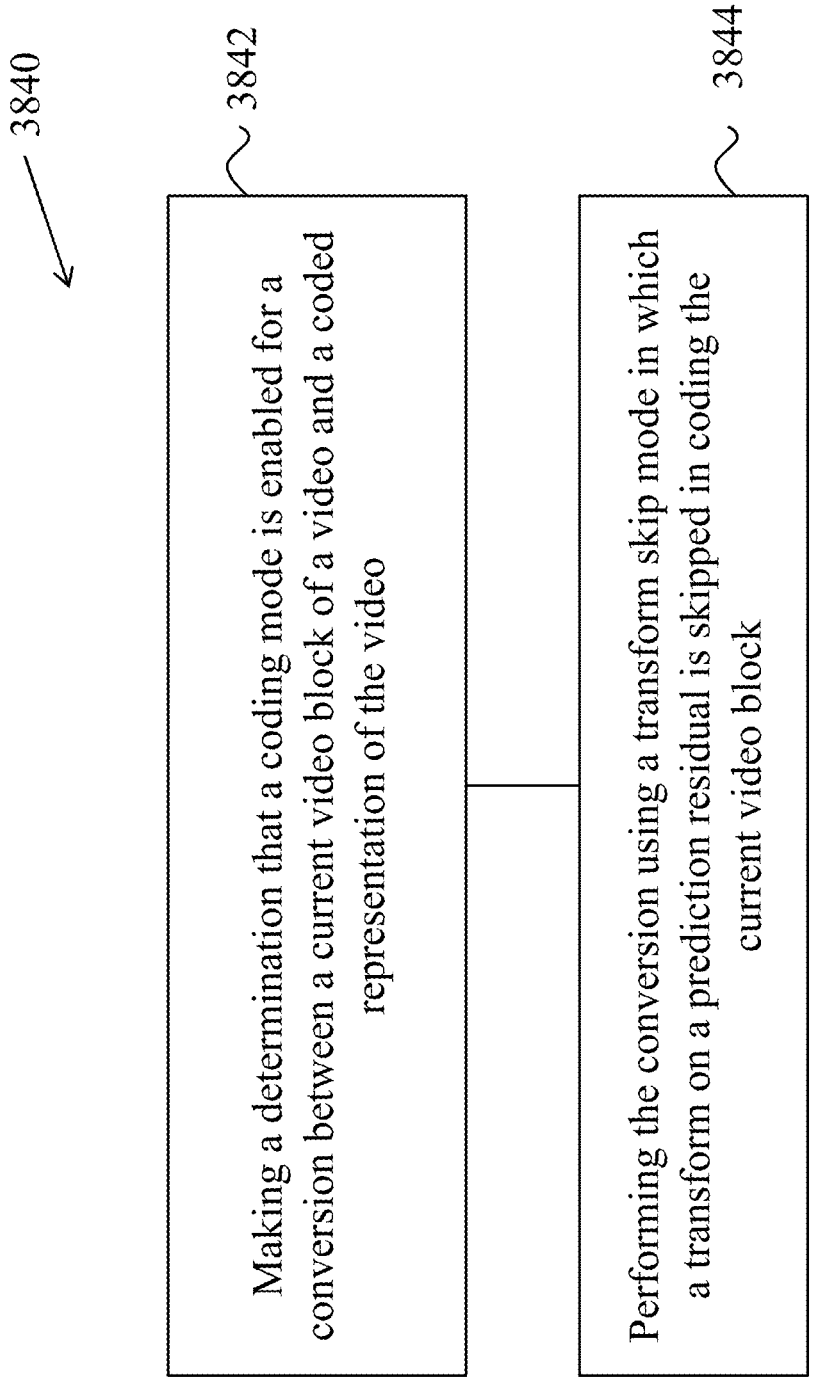

FIG. 38D shows a flowchart of an exemplary method for video processing. The method 3840 includes, at step 3842, making a determination that a coding mode is enabled for a conversion between a current video block of a video and a coded representation of the video. The method further includes, at step 3844, performing the conversion using a transform skip mode in which a transform on a prediction residual is skipped in coding the current video block. In the coding mode, the current video block is constructed based on samples in a first domain and a second domain and/or chroma residue is scaled in a luma-dependent manner.

Figure 38E:
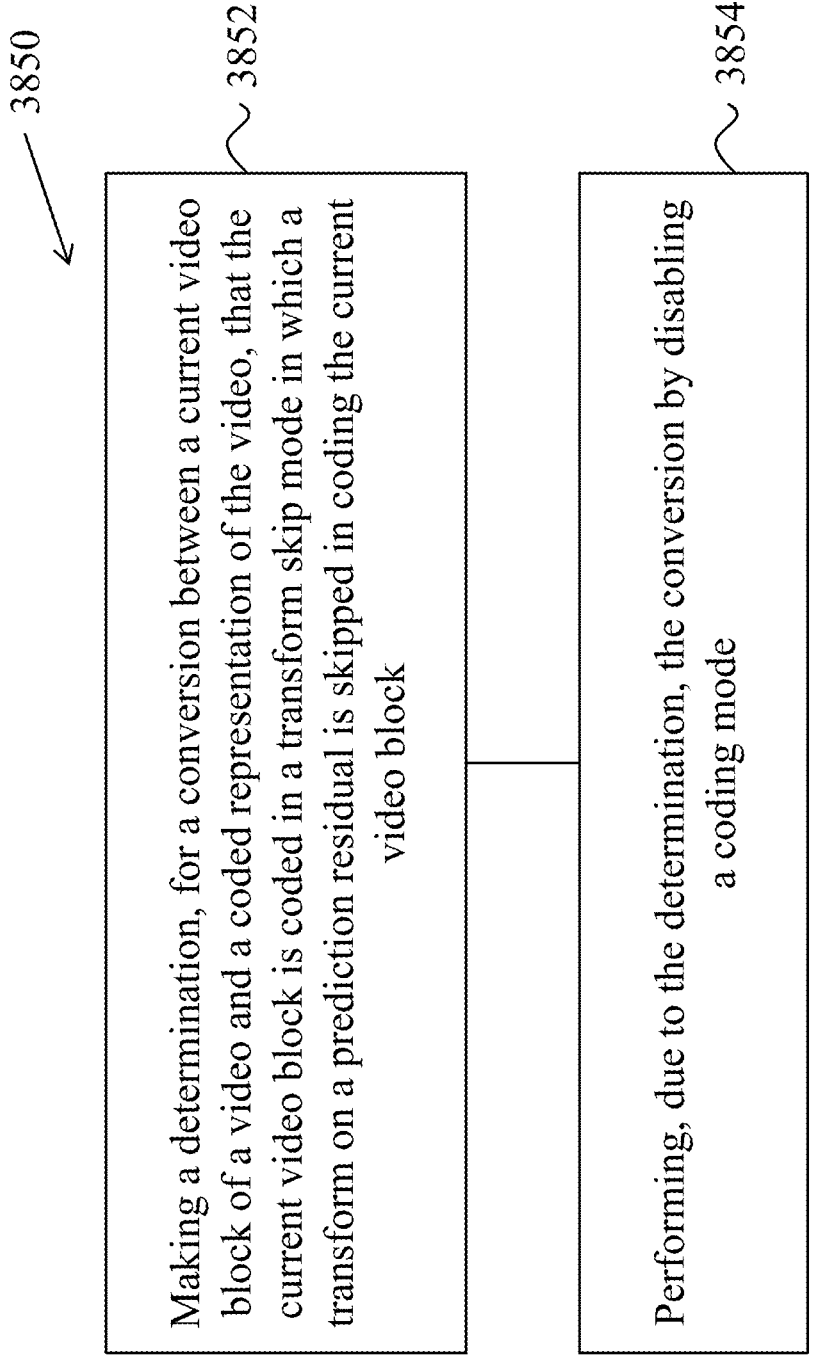

FIG. 38E shows a flowchart of an exemplary method for video processing. The method 3850 includes, at step 3852, making a determination, for a conversion between a current video block of a video and a coded representation of the video, that the current video block is coded in a transform skip mode in which a transform on a prediction residual is skipped in coding the current video block. The method 3850 further includes, at step 3854, performing, due to the determination, the conversion by disabling a coding mode. When the coding mode is applied to a video block, the video block is constructed based on a first domain and a second domain and/or chroma residue is scaled in a luma-dependent manner.

FIG. 38F shows a flowchart of an exemplary method for video processing. The method 3860 includes, at step 3862, performing a conversion between a first video block of a video and a coded representation of the video, wherein the conversion of the first video block uses a first coding mode and a transform skip mode in which a transform on a prediction residual is skipped in coding the current video block. The method 3860 further includes, at step 3864, performing a conversion between a second video block of the video and a coded representation of the video, wherein the second video block is coded without using the transform skip mode and the conversion of the second video block uses the first coding mode. When the first coding mode is applied to a video block, the video block is constructed based on a first domain and a second domain and/or chroma residue is scaled in a luma-dependent manner, and the first coding mode is applied in different manners to the first video block and the second video block FIG. 38G shows a flowchart of an exemplary method for video processing. The method 3870 includes, at step 3872, making a determination that a coding mode is enabled for a conversion between a current video block of a video and a coded representation of the video. The method 3870 further includes, at step 3874, performing the conversion using an intra pulse code modulation mode in which the current video block is coded without applying a transform and a transform-domain quantization. In the coding mode, the current video block is constructed based on samples in a first domain and a second domain and/or chroma residue is scaled in a luma-dependent manner.

Figure 38H:
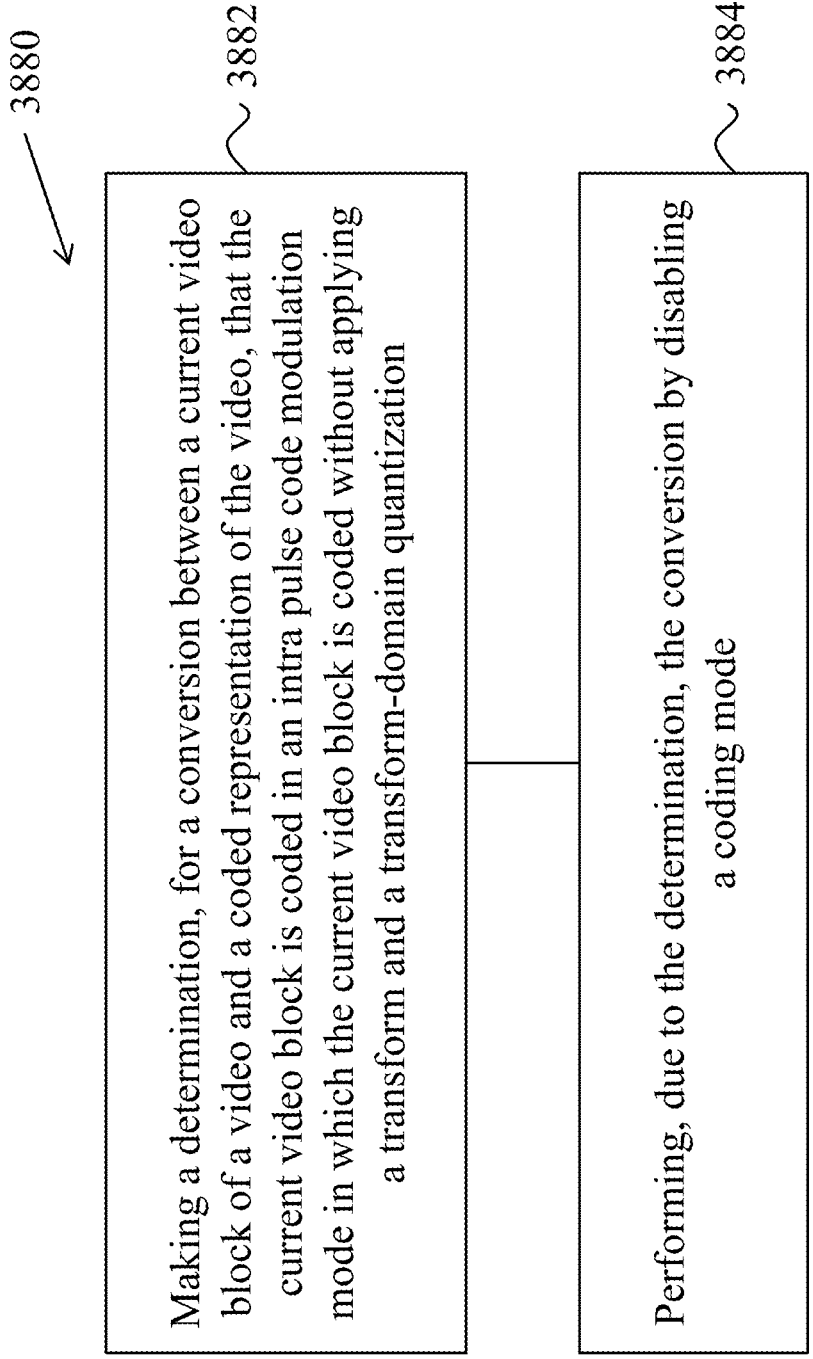

FIG. 38H shows a flowchart of an exemplary method for video processing. The method 3880 includes, at step 3882, making a determination, for a conversion between a current video block of a video and a coded representation of the video, that the current video block is coded in an intra pulse code modulation mode in which the current video block is coded without applying a transform and a transform-domain quantization. The method 3880 further includes, at step 3884, performing, due to the determination, the conversion by disabling a coding mode. When the coding mode is applied to a video block, the video block is constructed based on a first domain and a second domain and/or chroma residue is scaled in a luma-dependent manner.

FIG. 38I shows a flowchart of an exemplary method for video processing. The method 3890 includes, at step 3892, performing a conversion between a first video block of a video and a coded representation of the video, wherein the conversion of the first video block uses a first coding mode and an intra pulse code modulation mode in which the current video block is coded without applying a transform and a transform-domain quantization. The method 3890 further includes, at step 3894, performing a conversion between a second video block of the video and a coded presentation of the video, wherein the second video block is coded without using the intra pulse code modulation mode and the conversion of the second video block uses the first coding mode. When the first coding mode is applied to a video block, the video block is constructed based on a first domain and a second domain and/or chroma residue is scaled in a luma-dependent manner, and the first coding mode is applied in different manners to the first video block and the second video block.

FIG. 38J shows a flowchart of an exemplary method for video processing. The method 3910 includes, at step 3912, making a determination that a coding mode is enabled for a conversion between a current video block of a video and a coded representation of the video. The method 3910 further includes, at step 3914, performing the conversion using a modified transquant-bypass mode in which the current video block is losslessly coded without a transform and a quantization. In the coding mode, the current video block is constructed based on samples in a first domain and a second domain and/or chroma residue is scaled in a luma-dependent manner.

FIG. 38K shows a flowchart of an exemplary method for video processing. The method 3920 includes, at step 3922, making a determination, for a conversion between a current video block of a video and a coded representation of the video, that the current video block is coded in a transquant-bypass mode in which the current video block is losslessly coded without a transform and a quantization. The method 3920 further includes, at step 3924, performing, due to the determination, the conversion by disabling a coding mode. When the coding mode is applied to a video block, the video block is constructed based on a first domain and a second domain and/or chroma residue is scaled in a luma-dependent manner.

FIG. 38L shows a flowchart of an exemplary method for video processing. The method 3930 includes, at step 3932, performing a conversion between a first video block of a video and a coded representation of the video, wherein the conversion of the first video block uses a first coding mode and a transquant-bypass mode in which the current video block is losslessly coded without a transform and a quantization. The method 3930 further includes, at step 3934, performing a conversion between a second video block of the video and a coded presentation of the video, wherein the second video block is coded without using the transquant-bypass mode and the conversion of the second video block uses the first coding mode. When the first coding mode is applied to a video block, the video block is constructed based on a first domain and a second domain and/or chroma residue is scaled in a luma-dependent manner, and the first coding mode is applied in different manners to the first video block and the second video block.

Figure 39A:
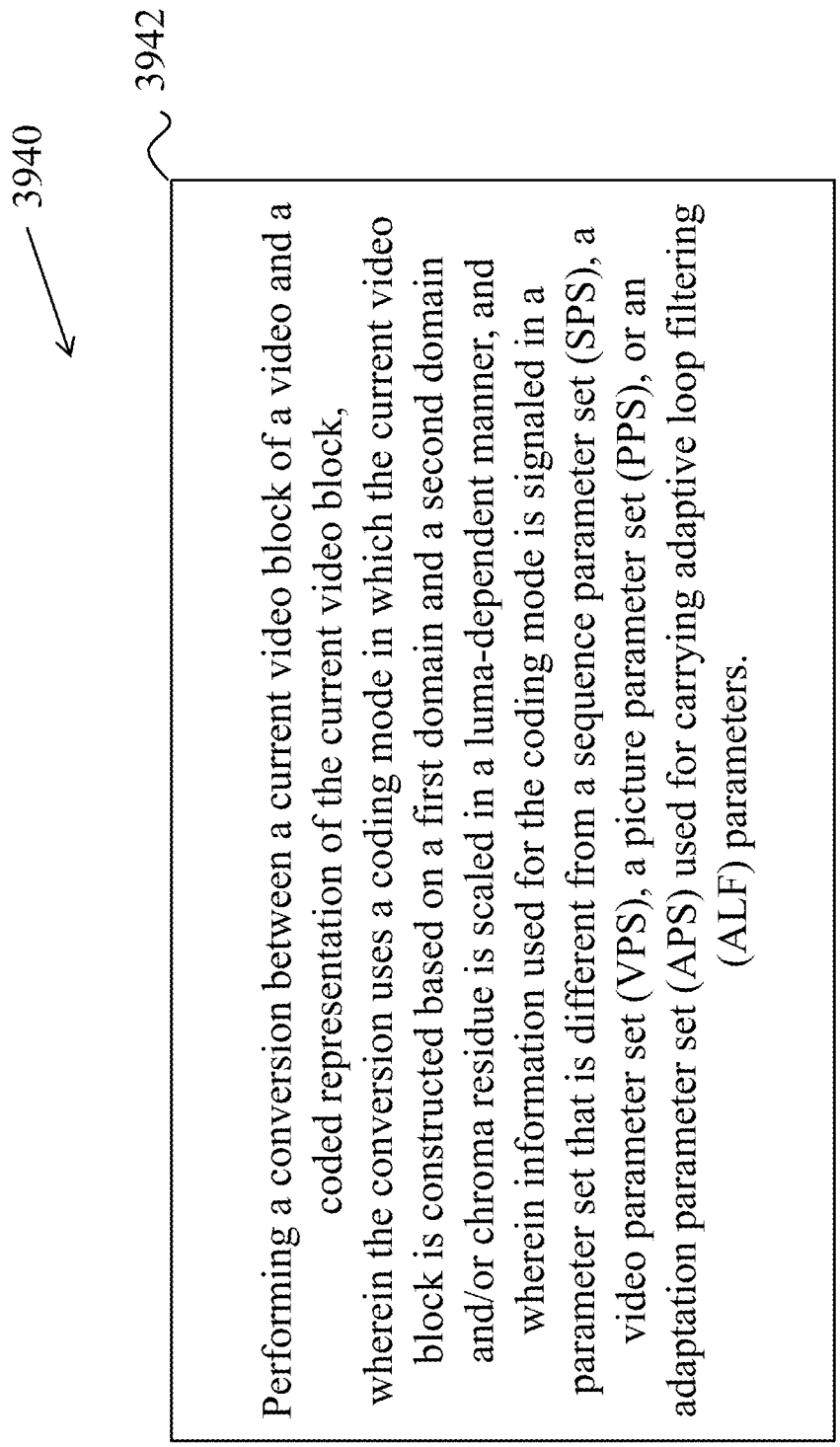
FIGS. 39A to 39E show flowcharts of example methods for video processing.

FIG. 39A shows a flowchart of an exemplary method for video processing. The method 3940 includes, at step 3942, performing a conversion between a current video block of a video and a coded representation of the video, wherein the conversion uses a coding mode in which the current video block is constructed based on a first domain and a second domain and/or chroma residue is scaled in a luma-dependent manner, and wherein information used for the coding mode is signaled in a parameter set that is different from a sequence parameter set (SPS), a video parameter set (VPS), a picture parameter set (PPS), or an adaptation parameter set (APS) used for carrying adaptive loop filtering (ALF) parameters.

Figure 39B:
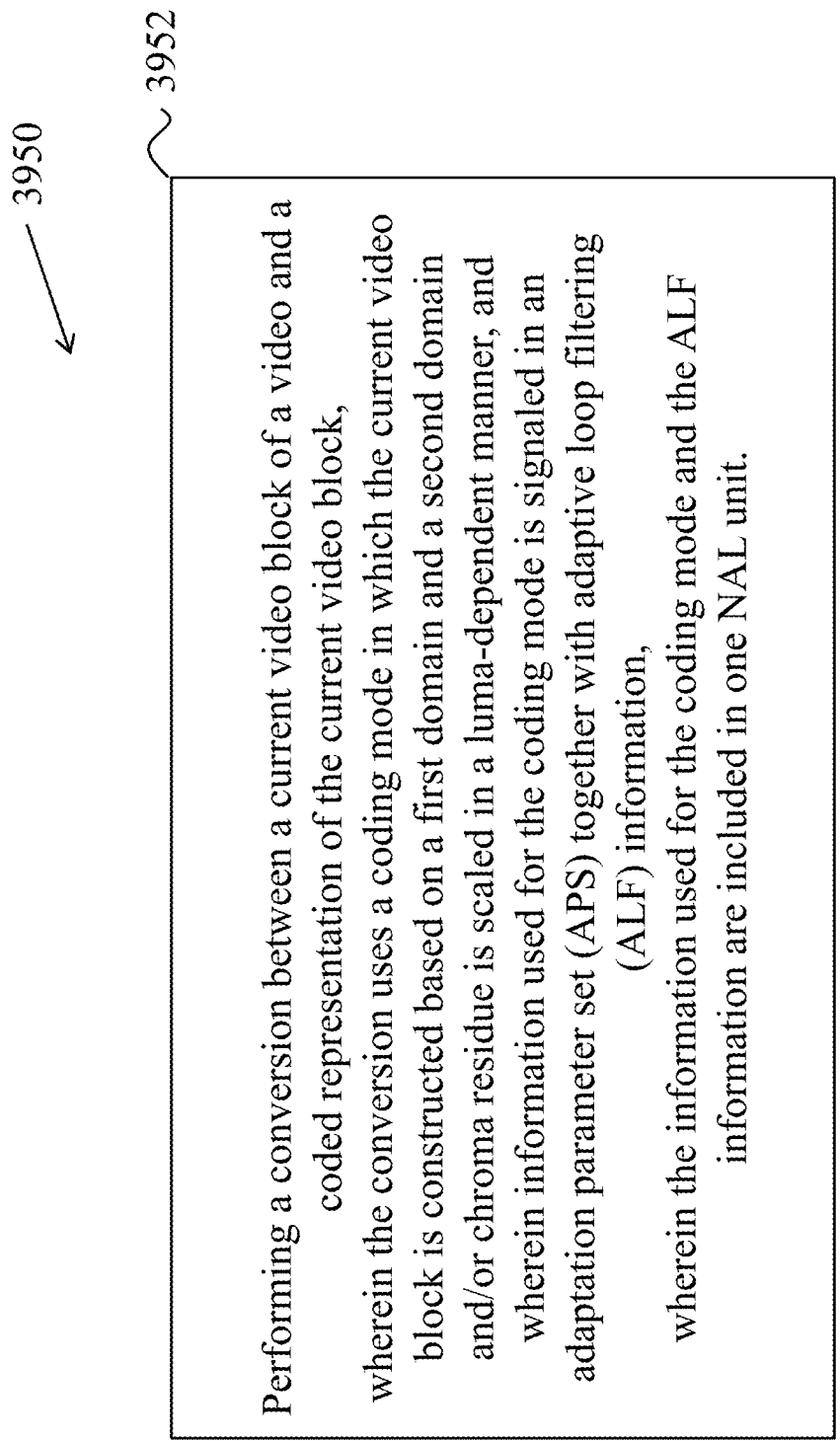

FIG. 39B shows a flowchart of an exemplary method for video processing. The method 3950 includes, at step 3952, performing a conversion between a current video block of a video and a coded representation of the video, wherein the conversion uses a coding mode in which the current video block is constructed based on a first domain and a second domain and/or chroma residue is scaled in a luma-dependent manner, and wherein information used for the coding mode is signaled in an adaptation parameter set (APS) together with adaptive loop filtering (ALF) information, wherein the information used for the coding mode and the ALF information are included in one NAL unit.

Figure 39C:
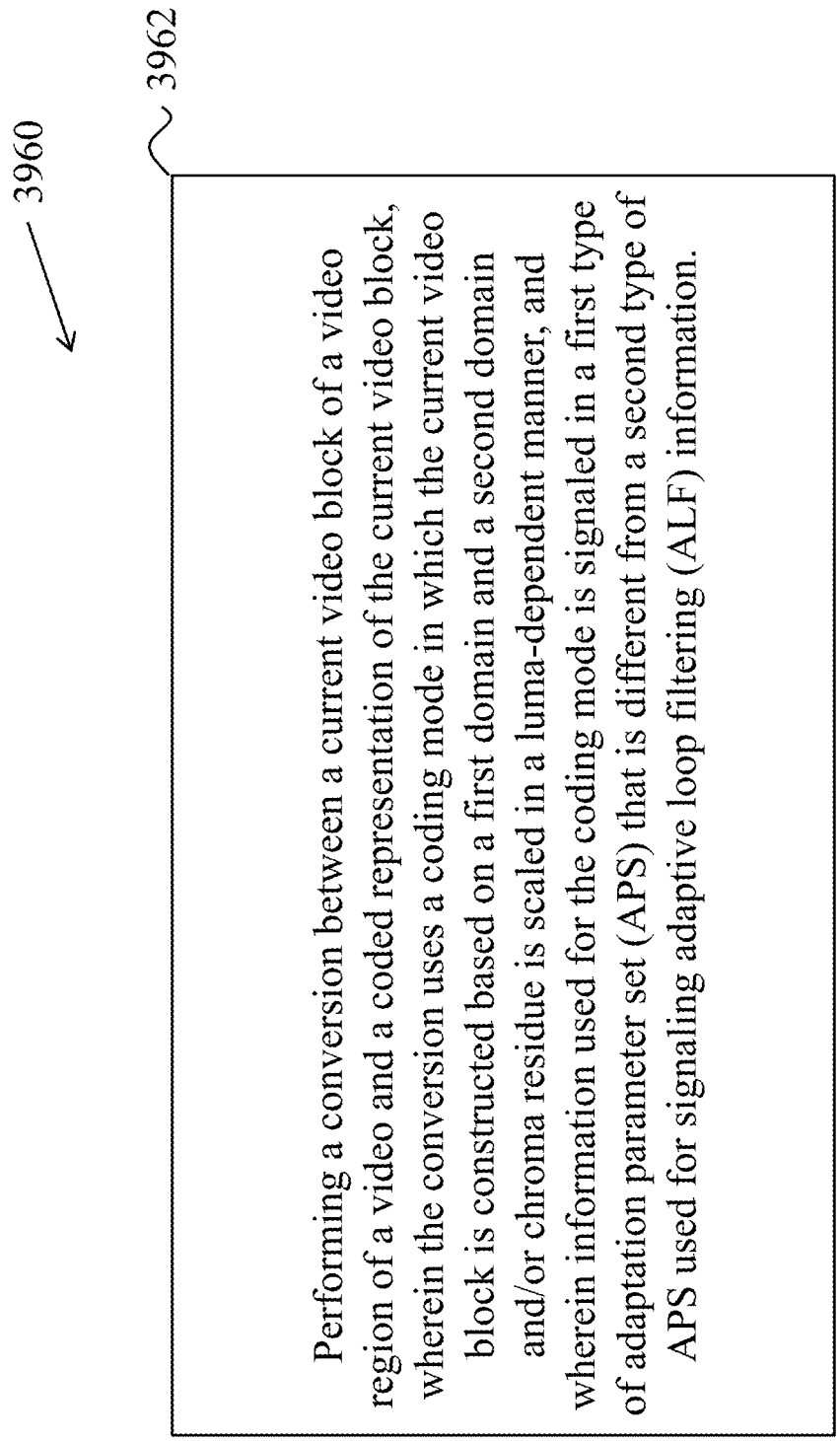

FIG. 39C shows a flowchart of an exemplary method for video processing. The method 3960 includes, at step 3962, performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein information used for the coding mode is signaled in a first type of adaptation parameter set (APS) that is different from a second type of APS used for signaling adaptive loop filtering (ALF) information.

Figure 39D:
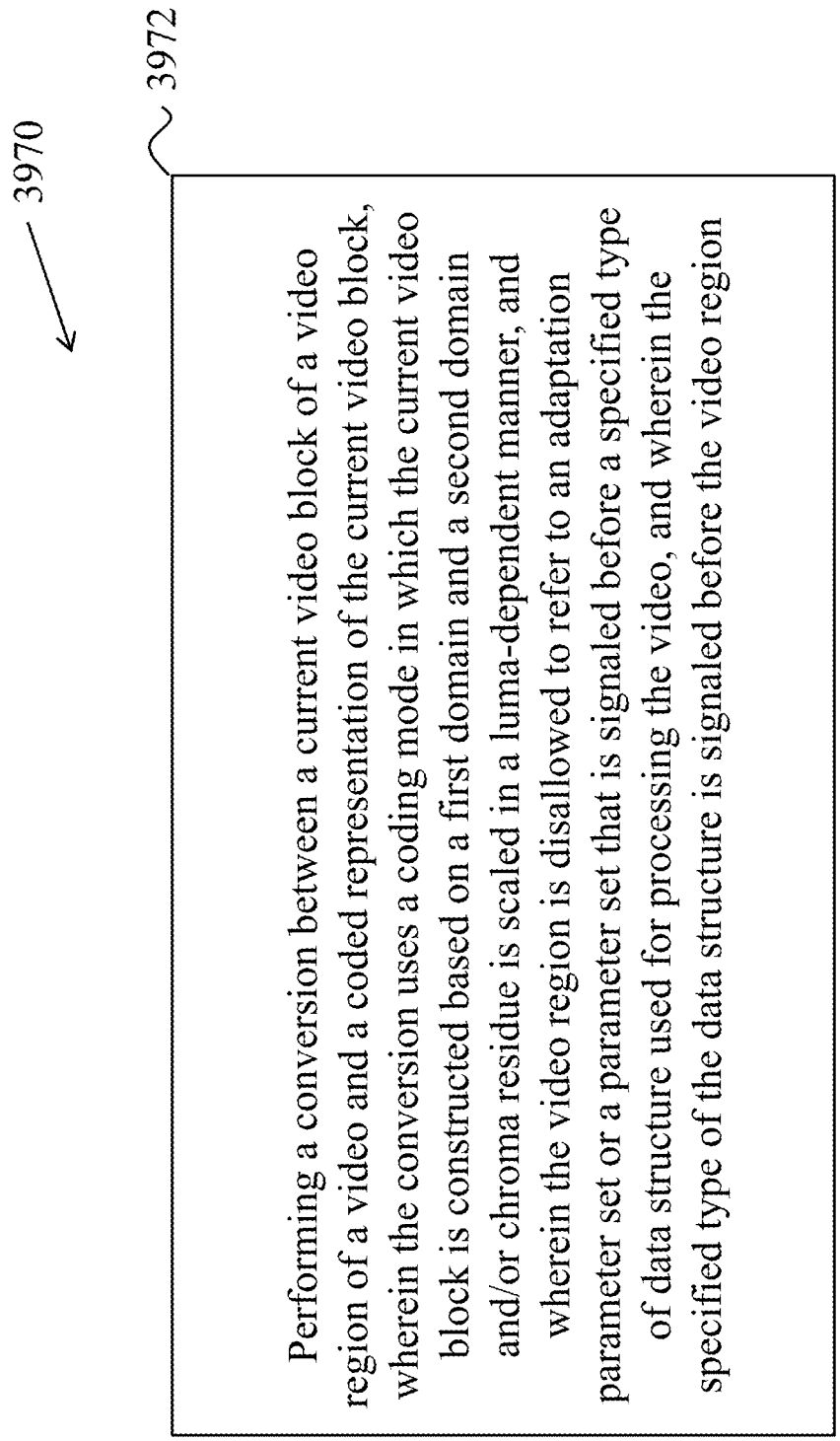

FIG. 39D shows a flowchart of an exemplary method for video processing. The method 3970 includes, at step 3972, performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein the video region is disallowed to refer to an adaptation parameter set or an parameter set that is signaled before a specified type of data structure used for processing the video, and wherein the specified type of the data structure is signaled before the video region.

Figure 39E:
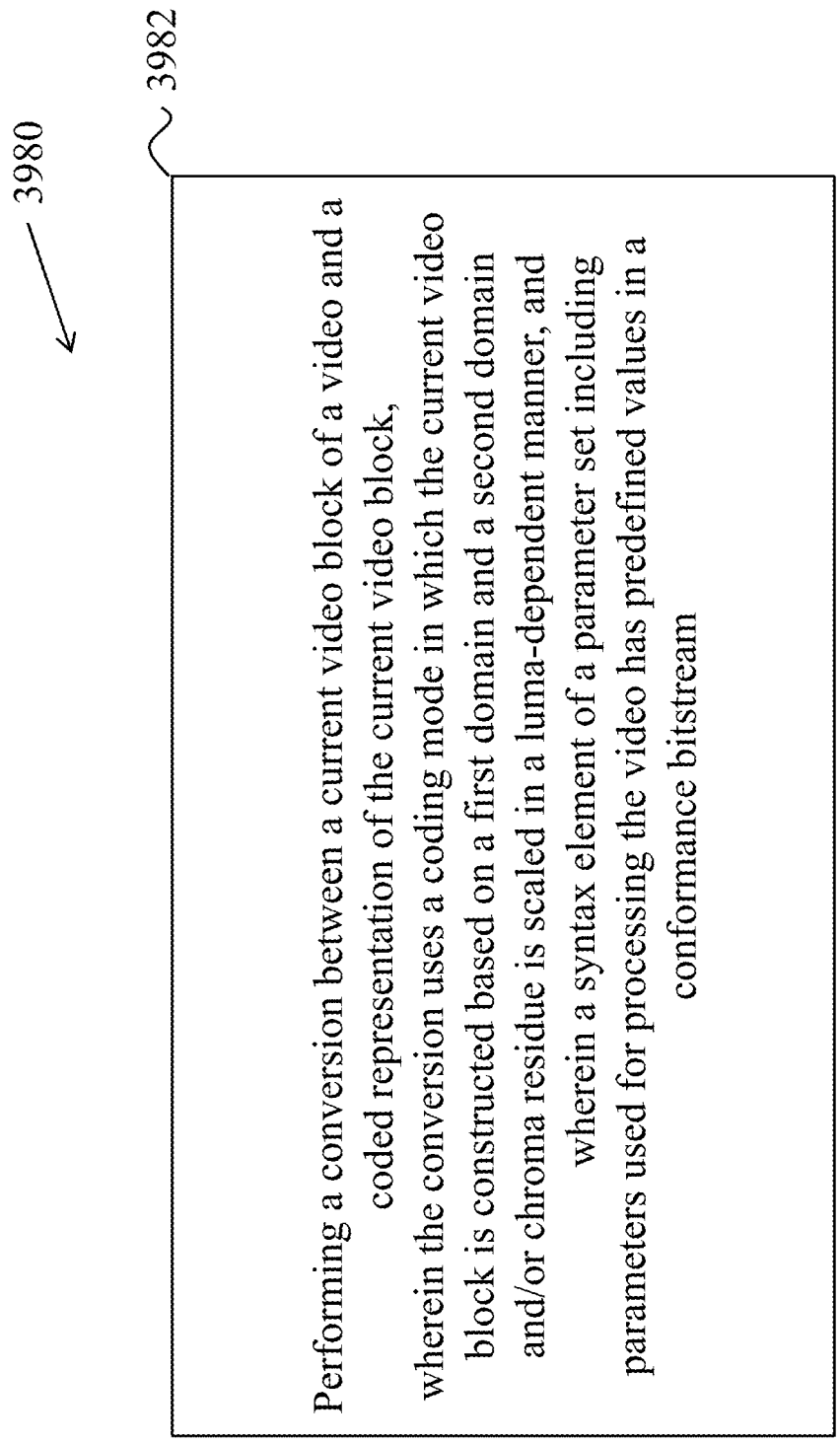

FIG. 39E shows a flowchart of an exemplary method for video processing. The method 3980 includes, at step 3982, performing a conversion between a current video block of a video and a coded representation of the video, wherein the conversion uses a coding mode in which the current video block is constructed based on a first domain and a second domain and/or chroma residue is scaled in a luma-dependent manner, and wherein a syntax element of a parameter set including parameters used for processing the video has predefined values in a conformance bitstream.

Figure 40A:
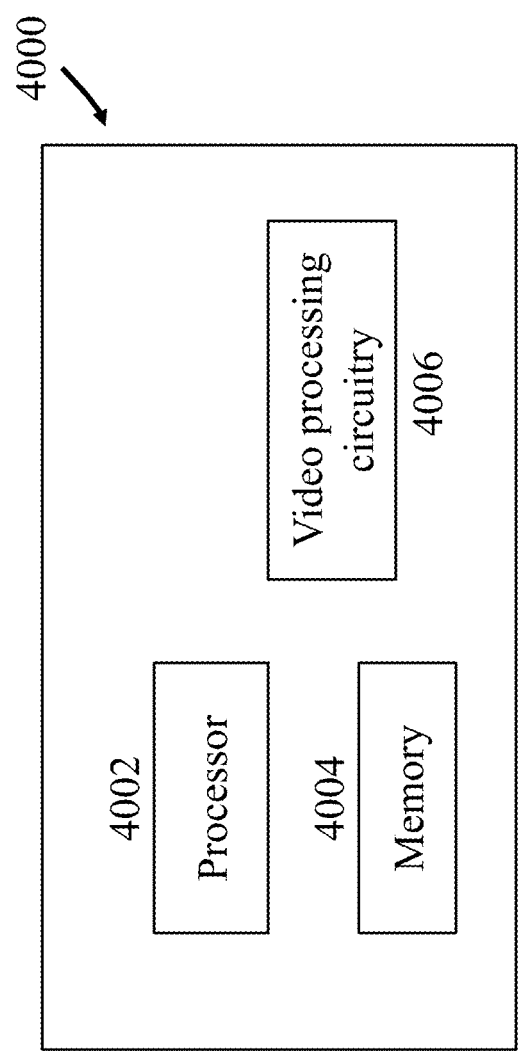
FIGS. 40A and 40B show examples of hardware platforms for implementing a visual media decoding or a visual media encoding technique described in the present document.

FIG. 40A is a block diagram of a video processing apparatus 4000. The apparatus 4000 may be used to implement one or more of the methods described herein. The apparatus 4000 may be embodied in a smartphone, tablet, computer, Internet of Things (IoT) receiver, and so on. The apparatus 4000 may include one or more processors 4002, one or more memories 4004 and video processing hardware 4006. The processor(s) 4002 may be configured to implement one or more methods (including, but not limited to, methods as shown in FIGS. 31A to 39E) described in the present document. The memory (memories) 4004 may be used for storing data and code used for implementing the methods and techniques described herein. The video processing hardware 4006 may be used to implement, in hardware circuitry, some techniques described in the present document.

Figure 40B:
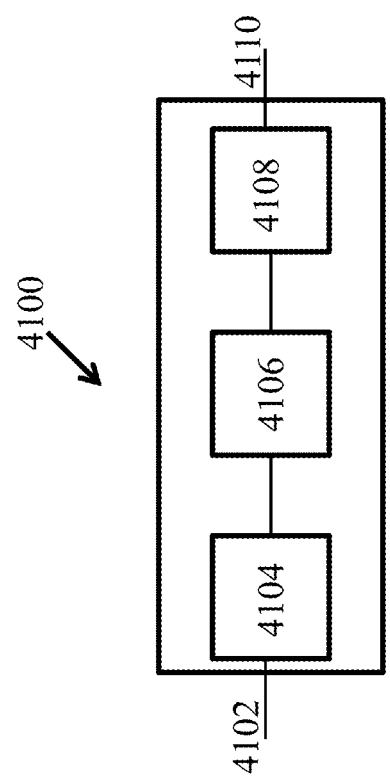

FIG. 40B is another example of a block diagram of a video processing system in which disclosed techniques may be implemented. FIG. 40B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 40A or 40B.

Various techniques and embodiments may be described using the following clause-based format.

The first set of clauses describe certain features and aspects of the disclosed techniques listed in the previous section, including, for example, Examples 1 and 2.

1. A method for video processing, comprising: performing, for a conversion between a current video block of a video and a coded representation of the video, a motion information refinement process based on samples in a first domain or a second domain; and performing the conversion based on a result of the motion information refinement process, wherein, during the conversion, the samples are obtained for the current video block from a first prediction block in the first domain using an unrefined motion information, at least a second prediction block is generated in the second domain using a refined motion information used for determining a reconstruction block, and reconstructed samples of the current video block are generated based on the at least the second prediction block.

2. The method of clause 1, wherein the at least second prediction block is generated from samples in reference pictures in the first domain using the refined motion information, and a reshaping process to convert the first domain to the second domain is further applied to the at least second prediction block.

3. The method of clause 2, after the reshaping process, the second prediction block is converted into the representation in the second domain before being used to generate the reconstructed samples of the current video block.

4. The method of clause 1, wherein the performing the motion information refinement process is based on a decoder-side motion vector derivation (DMVD) method.

5. The method of clause 4, wherein the DMVD method comprises decoder-side motion vector refinement (DMVR) or frame-rate up conversion (FRUC) or Bi-Directional Optical Flow (BIO).

6. The method of clause 4, wherein a cost calculation or a gradient calculation in the DMVD process is performed based on samples in the first domain.

7. The method of clause 6, wherein the cost calculation comprises a sum of absolute differences (SAD) or a mean-removed sum of absolute differences (MR-SAD).

8. The method of clause 1, wherein the motion information refinement process is performed based on samples which are converted from the samples in at least the first prediction block in the first domain to the second domain, and wherein, after the refined motion information is obtained, a coding mode in which the current video block is constructed based on a first domain and a second domain and/or chroma residue is scaled in a luma-dependent manner is disabled for at least the second prediction block.

9. The method of clause 4, wherein the motion information refinement process is performed based on at least the first prediction block in the first domain, and wherein the motion information refinement process is invoked with the first prediction block in the first domain.

10. The method of clause 1, wherein a final prediction block is generated as a weighted average of two second prediction blocks and the reconstructed samples of the current video block are generated based on the final prediction block.

11. The method of clause 1, wherein the motion information refinement process is performed based on the prediction block in the first domain, and wherein, after performing of the motion information refinement process, a coding mode in which the current video block is constructed based on a first domain and a second domain and/or chroma residue is scaled in a luma-dependent manner is disabled for the at least second prediction blocks.

12. A method for video processing, comprising: performing a conversion between a current video block of a video and a coded representation of the video, wherein, during the conversion, the current video block is constructed based on a first domain and a second domain and/or chroma residue is scaled in a luma-dependent manner, wherein a coding tool is applied during the conversion using parameters that are derived at least based on first set of samples in a video region of the video and second set of samples in a reference picture of the current video block, and wherein a domain for the first samples and a domain for the second samples are aligned.

13. The method of clause 12, wherein the coding tool includes a local illumination compensation (LIC) model that uses a linear model of illumination changes in the current video block during the conversion, and the LIC model is applied based on the parameters.

14. The method of clause 12, wherein the video region includes a current tile, a tile group, or a picture.

15. The method of clause 13, wherein the LIC model is applied to a prediction block in the second domain and wherein the first set of samples and the second set of samples are in the second domain.

16. The method of clause 13, wherein a reference block is converted to the second domain and the LIC model is applied to a prediction block in the second domain.

17. The method of clause 15, wherein the first set of samples and the second set of samples are converted to the second domain before being used to derive the parameters.

18. The method of clause 17, wherein the second set of samples includes reference samples in reference pictures and neighboring and/or non-adjacent samples of the reference samples.

19. The method of clause 13, wherein the LIC model is applied to a prediction block in the first domain and wherein the first set of samples and the second set of samples are in the first domain.

20. The method of clause 13, wherein a reference block is maintained in the first domain, and the LIC model is applied to a prediction block in the first domain.

21. The method of clause 19, wherein the first set of samples are converted to the first domain before being used to derive the parameters.

22. The method of clause 21, wherein the first set of samples includes spatially neighboring and/or non-adjacent samples of current video block.

23. The method of clause 12, wherein a domain used to derive the parameters is used to apply the parameters to a prediction block.

24. The method of clause 13, wherein the LIC model is applied to a prediction block in the second domain.

25. The method of clause 20 or 21, wherein after the LIC model is applied to the prediction block in the first domain, a final prediction block that is dependent on the prediction block is converted to the second domain.

26. The method of any of clauses 1-25, wherein the first domain is an original domain and the second domain is a reshaped domain using a luma mapping with chroma scaling (LMCS) method which maps luma samples to particular values.

27. The method of clause 26, wherein the LMCS uses piecewise linear model to map the luma samples to particular values.

28. The method of any of clauses 1-27, wherein the performing of the conversion includes generating the coded representation from the current block.

29. The method of any of clauses 1-27, wherein the performing of the conversion includes generating the current block from the coded representation.

30. An apparatus in a video system comprising a processor and a non-transitory memory with instructions thereon, wherein the instructions upon execution by the processor, cause the processor to implement the method in any one of clauses 1 to 29.

31. A computer program product stored on a non-transitory computer readable media, the computer program product including program code for carrying out the method in any one of clauses 1 to 29.

The second set of clauses describe certain features and aspects of the disclosed techniques listed in the previous section, including, for example, Examples 3-5, 8, and 15.

1. A method for video processing, comprising: determining, for a current video block of a current video region of a video, a parameter for a coding mode of the current video block based on one or more parameters for a coding mode of a previous video region; and performing a coding for the current video block to generate a coded representation of the video based on the determining, and wherein the parameter for the coding mode is included in a parameter set in the coded representation of the video, and wherein the performing of the coding comprises transforming a representation of the current video block in a first domain to a representation of the current video block in a second domain, and wherein, during the performing of the coding using the coding mode, the current video block is constructed based on the first domain and the second domain and/or chroma residue is scaled in a luma-dependent manner.

2. A method for video processing comprising: receiving a coded representation of a video including a parameter set including parameter information for a coding mode; and performing a decoding of the coded representation by using the parameter information to generate a current video block of a current video region of the video from the coded representation, and wherein the parameter information for the coding mode is based on one or more parameters for the coding mode of a previous video region, wherein, in the coding mode, the current video block is constructed based on the first domain and the second domain and/or chroma residue is scaled in a luma-dependent manner.

3. The method of clause 1 or 2, wherein the parameter set is different from a tile group header.

4. The method of clause 1 or 2, wherein the parameter set is an adaptation parameter set (APS).

5. The method of clause 1 or 2, wherein the current video region comprises one tile of a video picture of the video or a video picture of the video;

6. The method of clause 1 or 2, wherein the previous video region comprises one or more tiles of the picture.

7. The method of clause 1 or 2, wherein the previous video region comprises one or more video pictures of the video.

8. A method for video processing, comprising: performing a conversion between a current video block of a video and a coded representation of the video, and wherein the conversion includes applying a filtering operation to a prediction block in a first domain or in a second domain different from the first domain.

9. The method of clause 8, wherein the filtering operation is performed on the prediction block in the first domain to generate a filtered prediction signal, a coding mode is applied to the filtered prediction signal to generate a reshaped prediction signal which is in the second domain, and the current video block is constructed using the reshaped prediction signal.

10. The method of clause 8, wherein a coding mode is applied to the prediction block prior to the applying of the filtering operation to generate a reshaped prediction signal which is in the second domain, and the filtering operation is performed using the reshaped prediction signal to generate a filtered prediction signal, and the current video block is constructed using the filtered prediction signal.

11. The method of clause 9 or 10, wherein, in the coding mode, the current video block is constructed based on the first domain and the second domain and/or chroma residue is scaled in a luma-dependent manner.

12. The method of any of clauses 8-11, wherein the filtering operation comprises a diffusion filter.

13. The method of any of clauses 8-11, wherein parameters associated with the filtering operation are dependent on whether the filtering operation is applied to a block in the first domain or the second domain.

14. The method of clause 8, wherein the conversion further includes: applying, before the applying of the filtering operation, a motion compensation prediction to the current video block to obtain a prediction signal; applying, after the applying of the filtering operation, a coding mode to a filtered prediction signal to generate a reshaped prediction signal, the filtered prediction signal generated by applying the filtering operation to the prediction signal; and constructing the current video block using the reshaped prediction signal.

15. The method of clause 8, wherein the conversion further includes: applying, before the applying of the filtering operation, a motion compensation prediction to the current video block to obtain a prediction signal; applying a coding mode to the prediction signal to generate a reshaped prediction signal; and constructing, after the applying of the filtering operation, the current video block using a filtered reshaped prediction signal, wherein the filtered reshaped prediction signal generated by applying the filtering operation to the reshaped prediction signal.

16. A method for video processing, comprising: performing a conversion between a current video block of a video and a coded representation of the video, wherein, during the conversion, a final reconstruction block is determined for the current video block, and wherein the temporary reconstruction block is generated using a prediction method and represented in the second domain.

17. The method of clause 16, wherein the conversion further includes: applying a motion compensation prediction to the current video block to obtain a prediction signal; applying a forward reshaping to the prediction signal to generate a reshaped prediction signal that is used to generate the temporary reconstruction block; and applying an inverse reshaping to the temporary reconstruction block to obtain an inverse reconstruction block, and wherein the filtering is applied to the inverse reconstruction block to generate a final reconstruction block.

18. The method of clause 16, wherein the conversion further includes: applying a motion compensation prediction to the current video block to obtain a prediction signal; applying a forward reshaping to the prediction signal to generate a reshaped prediction signal that is used to generate the temporary reconstruction block; applying an inverse reshaping to a filtered reconstruction block to obtain a final reconstruction block, and wherein the filtered reconstruction block is generated by applying the filtering to the temporary reconstruction block.

19. The method of any of clauses 16 to 18, wherein the conversion further includes applying a luma dependent chroma residual scaling (LMCS) process which maps lumap samples to particular values.

20. The method of clause 16, wherein the filter is applied to the temporary reconstruction block in the first domain, the temporary reconstruction block in the second domain is firstly converted to the first domain using an inverse reshaping process prior to the application of the filter, and the final reconstruction block is dependent on the filtered temporary reconstruction block.

21. The method of clause 16, wherein the filter is directly applied to the temporary reconstruction block in the second domain, and afterwards, an inverse reshaping operation is applied to generate the final reconstruction block.

22. The method of clause 16, wherein the filter comprises a bilateral filter (BF) or a Hadamard transform domain filter (HF).

23. The method of clause 16, wherein the filter comprises a deblocking filter (DBF) process, a sample adaptive offset (SAO) filtering process, or an adaptive loop filter (ALF) filtering process.

24. The method of any one of clauses 1-23, wherein filter parameters used for the filtering operation or the filter depend on whether a coding mode is enabled or not for the current video block, wherein, in the coding mode, the current video block is constructed based on a first domain and a second domain and/or chroma residue is scaled in a luma-dependent manner.

25. The method of any of clauses 1-25, wherein the first domain is an original domain and the second domain is a reshaped domain using a luma mapping with chroma scaling (LMCS) method which maps luma samples to particular values.

26. The method of clause 25, wherein the LMCS uses piecewise linear model to map the luma samples to the particular values.

27. The method of any of clauses 8-26, wherein the performing of the conversion includes generating the coded representation from the current block.

28. The method of any of clauses 8-26, wherein the performing of the conversion includes generating the current block from the coded representation.

29. An apparatus in a video system comprising a processor and a non-transitory memory with instructions thereon, wherein the instructions upon execution by the processor, cause the processor to implement the method in any one of clauses 1 to 28.

30. A computer program product stored on a non-transitory computer readable media, the computer program product including program code for carrying out the method in any one of clauses 1 to 28.

The third set of clauses describe certain features and aspects of the disclosed techniques listed in the previous section, including, for example, Example 6.

1. A video processing method, comprising: performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein a parameter set in the coded representation comprises parameter information for the coding mode.

2. The method of clause 1, wherein the parameter set is different from a tile group header.

3. The method of clause 2, wherein the parameter set is an adaptation parameter set (APS).

4. The method of clause 3, wherein the APS for coding mode information is named as luma mapping with chroma scaling (LMCS) APS.

5. The method of clause 3, wherein an identifier for the APS to be utilized for the current video block is contained in the coded representation of the video.

6. The method of clause 5, wherein whether the identifier is present in the coded representation of the video depends on whether the coding mode is enabled for the video region.

7. The method of clause 3, wherein the parameter set contains an identifier of the APS.

8. The method of clause 1, wherein a NAL unit type value is assigned for the parameter set.

9. The method of clause 1, wherein an identifier of the parameter set has a range between 0 to M, wherein M is $2^K-1$.

10. The method of clause 1, wherein the parameter set is shared across pictures of the video.

11. The method of clause 1, wherein an identifier of the parameter set has a value that is fixed-length coded.

12. The method of clause 1, wherein an identifier of the parameter set is coded with an exponential-golomb (EG) code, a truncated unary code, or a binarization code.

13. The method of clause 1, wherein, for two sub-regions within a same picture, the parameter set has identifiers with two different values.

14. The method of clause 3, wherein the parameter set and the APS for adaptive look filter (ALF) information share a same Network Abstraction Layer (NAL) Unit Type (NUT).

15. The method of clause 1, wherein the parameter information is carried with a current APS for adaptive loop filter (ALF) information.

16. The method of clause 1, wherein the parameter information is carried in a sequence parameter set (SPS), a video parameter set (VPS), a picture parameter set (PPS), a sequence, a header or a picture header.

17. The method of clause 1, wherein the parameter information includes at least one of an indication of reshaper model information, a usage of the coding mode, or chroma residual scaling factors.

18. The method of clause 1, wherein the parameter information is signaled in one level.

19. The method of clause 1, wherein the parameter information includes a usage of the coding mode that is signaled in a second level.

20. The method of clause 18 and 19, wherein the parameter information is signaled in an APS and an usage of the coding mode is signaled in the video region-level.

21. The method of clause 1, wherein the parameter information is parsed in one level.

22. The method of clause 1, wherein the parameter information includes a usage of the coding mode that is parsed in a second level.

23. The method of clause 21 or 22, wherein the parameter information is parsed in an APS and a usage of the coding mode is parsed in the video region-level.

24. The method of clause 1, wherein a predictive coding is applied to code the parameter information with different APS indices.

25. The method of any of clauses 1-24, wherein the first domain is an original domain and the second domain is a reshaped domain using a luma mapping with chroma scaling (LMCS) method which maps luma samples to particular values.

26. The method of clause 25, wherein the LMCS uses piecewise linear model to map the luma samples to the particular values.

27. The method of any of clauses 1-26, wherein the video region is a picture or a tile group.

28. The method of any of clauses 1-26, wherein the video region-level is a picture header or a tile group header.

29. The method of any of clauses 1-28, wherein the first domain is an original domain and the second domain is a reshaped domain using a luma mapping with chroma scaling (LMCS) method which maps luma samples to particular values according reshaping models.

30. The method of clause 29, wherein the LMCS uses piecewise linear model to map the luma samples to the particular values.

31. The method of any of clauses 1-30, wherein the performing of the conversion includes generating the coded representation from the current block.

32. The method of any of clauses 1-30, wherein the performing of the conversion includes generating the current block from the coded representation.

33. An apparatus in a video system comprising a processor and a non-transitory memory with instructions thereon, wherein the instructions upon execution by the processor, cause the processor to implement the method in any one of clauses 1 to 32.

34. A computer program product stored on a non-transitory computer readable media, the computer program product including program code for carrying out the method in any one of clauses 1 to 32.

The fourth set of clauses describe certain features and aspects of the disclosed techniques listed in the previous section, including, for example, Examples 7 and 9.

1. A method for video processing, comprising: performing a conversion between a current video block of a video that is a chroma block and a coded representation of the video, wherein, during the conversion, the current video block is constructed based on a first domain and a second domain, and wherein the conversion further includes applying a forward reshaping process and/or an inverse reshaping process to one or more chroma components of the current video block.

2. The method of clause 1, wherein the method further includes refraining from applying a luma-dependent chroma residue scaling (LCRS) to the one or more chroma components of the current video block.

3. The method of clause 1, wherein at least one of a piece-wise linear (PWL) model, a forward look-up table, or a backward look-up table is utilized for a chroma component.

4. The method of clause 3, wherein the PWL model, the forward look-up table, and the backward look-up table for the chroma component are derived from a PWL model, a forward look-up table, a backward look-up table of a corresponding luma component, respectively.

5. The method of clause 3, wherein the PWL model is signaled in a sequence parameter set (SPS), a video parameter set (VPS), an adaptation parameter set (APS), a picture parameter set (PPS), a sequence header, a picture header, a tile group header, a tile header, a coding tree unit (CTU) row, a group of CTUs, or regions.

6. The method of clause 3, wherein the forward look-up table and the backward look-up table are signaled in a sequence parameter set (SPS), a video parameter set (VPS), an adaptation parameter set (APS), a picture parameter set (PPS), a sequence header, a picture header, a tile group header, a tile header, a coding tree unit (CTU) row, a group of CTUs, or regions.

7. A method for video processing, comprising: performing a conversion between a current video chroma block of a video and a coded representation of the video, wherein the performing of the conversion includes: determining whether luma-dependent chroma residue scaling (LCRS) is enabled or disabled based on a rule, and reconstructing the current video chroma block based on the determination.

8. The method of clause 7, wherein the rule specifies that the LCRS is disabled for certain block dimensions, temporal layers, tile group types, picture types, coded modes, certain type of motion information.

9. The method of clause 7, wherein the rule specifies that that the LCRS is disabled to chroma blocks and a forward and/or inverse reshaping process is applied to corresponding luma blocks.

10. The method of clause 7, wherein the rule specifies that LCRS is applied to chroma blocks and a forward and/or inverse reshaping process is not applied to corresponding luma blocks.

11. The method of clause 7, wherein the rule specifies that LCRS is disabled for the current video chroma block coded using a cross component linear model (CCLM).

12. The method of clause 7, wherein the rule specifies that LCRS is disabled for the current video chroma block not coded using a cross component linear model (CCLM).

13. The method of clause 7, wherein the rule specifies that disabling the LCRS is based on a size of a video block exceeding a virtual pipeline data unit (VPDU).

14. The method of clause 13, wherein the LCRS is not allowed in a case that the video block contains video samples that are less than M*H samples.

15. The method of clause 13, wherein the LCRS is not allowed in a case that a minimum size of a width and/or a height of the video block is smaller than or equal to a certain value.

16. The method of clause 13, wherein the LCRS is not allowed in a case that a minimum size of a width and/or a height of the video block is not smaller than a certain value.

17. The method of clause 15 or 16, wherein the certain value is 8.

18. The method of clause 13, wherein the LCRS is not allowed in a case that a width of the video block is equal to or greater than a first value, and/or that a height of the video block is equal to or greater than a second value.

19. The method of clause 13, wherein the LCRS is not allowed in a case that a width of the video block is equal to or less than a first value, and/or that a height of the video block is equal to or less than a second value.

20. The method of clause 18 or 19, wherein at least one of the first value or the second value is 8, 64, or 128.

21. The method of any of clauses 13-20, wherein the video block is a luma block or a chroma block.

22. The method of any of clauses 1-21, wherein the first domain is an original domain and the second domain is a reshaped domain using a luma mapping with chroma scaling (LMCS) method which maps luma samples to particular values according reshaping models.

23. The method of clause 22, wherein the LMCS uses piecewise linear model to map the luma samples to the particular values.

24. The method of any of clauses 1-23, wherein the chroma residue is scaled in the luma-dependent manner by performing a luma-dependent chroma residue scaling operation that comprises scaling chroma residuals before being used to derive the reconstruction of a video chroma block, and the scaling parameters are derived from luma samples.

25. The method of any of clauses 1-24, wherein the performing of the conversion includes generating the coded representation from the current block.

26. The method of any of clauses 1-24, wherein the performing of the conversion includes generating the current block from the coded representation.

27. An apparatus in a video system comprising a processor and a non-transitory memory with instructions thereon, wherein the instructions upon execution by the processor, cause the processor to implement the method in any one of clauses 1 to 26.

28. A computer program product stored on a non-transitory computer readable media, the computer program product including program code for carrying out the method in any one of clauses 1 to 26.

The fifth set of clauses describe certain features and aspects of the disclosed techniques listed in the previous section, including, for example, Examples 10-14, 28, 29, and 40.

1. A method for video processing, comprising: determining, for a conversion between a current video block of a video and a coded representation of the video, whether to disable using of a coding mode based on one or more coefficient values of the current video block; and performing the conversion based on the determining, wherein, during the conversion using the coding mode, the current video block is constructed based on a first domain and a second domain and/or chroma residue is scaled in a luma-dependent manner.

2. The method of clause 1, wherein the reshaping process comprises: selectively applying at least one of a forward reshaping process to samples in the first domain that are then converted into samples in the second domain; and selectively applying an inverse reshaping process to the samples in the second domain that are then converted into a representation in the first domains.

3. The method of clause 1 or 2, wherein the reshaping process further comprises: selectively applying a luma dependent chroma residual scaling process.

4. The method of any of clause 1-3, wherein the determining is based on whether the current video block is coded with all zero coefficients.

5. The method of clause 2, wherein the forward reshaping process is skipped based on whether the current video block is coded with all zero coefficients.

6. The method of clause 2, wherein the current video block is coded with all zero coefficients, and wherein the inverse reshaping process is skipped.

7. The method of clause 2, wherein the current video block is coded with all zero coefficients, and wherein the luma dependent chroma residual scaling process is skipped.

8. The method of clause 2, wherein the determining is based on whether the current video block is coded with only one non-zero coefficient located at certain positions.

9. The method of clause 2, wherein the current video block is coded with only one non-zero coefficient located at certain positions, and at least one of the forward reshaping process, the inverse reshaping process, or the luma dependent chroma residual scaling process is skipped.

10. The method of clause 2, wherein the determining is based on whether the current video block is coded with M non-zero coefficients.

11. The method of clause 2, wherein the current video block is coded with M non-zero coefficients, and at least one of the forward reshaping process, the inverse reshaping process, or the luma dependent chroma residual scaling process is skipped.

12. The method of clause 11, wherein M is 1.

13. A method of video processing, comprising: dividing, for a conversion between a current video block of a video that exceeds a virtual pipeline data unit (VPDU) of the video, the current video block into regions; and performing the conversion by applying a coding mode separately to each region, wherein, during the conversion by applying the coding mode, the current video block is constructed based on a first domain and a second domain and/or chroma residue is scaled in a luma-dependent manner.

14. The method of clause 13, wherein each region corresponds to an individual coding unit (CU) of the coding mode.

15. The method of clause 13, wherein a width of the current video block is equal to or greater than a first value, the current video block is split into sub-blocks having one or more widths that are equal to or smaller than the first value, and the coding mode is enabled for each sub-block.

16. The method of clause 13, wherein a height of the current video block is equal to or greater than a second value, the current video block is split into sub-blocks having one or more heights that are equal to or smaller than the second value, and the coding mode is enabled for each sub-block.

17. The method of clause 13, wherein a size of the current video block is equal to or greater than a third value, the current video block is split into sub-blocks having one or more sizes that are equal to or smaller than the third value, and the coding mode is enabled for each sub-block.

18. The method of any one of clauses 15-17, wherein the sub-blocks have a same width or a same height.

19. A method for video processing, comprising: determining, for a conversion between a current video block of a video and a coded representation of the video, whether to disable using of a coding mode based on a size or a color format of the current video block; and performing the conversion based on the determining, wherein, during the conversion using the coding mode, the current video block is constructed based on a first domain and a second domain and/or chroma residue is scaled in a luma-dependent manner.

20. The method of clause 19, wherein the determining determines to disable the coding mode for the current video block that exceeds a virtual pipeline data unit (VPDU).

21. The method of clause 19, wherein the determining determines to disable the coding mode for the current video block having the size that contains samples whose number is smaller than M*H.

22. The method of clause 19, wherein the determining determines to disable the coding mode for the current video block in a case that a minimum size of a width and/or a height of the current video block is equal to or less than X that is an integer.

23. The method of clause 19, wherein the determining determines to disable the coding mode for the current video block in a case that a minimum size of a width and/or a height of the current video block is not smaller than X that is an integer.

24. The method of clause 22 or 23, wherein X is 8.

25. The method of clause 19, wherein the determining determines to disable the coding mode for the current video block in a case that the current video block has a width and/or a height, the width being equal to or greater than a first value and the height being equal to or greater than a second value.

26. The method of clause 19, wherein the determining determines to disable the coding mode for the current video block in a case that the current video block has a width and/or a height, the width being equal to or smaller than a first value and the height being equal to or smaller than a second value.

27. The method of clause 25 or 26, wherein at least one of the first value or the second value is 8

28. The method of any of clauses 19 to 27, wherein the disabling of the coding mode comprises disabling at least one of: 1) forward reshaping to covert samples in the first domain to the second domain; 2) backward reshaping to covert samples in the second domain to the first domain; 3) luma dependent chroma residual scaling.

29. A method for video processing, comprising: performing a conversion between a current video block of a video and a coded representation of the video, wherein the conversion uses a coding mode in which the current video block is constructed based on a first domain and a second domain and/or chroma residue is scaled in a luma-dependent manner, and wherein at least one syntax element in the coded representation provides an indication of a usage of the coding mode and an indication of a reshaper model.

30. The method of clause 29, wherein the indication of the usage of the coding mode is coded based on the indication of the reshaper model.

31. The method of clause 29, wherein the indication of the reshaper model is coded based on the indication of the coding mode.

32. The method of clause 29, wherein only one of the syntax elements is coded.

33. The method of any of clauses 1-32, wherein different clipping methods are applied to a prediction signal and a reconstruction signal.

34. The method of clause 33, wherein an adaptive clipping that allows different clipping parameters within the video is applied to the prediction signal.

35. The method of clause 34, wherein a maximum value and a minimum value for the adaptive clipping is defined in the second domain.

36. The method of clause 33, wherein a fixed clipping is applied to the reconstruction signal.

37. A method for video processing, comprising: determining that a coding mode is disabled for a conversion between a current video block of a video and a coded representation of the video; and conditionally skipping a forward reshaping and/or inverse reshaping based on the determining, wherein, in the coding mode, the current video block is constructed based on a first domain and a second domain and/or chroma residue is scaled in a luma-dependent manner.

38. The method of clause 37, wherein at least one of a prediction signal, a reconstruction signal, or a residual signal is in the first domain.

39. The method of clause 37, wherein at least one of a prediction signal, a reconstruction signal, or a residual signal is in the second domain.

40. A method for video processing, comprising: performing a conversion between a current video block of a video region of a video and a coded representation of the video, wherein the conversion uses a coding mode in which the current video block is constructed based on a first domain and a second domain and/or chroma residue is scaled in a luma-dependent manner, and wherein multiple forward reshaping and/or multiple inverse reshaping are applied in the reshaping mode for the video region.

41. The method of clause 40, wherein the video region includes a picture, a tile group, a virtual pipelining data unit (VPDU), a coding tree unit (CTU), a row, or multiple coding units.

42. The method of clause 40 or 41, wherein how to select the multiple forward reshaping and/or the multiple inverse reshaping depends on at least one of i) a block dimension or a video region dimension, ii) a coded mode of the current video block or of the video region, iii) a picture type of the current video block or of the video region, iv) a low delay check flag of the current video block or of the video region, v) motion information of the current video block or of the video region, vi) reference pictures of the current video block or of the video region, or vii) video content of the current video block or of the video region.

43. The method of any of clauses 1 to 42, wherein, during the conversion, a sample in the first domain is mapped to a sample in the second domain that has a value smaller than that of the sample in the first domain.

44. The method of any of clauses 1 to 43, wherein the first domain is an original domain and the second domain is a reshaped domain using a luma mapping with chroma scaling (LMCS) method to map luma samples to particular values.

45. The method of clause 44, wherein the LMCS uses piecewise linear model to map the luma samples to the particular values.

46. The method of any of clauses 1-45, wherein the performing of the conversion includes generating the coded representation from the current block.

47. The method of any of clauses 1-45, wherein the performing of the conversion includes generating the current block from the coded representation.

48. An apparatus in a video system comprising a processor and a non-transitory memory with instructions thereon, wherein the instructions upon execution by the processor, cause the processor to implement the method in any one of clauses 1 to 47.

49. A computer program product stored on a non-transitory computer readable media, the computer program product including program code for carrying out the method in any one of clauses 1 to 47.

The sixth set of clauses describe certain features and aspects of the disclosed techniques listed in the previous section, including, for example, Examples 16 and 17.

1. A video processing method, comprising: making a determination that a coding mode is enabled for a conversion between a current video block of a video and a coded representation of the video; and performing the conversion using a palette mode wherein at least a palette of representative sample values is used for the current video block, and wherein, in the coding mode, the current video block is constructed based on samples in a first domain and a second domain and/or chroma residue is scaled in a luma-dependent manner.

2. The method of clause 1, wherein the palette of representative sample values comprises at least one of 1) palette predictors, or 2) escaped samples.

3. The method of clause 1, wherein the representative sample values represent values in the first domain.

4. The method of clause 1, wherein the representative sample values represent values in the second domain.

5. The method of clause 1 or 2, wherein palette predictors used in the palette mode and included in the coded representation are in the first domain or in the second domain.

6. The method of clause 1 or 2, wherein escape samples used in the palette mode and included in the coded representation are in the first domain or in the second domain.

7. The method of clause 1 or 2, wherein when palette predictors and/or escape samples used in the palette mode and included in the coded representation are in the second domain, a first reconstruction block in the second domain is firstly generated and utilized for coding subsequent blocks.

8. The method of clause 7, wherein when palette predictors and/or escape samples used in the modified palette mode and included in the coded representation are in the second domain, a final reconstruction block in the first domain is generated using the first reconstruction block and an inverse reshaping process.

9. The method of clause 8, wherein the inverse reshaping process is invoked right before the deblocking filter process.

10. The method of any one of clause 1-9, wherein the conversion is performed based on a color component of the current video block.

11. The method of clause 10, wherein the color component is luma component.

12. A method of video processing, comprising: making a determination, for a conversion between a current video block of a video and a coded representation of the video, that the current video block is coded in a palette mode in which at least a palette of representative sample values is used for coding the current video block; and performing, due to the determination, the conversion by disabling a coding mode, wherein, when the coding mode is applied to a video block, the video block is constructed based on chroma residue that is scaled in a luma-dependent manner.

13. The method of clause 12, wherein when the current video block is coded in the palette mode, the coding mode is disabled.

14. A method of video processing, comprising: performing a conversion between a first video block of a video and a coded representation of the video, wherein the conversion uses a first coding mode and a palette coding mode in which at least a palette of representative pixel values is used for coding the current video block; and performing a conversion between a second video block of the video that is coded without using the palette coding mode and a coded representation of the video, and wherein the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and second video block.

15. The method of clause 14, wherein, the first coding mode applied to the first video block is different from the first coding mode applied to the second video block due to disabling use of a forward reshaping and an inverse reshaping that is used to convert samples between the first domain and the second domain.

16. The method of clause 14, wherein the first coding mode applied to the first video block is different from that the first coding mode applied to the second video block due to using a different reshaping and/or a different inverse reshaping function that is used to convert samples between the first domain and the second domain.

17. The method of any of clauses 1-11 and 14-16, wherein the first domain is an original domain and the second domain is a reshaped domain using a luma mapping with chroma scaling (LMCS) method which maps luma samples to particular values.

18. The method of clause 17, wherein the LMCS uses piecewise linear model to map the luma samples to the particular values.

19. The method of any of clauses 1-18, wherein the performing of the conversion includes generating the coded representation from the current block.

20. The method of any of clauses 1-18, wherein the performing of the conversion includes generating the current block from the coded representation.

21. An apparatus in a video system comprising a processor and a non-transitory memory with instructions thereon, wherein the instructions upon execution by the processor, cause the processor to implement the method in any one of clauses 1 to 21.

22. A computer program product stored on a non-transitory computer readable media, the computer program product including program code for carrying out the method in any one of clauses 1 to 21.

The seventh set of clauses describe certain features and aspects of the disclosed techniques listed in the previous section, including, for example, Examples 18 and 19.

1. A video processing method, comprising: making a determination that a coding mode is enabled for a conversion between a current video block of a video and a coded representation of the video; and performing the conversion using an intra block copy mode which generates a prediction block using at least a block vector pointing to a picture that includes the current video block, and wherein, in the coding mode, the current video block is constructed based on samples in a first domain and a second domain and/or chroma residue is scaled in a luma-dependent manner.

2. The method of clause 1, wherein the prediction block is generated in the first domain.

3. The method of clause 1, wherein a residual block is represented in the coded representation in the first domain.

4. The method of clause 1, wherein the prediction block is generated in the second domain.

5. The method of clause 1, wherein a residual block is represented in the coded representation in the second domain.

6. The method of clause 4 or 5, wherein a first construction block of the current video block is obtained based on a sum of the residual block and the prediction block in the second domain and the first construction block is utilized for the conversions between a subsequent video block and the coded representation of the video.

7. The method of clause 4 or 5, wherein a final construction block of the current video block is obtained based on an inverse reshaping that is applied to a first construction block to convert the first construction block from the second domain to the first domain.

8. The method of any one of clause 1-7, wherein the conversion is performed based on a color component of the current video block.

9. The method of clause 8, wherein the color component is luma component.

10. A method for video processing, comprising: making a determination, for a conversion between a current video block of a video and a coded representation of the video, that the current video block is coded in an intra block copy (IBC) mode that generates a prediction block using at least a block vector pointing to a video frame containing the current video block for coding the current video block; and performing, due to the determination, the conversion by disabling a coding mode, wherein when the coding mode is applied to a video block, the video block is constructed based on a first domain and a second domain and/or chroma residue is scaled in a luma-dependent manner.

11. The method of clause 10, wherein when the current video block is coded in the IBC mode, the coding mode is disabled.

12. A method for video processing, comprising: performing a conversion between a first video block of a video and a coded representation of the video, wherein the conversion uses an intra block copy mode that generates a prediction block using at least a block vector pointing to a video frame containing the current video block and a first coding mode; and performing a conversion between a second video block of the video that is coded without using the intra block copy mode and a coded representation of the video, wherein the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and to the second video block.

13. The method of clause 12, wherein, the first coding mode applied to the first video block is different from the first coding mode applied to the second video block due to disabling use of a forward reshaping and an inverse reshaping that are used to convert samples between the first domain and the second domain.

14. The method of clause 12, wherein the first coding mode applied to the first video block is different from the first coding mode applied to the second video block due to using a different forward reshaping and/or a different inverse reshaping that is used to convert samples between the first domain and the second domain.

15. The method of any of clauses 1-14, wherein the first domain is an original domain and the second domain is a reshaped domain using a luma mapping with chroma scaling (LMCS) method which maps luma samples to particular values.

16. The method of clause 15, wherein the LMCS uses piecewise linear model to map the luma samples to the particular values.

17. The method of any of clauses 1-16, wherein the performing of the conversion includes generating the coded representation from the current block.

18. The method of any of clauses 1-16, wherein the performing of the conversion includes generating the current block from the coded representation.

19. An apparatus in a video system comprising a processor and a non-transitory memory with instructions thereon, wherein the instructions upon execution by the processor, cause the processor to implement the method in any one of clauses 1 to 18.

20. A computer program product stored on a non-transitory computer readable media, the computer program product including program code for carrying out the method in any one of clauses 1 to 18.

The eighth set of clauses describe certain features and aspects of the disclosed techniques listed in the previous section, including, for example, Examples 20-27.

1. A method of video processing, comprising: making a determination that a coding mode is enabled for a conversion between a current video block of a video and a coded representation of the video; and performing the conversion using a block-based delta pulse code modulation (BDPCM) mode, wherein, in the coding mode, the current video block is constructed based on samples in a first domain and a second domain and/or chroma residue is scaled in a luma-dependent manner.

2. The method of clause 1, wherein a prediction block of the current video block is generated in the first domain.

3. The method of clause 1, wherein a residual block of the current video block is represented in the coded representation in the first domain.

4. The method of clause 1, wherein a prediction block of the current video block is generated in the second domain.

5. The method of clause 1, wherein a residual block of the current video block is represented in the coded representation in the second domain.

6. The method of clause 4 or 5, wherein a first construction block of the current video block is obtained based on a sum of the residual block and the prediction block in the second domain and the first construction block is utilized for the conversions between a subsequence video block and the coded representation of the video.

7. The method of clause 4 or 5, wherein a final construction block of the current video block is obtained based on an inverse reshaping that is applied to a first construction block to convert the first construction block from the second domain to the first domain.

8. A method of video processing, comprising: making a determination, for a conversion between a current video block of a video and a coded representation of the video, that the current video block is coded using a block-based delta pulse code modulation (BDPCM) mode; and performing, due to the determination, the conversion by disabling a coding mode, wherein when the coding mode is applied to a video block, the video block is constructed based on a first domain and a second domain and/or chroma residue is scaled in a luma-dependent manner.

9. The method of clause 8, wherein when the current video block is coded in the BDPCM mode, the coding mode is disabled.

10. A method of video processing, comprising: performing a conversion between a first video block of a video and a coded representation of the video, wherein the conversion of the first video block uses a first coding mode and a block-based delta pulse code modulation (BDPCM) mode; and performing a conversion between a second video block of the video and a coded presentation of the video, wherein the second video block is coded without using the BDPCM mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

11. The method of clause 10, wherein, the first coding mode applied to the first video block is different from the first coding mode applied to the second video block due to disabling use of a forward reshaping and an inverse reshaping that are used to convert samples between the first domain and the second domain.

12. The method of clause 10, wherein the first coding mode applied to the first video block is different from the first coding mode applied to the second video block due to using a different forward reshaping and/or a different inverse reshaping that is used to convert samples between the first domain and the second domain.

13. A method of video processing, comprising: making a determination that a coding mode is enabled for a conversion between a current video block of a video and a coded representation of the video; and performing the conversion using a transform skip mode in which a transform on a prediction residual is skipped in coding the current video block, wherein, in the coding mode, the current video block is constructed based on samples in a first domain and a second domain and/or chroma residue is scaled in a luma-dependent manner.

14. The method of clause 13, wherein a prediction block of the current video block is generated in the first domain.

15. The method of clause 13, wherein a residual block of the current video block is represented in the coded representation in the first domain.

16. The method of clause 13, wherein a prediction block of the current video block is generated in the second domain.

17. The method of clause 13, wherein a residual block is represented in the coded representation in the second domain.

18. The method of clause 16 or 17, wherein a first construction block of the current video block is obtained by based on a sum of the residual block and the prediction block in the second domain and the first construction block is utilized for the conversions between a subsequent video block and the coded representation of the video.

19. The method of clause 16 or 17, wherein a final construction block of the current video block is obtained based on an inverse reshaping that is applied to a first construction block to convert the first construction block from the second domain to the first domain.

20. A method of video processing, comprising: making a determination, for a conversion between a current video block of a video and a coded representation of the video, that the current video block is coded in a transform skip mode in which a transform on a prediction residual is skipped in coding the current video block; and performing, due to the determination, the conversion by disabling a coding mode, wherein when the coding mode is applied to a video block, the video block is constructed based on a first domain and a second domain and/or chroma residue is scaled in a luma-dependent manner.

21. The method of clause 20, wherein when the current video block is coded in the transform skip mode, the coding mode is disabled.

22. A method of video processing, comprising: performing a conversion between a first video block of a video and a coded representation of the video, wherein the conversion of the first video block uses a first coding mode and a transform skip mode in which a transform on a prediction residual is skipped in coding the current video block; and performing a conversion between a second video block of the video and a coded representation of the video, wherein the second video block is coded without using the transform skip mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

23. The method of clause 22, wherein, the first coding mode applied to the first video block is different from the first coding mode applied to the second video block due to disabling use of a forward reshaping and an inverse reshaping that are used to convert samples between the first domain and the second domain.

24. The method of clause 22, wherein the first coding mode applied to the first video block is different from the first coding mode applied to the second video block due to using a different forward reshaping and/or a different inverse reshaping that is used to convert samples between the first domain and the second domain.

25. A method of video processing, comprising: making a determination that a coding mode is enabled for a conversion between a current video block of a video and a coded representation of the video; and performing the conversion using an intra pulse code modulation mode in which the current video block is coded without applying a transform and a transform-domain quantization, wherein, in the coding mode, the current video block is constructed based on samples in a first domain and a second domain and/or chroma residue is scaled in a luma-dependent manner.

26. The method of clause 25, wherein a prediction block of the current video block is generated in the first domain.

27. The method of clause 25, wherein a residual block of the current video block is represented in the coded representation in the first domain.

28. The method of clause 25, wherein a prediction block of the current video block is generated in the second domain.

29. The method of clause 25, wherein a residual block is represented in the coded representation in the second domain.

30. The method of clause 28 or 29, wherein a first construction block of the current video block is obtained based on a sum of the residual block and the prediction block in the second domain and the first construction block is utilized for the conversions between a subsequent video block and the coded representation of the video.

31. The method of clause 28 or 29, wherein a final construction block of the current video block is obtained based on an inverse reshaping that is applied to a first construction block to convert the first construction block from the second domain to the first domain.

32. A method of video processing, comprising: making a determination, for a conversion between a current video block of a video and a coded representation of the video, that the current video block is coded in an intra pulse code modulation mode in which the current video block is coded without applying a transform and a transform-domain quantization; and performing, due to the determination, the conversion by disabling a coding mode, wherein when the coding mode is applied to a video block, the video block is constructed based on a first domain and a second domain and/or chroma residue is scaled in a luma-dependent manner.

33. The method of clause 32, wherein when the current video block is coded in the intra pulse code modulation mode, the coding mode is disabled.

34. A method of video processing, comprising: performing a conversion between a first video block of a video and a coded representation of the video, wherein the conversion of the first video block uses a first coding mode and an intra pulse code modulation mode in which the current video block is coded without applying a transform and a transform-domain quantization; and performing a conversion between a second video block of the video and a coded presentation of the video, wherein the second video block is coded without using the intra pulse code modulation mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

35. The method of clause 34, wherein, the first coding mode applied to the first video block is different from the first coding mode applied to the second video block due to disabling use of a forward reshaping and an inverse reshaping that are used to convert samples between the first domain and the second domain.

36. The method of clause 34, wherein the first coding mode applied to the first video block is different from the first coding mode applied to the second video block due to using a different forward reshaping and/or a different inverse reshaping that is used to convert samples between the first domain and the second domain.

37. A method of video processing, comprising: making a determination that a coding mode is enabled for a conversion between a current video block of a video and a coded representation of the video; and performing the conversion using a modified transquant-bypass mode in which the current video block is losslessly coded without a transform and a quantization, wherein, in the coding mode, the current video block is constructed based on samples in a first domain and a second domain and/or chroma residue is scaled in a luma-dependent manner.

38. The method of clause 37, wherein a prediction block of the current video block is generated in the first domain.

39. The method of clause 37, wherein a residual block of the current video block is represented in the coded representation in the first domain.

40. The method of clause 37, wherein a prediction block of the current video block is generated in the second domain.

41. The method of clause 37, wherein a residual block is represented in the coded representation in the second domain.

42. The method of clause 40 or 41, wherein a first construction block of the current video block is obtained based on a sum of the residual block and the prediction block in the second domain and the first construction block is utilized for the conversions between a subsequent video block and the coded representation of the video.

43. The method of clause 40 or 41, wherein a final construction block of the current video block is obtained based on an inverse reshaping that is applied to a first construction block to convert the first construction block from the second domain to the first domain.

44. A method of video processing, comprising: making a determination, for a conversion between a current video block of a video and a coded representation of the video, that the current video block is coded in a transquant-bypass mode in which the current video block is losslessly coded without a transform and a quantization; and performing, due to the determination, the conversion by disabling a coding mode, wherein when the coding mode is applied to a video block, the video block is constructed based on a first domain and a second domain and/or chroma residue is scaled in a luma-dependent manner.

45. The method of clause 44, wherein when the current video block is coded in the intra pulse code modulation mode, the coding mode is disabled.

46. A method of video processing, comprising: performing a conversion between a first video block of a video and a coded representation of the video, wherein the conversion of the first video block uses a first coding mode and a transquant-bypass mode in which the current video block is losslessly coded without a transform and a quantization; and performing a conversion between a second video block of the video and a coded presentation of the video, wherein the second video block is coded without using the transquant-bypass mode and the conversion of the second video block uses the first coding mode, wherein when the first coding mode is applied to a video block, the video block is constructed based on a first domain and a second domain and/or chroma residue is scaled in a luma-dependent manner, and wherein the first coding mode is applied in different manners to the first video block and the second video block.

47. The method of clause 46, wherein, the first coding mode applied to the first video block is different from the first coding mode applied to the second video block due to disabling use of a forward reshaping and an inverse reshaping that are used to convert samples between the first domain and the second domain.

48. The method of clause 46, wherein the first coding mode applied to the first video block is different from the first coding mode applied to the second video block due to using a different forward reshaping and/or a different inverse reshaping that is used to convert samples between the first domain and the second domain.

49. The method of any one of clauses 1 to 48, wherein the conversion is performed based on a color component of the current video block.

50. The method of clause 49, wherein the color component is luma component.

51. The method of any of clauses 1-50, wherein the first domain is an original domain and the second domain is a reshaped domain using a luma mapping with chroma scaling (LMCS) method which maps luma samples to particular values.

52. The method of clause 51, wherein the LMCS uses piecewise linear model to map the luma samples to the particular values.

53. The method of any of clauses 1 to 52, wherein the performing of the conversion includes generating the coded representation from the current block.

54. The method of any of clauses 1 to 52, wherein the performing of the conversion includes generating the current block from the coded representation.

55. An apparatus in a video system comprising a processor and a non-transitory memory with instructions thereon, wherein the instructions upon execution by the processor, cause the processor to implement the method in any one of clauses 1 to 54.

56. A computer program product stored on a non-transitory computer readable media, the computer program product including program code for carrying out the method in any one of clauses 1 to 54.

The ninth set of clauses describe certain features and aspects of the disclosed techniques listed in the previous section, including, for example, Examples 30-34 and 41.

1. A method of video processing, comprising: performing a conversion between a current video block of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in a parameter set that is different from a sequence parameter set (SPS), a video parameter set (VPS), a picture parameter set (PPS), or an adaptation parameter set (APS) used for carrying adaptive loop filtering (ALF) parameters.

2. The method of clause 1, wherein the parameter set is shared across pictures.

3. The method of clause 1, wherein the parameter set includes one or more syntax elements including at least one of an identifier of the parameter set or a flag indicating a presence of extension data of the parameter set.

4. The method of clause 1, wherein the parameter set is specific for a tile group within a picture.

5. A method of video processing, comprising: performing a conversion between a current video block of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in an adaptation parameter set (APS) together with adaptive loop filtering (ALF) information, wherein the information used for the coding mode and the ALF information are included in one NAL unit.

6. The method of clause 5, wherein an identifier of the APS is signaled in a tile group header.

7. A method of video processing, comprising: performing a conversion between a current video block of a video region of a video and a coded representation of the current video block, wherein the conversion uses a coding mode in which the current video block is constructed based on a first domain and a second domain and/or chroma residue is scaled in a luma-dependent manner, and wherein information used for the coding mode is signaled in a first type of adaptation parameter set (APS) that is different from a second type of APS used for signaling adaptive loop filtering (ALF) information.

8. The method of clause 7, wherein an identifier of the second type of APS is signaled in the video region level.

9. The method of clause 7, wherein an identifier of the first type of APS is signaled in the video region level.

10. The method of clause 7, wherein the first type of APS contained in the coded representation contains the second type of APS that includes the ALF information in a conformance bitstream.

11. The method of clause 7, wherein the second type of APS contained in the coded representation contains the first type of APS that includes the information used for the coding mode in a conformance bitstream.

12. The method of clause 7, wherein the first type of APS and the second type of APS are associated with different identifiers.

13. The method of clause 12, wherein the second type of APS has an identifier that is equal to 2N, N being an integer.

14. The method of clause 13, wherein the first type of APS has an identifier that is equal to 2N+1, N being an integer.

15. A method of video processing, comprising: performing a conversion between a current video block of a video region of a video and a coded representation of the current video block, wherein the conversion uses a coding mode in which the current video block is constructed based on a first domain and a second domain and/or chroma residue is scaled in a luma-dependent manner, and wherein the video region is disallowed to refer to an adaptation parameter set or an parameter set that is signaled before a specified type of data structure used for processing the video, and wherein the specified type of the data structure is signaled before the video region.

16. The method of clause 15, wherein the data structure includes at least one of a network abstraction layer (NAL) unit, a tile group, a sequence parameter set (SPS), a picture parameter set (PPS), an access unit delimiter NAL (AUD), an end of bitstream NAL (EoB), an end of sequence NAL (NAL), an instantaneous decoding refresh (IDR) NAL, a clean random access (CRA) NAL, an intra random access point (TRAP) access unit, an I tile group, a picture, or a slice.

17. A method of video processing, comprising: performing a conversion between a current video block of a video and a coded representation of the video, wherein the conversion uses a coding mode in which the current video block is constructed based on a first domain and a second domain and/or chroma residue is scaled in a luma-dependent manner, and wherein a syntax element of a parameter set including parameters used for processing the video has predefined values in a conformance bitstream.

18. The method of clause 17, wherein the predefined values are 0 and 1.

19. The method of clause 17, wherein the predefined values are 0 and 7.

20. The method of any of clauses 7 to 16, wherein the video region comprises at least one of a tile group, a picture, a slice, or a tile.

21. The method of any of clauses 1 to 20, wherein the first domain is an original domain and the second domain is a reshaped domain using a luma mapping with chroma scaling (LMCS) method which maps luma samples to particular values.

22. The method of clause 21, wherein the LMCS uses piecewise linear model to map the luma samples to the particular values.

23. The method of any of clauses 1 to 22, wherein the performing of the conversion includes generating the coded representation from the current block.

24. The method of any of clauses 1 to 22, wherein the performing of the conversion includes generating the current block from the coded representation.

25. An apparatus in a video system comprising a processor and a non-transitory memory with instructions thereon, wherein the instructions upon execution by the processor, cause the processor to implement the method in any one of clauses 1 to 24.

26. A computer program product stored on a non-transitory computer readable media, the computer program product including program code for carrying out the method in any one of clauses 1 to 24.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

In the present document, the term "video processing" may refer to video encoding, video decoding, video compression or video decompression. For example, video compression algorithms may be applied during conversion from pixel representation of a video to a corresponding bitstream (or coded) representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    performing a conversion between a current video block of a video region of a video and a bitstream of the current video block,
    wherein the conversion uses a coding tool in which at least one of following processes is applied to the current video block:
        1) a forward mapping process for a luma component of the current video block, in which prediction samples of the luma component are converted from an original domain to a reshaped domain;

2) an inverse mapping process, which is an inverse operation of the forward mapping process to convert reconstructed samples of the luma component in the reshaped domain to the original domain, or 3) a scaling process, in which residual samples of a chroma component of the current video block are scaled before being used to reconstruct the chroma component of the current video block; and wherein information used for the coding tool is present in a first adaptation parameter set that is different from a second adaptation parameter set used for including adaptive loop filter information.

2. The method of claim 1, wherein a first identifier of the first adaptation parameter set is conditionally present in the video region level.

3. The method of claim 2, wherein the first identifier is present in the video region level based on the coding tool being enabled for the video region which is depend on the coding tool being enabled for a coded layer video sequence that the video region belongs to.

4. The method of claim 1, wherein a second identifier of the second adaptation parameter set is conditionally present in the video region level.

5. The method of claim 4, wherein the second identifier is present in the video region level based on the adaptive loop filter being enabled for the video region which is depend on the adaptive loop filter being enabled for a coded layer video sequence that the video region belongs to.

6. The method of claim 1, wherein the first adaptation parameter set that includes the information used for the coding tool is included in the bitstream and conforming a bitstream conformance.

7. The method of claim 1, wherein the second adaptation parameter set that includes the adaptive loop filtering information is included in the bitstream and conforming a bitstream conformance.

8. The method of claim 1, wherein the first adaptation parameter set and the second adaptation parameter set are associated with different identifiers.

9. The method of claim 1, wherein a present of a flag indicating whether the scaling process is enabled or not is at least based on the coding tool being enabled for the video region which is depend on the coding tool being enabled for a coded layer video sequence that the video region belongs to.

10. The method of claim 9, wherein the flag is present in the video region level.

11. The method of claim 1, wherein a piecewise linear model is used to map the prediction samples of the luma component into particular values during the forward mapping process.

12. The method of claim 10, wherein scale coefficients of the piecewise linear model is determined base on first variables which are determined base on syntax elements included in a adaptation parameter set and a second variable which is determined base on bit depth.

13. The method of claim 1, wherein the video region comprises at least one of a tile group, a picture, a slice, or a tile.

14. The method of claim 1, wherein the video region is disallowed to refer to a third adaptation parameter set that is present before a specified type of data structure used for processing the video, and wherein the specified type of the data structure is present before the video region.

15. The method of claim 14, wherein the data structure includes at least one of a network abstraction layer (NAL) unit, a tile group, a sequence parameter set (SPS), a picture parameter set (PPS), an access unit delimiter (AUD) NAL, an end of bitstream (EoB) NAL, an end of sequence NAL, an instantaneous decoding refresh (IDR) NAL, a clean random access (CRA) NAL, an intra random access point (IRAP) access unit, an I tile group, a picture, or a slice.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:

perform a conversion between a current video block of a video region of a video and a bitstream of the current video block, wherein the conversion uses a coding tool in which at least one of following processes is applied to the current video block:

1) a forward mapping process for a luma component of the current video block, in which prediction samples of the luma component are converted from an original domain to a reshaped domain;

2) an inverse mapping process, which is an inverse operation of the forward mapping process to convert reconstructed samples of the luma component in the reshaped domain to the original domain, or 3) a scaling process, in which residual samples of a chroma component of the current video block are scaled before being used to reconstruct the chroma component of the current video block; and wherein information used for the coding tool is present in a first adaptation parameter set that is different from a second adaptation parameter set used for including adaptive loop filter information.

19. A non-transitory computer-readable storage medium storing instructions that cause a processor to:

perform a conversion between a current video block of a video region of a video and a bitstream of the current video block, wherein the conversion uses a coding tool in which at least one of following processes is applied to the current video block:

1) a forward mapping process for a luma component of the current video block, in which prediction samples of the luma component are converted from an original domain to a reshaped domain;

2) an inverse mapping process, which is an inverse operation of the forward mapping process to convert reconstructed samples of the luma component in the reshaped domain to the original domain, or 3) a scaling process, in which residual samples of a chroma component of the current video block are scaled before being used to reconstruct the chroma component of the current video block; and wherein information used for the coding tool is present in a first adaptation parameter set that is different from a second adaptation parameter set used for including adaptive loop filter information.

20. A non-transitory computer-readable recording medium storing a bitstream of a video which is generated by a method performed by a video processing apparatus, wherein the method comprises:

generating the bitstream based on a current video block of a video region of the video;

wherein the generating uses a coding tool in which at least one of following processes is applied to the current video block:
1) a forward mapping process for a luma component of the current video block, in which prediction samples of the luma component are converted from an original domain to a reshaped domain;
2) an inverse mapping process, which is an inverse operation of the forward mapping process to convert reconstructed samples of the luma component in the reshaped domain to the original domain, or
3) a scaling process, in which residual samples of a chroma component of the current video block are scaled before being used to reconstruct the chroma component of the current video block; and wherein information used for the coding tool is present in a first adaptation parameter set that is different from a second adaptation parameter set used for including adaptive loop filter information.

* * * * *

UNITED STATES PATENT AND TRADEMARK OFFICE
CERTIFICATE OF CORRECTION

PATENT NO. : 11,412,238 B2  
APPLICATION NO. : 17/357244  
DATED : August 9, 2022  
INVENTOR(S) : Li Zhang et al.

Page 1 of 1

It is certified that error appears in the above-identified patent and that said Letters Patent is hereby corrected as shown below:

On the Title Page

Item (30) Foreign Application Priority Data, delete "PCT/CN2020/079429" and insert -- PCT/CN2019/078185 --, therefor.

Signed and Sealed this  
Fourteenth Day of May, 2024

Katherine Kelly Vidal  
*Director of the United States Patent and Trademark Office*